US010323950B1

United States Patent
Stewart et al.

(10) Patent No.: US 10,323,950 B1
(45) Date of Patent: *Jun. 18, 2019

(54) UTILIZING A GEO-LOCATOR SERVICE AND ZONE SERVERS TO REDUCE COMPUTER RESOURCE REQUIREMENTS FOR DETERMINING HIGH QUALITY SOLUTIONS TO ROUTING PROBLEMS

(71) Applicant: MAPANYTHING, INC., Charlotte, NC (US)

(72) Inventors: John Brian Stewart, Charlotte, NC (US); Dinesh Premalal Weerapurage, Morrison, CO (US); Timothy Alan Carnes, Seattle, WA (US); Christopher Sebastian Groer, Knoxville, TN (US); Lahiru Sandakith Pileththuwasan Gallege, Knoxville, TN (US); Chenlu Lou, Knoxville, TN (US)

(73) Assignee: MAPANYTHING, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,575

(22) Filed: Dec. 30, 2018

Related U.S. Application Data

(63) Continuation of application No. 16/053,792, filed on Aug. 2, 2018.

(51) Int. Cl.
  *G01C 21/32* (2006.01)
  *G01C 21/34* (2006.01)
  (Continued)

(52) U.S. Cl.
  CPC ......... *G01C 21/32* (2013.01); *G01C 21/3407* (2013.01); *G01C 21/3446* (2013.01);
  (Continued)

(58) Field of Classification Search
  CPC ............... G01C 21/32; G01C 21/3407; G01C 21/3446; G06F 16/9566; H04L 67/18; H04W 4/024
  See application file for complete search history.

(56) References Cited

U.S. PATENT DOCUMENTS

| | | | |
|---|---|---|---|
| 7,092,964 B1 * | 8/2006 | Dougherty | G06Q 30/02 705/27.1 |
| 7,949,642 B2 * | 5/2011 | Yang | G06Q 30/02 707/706 |
| 10,142,255 B1 * | 11/2018 | Pachon | H04L 47/70 |

* cited by examiner

*Primary Examiner* — Nicholas Kiswanto
(74) *Attorney, Agent, or Firm* — Chad D. Tillman; Jeremy C. Doerre; Tillman Wright, PLLC

(57) ABSTRACT

A method involves utilizing a geo-locator service and zone servers to reduce server resource requirements for determining high quality solutions to routing problems. The use of a geo-locator service and zone servers enables the use of servers having less memory which can handle determination of high quality solutions to routing problems involving locations spanning a smaller geographic area even if they are incapable of handling determination of high quality solutions to routing problems involving locations spanning a larger geographic area, and enables efficient assignment of requests to an appropriate server without unduly burdening high value servers having sufficient memory to handle determination of high quality solutions to routing problems involving locations spanning a very large geographic area with determination of high quality solutions to routing problems involving locations spanning a smaller geographic area.

20 Claims, 166 Drawing Sheets

(51) Int. Cl.
  *H04L 29/08* (2006.01)
  *H04W 4/024* (2018.01)
  *G06F 16/955* (2019.01)
(52) U.S. Cl.
  CPC .......... *G06F 16/9566* (2019.01); *H04L 67/18* (2013.01); *H04W 4/024* (2018.02)

| Road Segment | Distance |
|---|---|
| $\overline{AB}$ | 363 feet |
| $\overline{AC}$ | 724 feet |
| $\overline{AD}$ | 238 feet |
| $\overline{BE}$ | 264 feet |
| $\overline{BF}$ | 165 feet |
| $\overline{CD}$ | 561 feet |
| $\overline{DE}$ | 304 feet |

*FIG. 7*

Potential Path 1: $\overline{BF} + \overline{AB} + \overline{AC}$
165 + 363 + 724 = 1252

Potential Path 2: $\overline{BF} + \overline{AB} + \overline{AD} + \overline{CD}$
165 + 363 + 238 + 561 = 1327

Potential Path 3: $\overline{BF} + \overline{BE} + \overline{DE} + \overline{CD}$
165 + 264 + 304 + 561 = 1294

Potential Path 4: $\overline{BF} + \overline{BE} + \overline{DE} + \overline{AD} + \overline{AC}$
165 + 264 + 304 + 238 + 724 = 1695

| Road Segment | Distance |
|---|---|
| $\overline{AB}$ | 363 feet |
| $\overline{AC}$ | 724 feet |
| $\overline{AD}$ | 238 feet |
| $\overline{BE}$ | 264 feet |
| $\overline{BF}$ | 165 feet |
| $\overline{CD}$ | 561 feet |
| $\overline{DE}$ | 304 feet |

*FIG. 12*

| Path No. | Path | Total Distance |
|---|---|---|
| 1 | $\overline{BF} + \overline{AB} + \overline{AC}$ | 1252 |
| 2 | $\overline{BF} + \overline{AB} + \overline{AD} + \overline{CD}$ | 1327 |
| 3 | $\overline{BF} + \overline{BE} + \overline{DE} + \overline{CD}$ | 1294 |
| 4 | $\overline{BF} + \overline{BE} + \overline{DE} + \overline{AD} + \overline{AC}$ | 1695 |

*FIG. 13*

| Road Segment | Distance | Speed Limit | Est. Travel Time |
|---|---|---|---|
| $\overline{AB}$ | 363 feet | 35 mph | 7 seconds |
| $\overline{AC}$ | 724 feet | 35 mph | 14 seconds |
| $\overline{AD}$ | 238 feet | 35 mph | 5 seconds |
| $\overline{BE}$ | 264 feet | 25 mph | 7 seconds |
| $\overline{BF}$ | 165 feet | 25 mph | 5 seconds |
| $\overline{CD}$ | 561 feet | 45 mph | 9 seconds |
| $\overline{DE}$ | 304 feet | 45 mph | 5 seconds |

*FIG. 15*

Potential Path 1: $\overline{BF} + \overline{AB} + \overline{AC}$
5 + 7 + 14 = 26 seconds

Potential Path 2: $\overline{BF} + \overline{AB} + \overline{AD} + \overline{CD}$
5 + 7 + 5 + 9 = 26 seconds

Potential Path 3: $\overline{BF} + \overline{BE} + \overline{DE} + \overline{CD}$
5 + 7 + 5 + 9 = 26 seconds

Potential Path 4: $\overline{BF} + \overline{BE} + \overline{DE} + \overline{AD} + \overline{AC}$
5 + 7 + 5 + 5 + 14 = 36 seconds

| Road Segment | Est. Travel Time |
|---|---|
| $\overline{AB}$ | 7 seconds |
| $\overline{AC}$ | 14 seconds |
| $\overline{AD}$ | 5 seconds |
| $\overline{BE}$ | 7 seconds |
| $\overline{BF}$ | 5 seconds |
| $\overline{CD}$ | 9 seconds |
| $\overline{DE}$ | 5 seconds |

*FIG. 16*

| Path No. | Path | Total Est. Trav. Time | Total Distance |
|---|---|---|---|
| 1 | $\overline{BF} + \overline{AB} + \overline{AC}$ | 26 seconds | 1252 |
| 2 | $\overline{BF} + \overline{AB} + \overline{AD} + \overline{CD}$ | 26 seconds | 1327 |
| 3 | $\overline{BF} + \overline{BE} + \overline{DE} + \overline{CD}$ | 26 seconds | 1294 |
| 4 | $\overline{BF} + \overline{BE} + \overline{DE} + \overline{AD} + \overline{AC}$ | 36 seconds | 1695 |

*FIG. 17*

| Path No. | Path | Total Est. Trav. Time | Total Distance |
|---|---|---|---|
| 1 | $\overline{BF} + \overline{AB} + \overline{AC}$ | 26 seconds | 1252 |
| 2 | $\overline{BF} + \overline{AB} + \overline{AD} + \overline{CD}$ | 26 seconds | 1327 |
| 3 | $\overline{BF} + \overline{BE} + \overline{DE} + \overline{CD}$ | 26 seconds | 1294 |
| 4 | $\overline{BF} + \overline{BE} + \overline{DE} + \overline{AD} + \overline{AC}$ | 36 seconds | 1695 |

FIG. 18

| Path No. | Path | Total Est. Trav. Time | No. of Turns |
|---|---|---|---|
| 1 | $\overline{BF} + \overline{AB} + \overline{AC}$ | 26 seconds | 0 |
| 2 | $\overline{BF} + \overline{AB} + \overline{AD} + \overline{CD}$ | 26 seconds | 2 |
| 3 | $\overline{BF} + \overline{BE} + \overline{DE} + \overline{CD}$ | 26 seconds | 2 |
| 4 | $\overline{BF} + \overline{BE} + \overline{DE} + \overline{AD} + \overline{AC}$ | 36 seconds | 4 |

*FIG. 19*

| Potential Path 1 | |
|---|---|
| Path Portion | Est. Travel Time |
| $\overline{BF}$ | 5 seconds |
| $\overline{AB}$ | 7 seconds |
| $\overline{AC}$ | 14 seconds |
| Total | 26 seconds |

*FIG. 20*

| Potential Path 2 | |
|---|---|
| Path Portion | Est. Travel Time |
| $\overline{BF}$ | 5 seconds |
| $\overline{AB}$ | 7 seconds |
| Left turn from $\overline{AB}$ on to $\overline{AD}$ | 30 seconds |
| $\overline{AD}$ | 5 seconds |
| Right turn from $\overline{AD}$ on to $\overline{CD}$ | 10 seconds |
| $\overline{CD}$ | 9 seconds |
| Total | 1 min 6 seconds |

FIG. 21

| Potential Path 3 | |
|---|---|
| Path Portion | Est. Travel Time |
| $\overline{BF}$ | 5 seconds |
| Left turn from $\overline{BF}$ on to $\overline{BE}$ | 30 seconds |
| $\overline{BE}$ | 7 seconds |
| Right turn from $\overline{BE}$ on to $\overline{DE}$ | 10 seconds |
| $\overline{DE}$ | 5 seconds |
| $\overline{CD}$ | 9 seconds |
| Total | 1 min 6 seconds |

FIG. 22

| Potential Path 4 | |
|---|---|
| Path Portion | Est. Travel Time |
| $\overline{BF}$ | 5 seconds |
| Left turn from $\overline{BF}$ on to $\overline{BE}$ | 30 seconds |
| $\overline{BE}$ | 7 seconds |
| Right turn from $\overline{BE}$ on to $\overline{DE}$ | 10 seconds |
| $\overline{DE}$ | 5 seconds |
| Right turn from $\overline{DE}$ on to $\overline{AD}$ | 10 seconds |
| $\overline{AD}$ | 5 seconds |
| Left turn from $\overline{AD}$ on to $\overline{AC}$ | 30 seconds |
| $\overline{AC}$ | 14 seconds |
| Total | 1 min 56 seconds |

FIG. 23

| Path No. | Path | Total Est. Trav. Time |
|---|---|---|
| 1 | $\overline{BF} + \overline{AB} + \overline{AC}$ | 26 seconds |
| 2 | $\overline{BF} + \overline{AB} + \overline{AD} + \overline{CD}$ | 1 min 6 seconds |
| 3 | $\overline{BF} + \overline{BE} + \overline{DE} + \overline{CD}$ | 1 min 6 seconds |
| 4 | $\overline{BF} + \overline{BE} + \overline{DE} + \overline{AD} + \overline{AC}$ | 1 min 56 seconds |

*FIG. 24*

| Potential Path 1 | |
|---|---|
| Path Portion | Est. Travel Time |
| $\overline{BF}$ | 5 seconds |
| Straight at Inter. (no light) | 15 seconds |
| $\overline{AB}$ | 7 seconds |
| Straight at Inter. (light) | 20 seconds |
| $\overline{AC}$ | 14 seconds |
| Total | 1 min 1 second |

FIG. 25

| Potential Path 2 | |
|---|---|
| Path Portion | Est. Travel Time |
| $\overline{BF}$ | 5 seconds |
| Straight at Intersection (no light) | 15 seconds |
| $\overline{AB}$ | 7 seconds |
| Left turn from $\overline{AB}$ on to $\overline{AD}$ (light) | 30 seconds |
| $\overline{AD}$ | 5 seconds |
| Right turn from $\overline{AD}$ on to $\overline{CD}$ (light) | 10 seconds |
| $\overline{CD}$ | 9 seconds |
| Total | 1 min 21 seconds |

FIG. 26

| Potential Path 3 | |
|---|---|
| Path Portion | Est. Travel Time |
| $\overline{BF}$ | 5 seconds |
| Left turn from $\overline{BF}$ on to $\overline{BE}$ (no light) | 20 seconds |
| $\overline{BE}$ | 7 seconds |
| Right turn from $\overline{BE}$ on to $\overline{DE}$ (light) | 10 seconds |
| $\overline{DE}$ | 5 seconds |
| Straight at Inter. (light) | 20 seconds |
| $\overline{CD}$ | 9 seconds |
| Total | 1 min 16 seconds |

*FIG. 27*

| Potential Path 4 | |
|---|---|
| Path Portion | Est. Travel Time |
| $\overline{BF}$ | 5 seconds |
| Left turn from $\overline{BF}$ on to $\overline{BE}$ (no light) | 20 seconds |
| $\overline{BE}$ | 7 seconds |
| Right turn from $\overline{BE}$ on to $\overline{DE}$ (light) | 10 seconds |
| $\overline{DE}$ | 5 seconds |
| Right turn from $\overline{DE}$ on to $\overline{AD}$ (light) | 10 seconds |
| $\overline{AD}$ | 5 seconds |
| Left turn from $\overline{AD}$ on to $\overline{AC}$ (light) | 30 seconds |
| $\overline{AC}$ | 14 seconds |
| Total | 1 min 46 seconds |

*FIG. 28*

| Path No. | Path | Total Est. Trav. Time |
|---|---|---|
| 1 | $\overline{BF} + \overline{AB} + \overline{AC}$ | 1 min 1 second |
| 2 | $\overline{BF} + \overline{AB} + \overline{AD} + \overline{CD}$ | 1 min 21 seconds |
| 3 | $\overline{BF} + \overline{BE} + \overline{DE} + \overline{CD}$ | 1 min 16 seconds |
| 4 | $\overline{BF} + \overline{BE} + \overline{DE} + \overline{AD} + \overline{AC}$ | 1 min 46 seconds |

*FIG. 29*

| Road Segment | Distance | Avg. Travel Time |
|---|---|---|
| $\overline{AB}$ | 363 | 9 seconds |
| $\overline{AC}$ | 724 | 14 seconds |
| $\overline{AD}$ | 238 | 8 seconds |
| $\overline{BE}$ | 264 | 7 seconds |
| $\overline{BF}$ | 165 | 5 seconds |
| $\overline{CD}$ | 561 | 10 seconds |
| $\overline{DE}$ | 304 | 8 seconds |

FIG. 31

| From | Type | On to | Avg. Time |
|---|---|---|---|
| $\overline{AB}$ | Straight | $\overline{AC}$ | 15 seconds |
| $\overline{AB}$ | Left | $\overline{AD}$ | 21 seconds |
| $\overline{AB}$ | Right Turn | $\overline{BE}$ | 4 seconds |
| $\overline{AB}$ | Straight | $\overline{BF}$ | 7 seconds |

*FIG. 32*

| Road Segment | Interval Start | Interval End | Avg. Travel Time |
|---|---|---|---|
| AB | 00:00:00 | 00:59:59 | 7 seconds |
| AB | 01:00:00 | 01:59:59 | 6 seconds |
| AB | 02:00:00 | 02:59:59 | 5 seconds |
| AB | 03:00:00 | 03:59:59 | 5 seconds |
| AB | 04:00:00 | 04:59:59 | 5 seconds |
| AB | 05:00:00 | 05:59:59 | 5 seconds |
| AB | 06:00:00 | 06:59:59 | 5 seconds |
| AB | 07:00:00 | 07:59:59 | 8 seconds |
| AB | 08:00:00 | 08:59:59 | 11 seconds |
| AB | 09:00:00 | 09:59:59 | 8 seconds |
| AB | 10:00:00 | 10:59:59 | 7 seconds |
| AB | 11:00:00 | 11:59:59 | 7 seconds |

FIG. 33

| Road Segment | Interval Start | Interval End | Avg. Travel Time |
| --- | --- | --- | --- |
| AB | 12:00:00 | 12:59:59 | 8 seconds |
| AB | 13:00:00 | 13:59:59 | 8 seconds |
| AB | 14:00:00 | 14:59:59 | 6 seconds |
| AB | 15:00:00 | 15:59:59 | 5 seconds |
| AB | 16:00:00 | 16:59:59 | 8 seconds |
| AB | 17:00:00 | 17:59:59 | 12 seconds |
| AB | 18:00:00 | 18:59:59 | 9 seconds |
| AB | 19:00:00 | 19:59:59 | 8 seconds |
| AB | 20:00:00 | 20:59:59 | 7 seconds |
| AB | 21:00:00 | 21:59:59 | 6 seconds |
| AB | 22:00:00 | 22:59:59 | 6 seconds |
| AB | 23:00:00 | 23:59:59 | 6 seconds |

FIG. 34

| Road Segment | Distance | Avg. Travel Time |
|---|---|---|
| $\vec{AB}$ | 363 | 10 seconds |
| $\vec{BA}$ | 363 | 9 seconds |

FIG. 38 prefValue p = (thispath.totalDistance * distWeight) + (thispath.estTime * timeWeight);

FIG. 40

| Path No. | Path | Total Est. Trav. Time | TimeVal | Total Dist. | DistVal | PrefVal |
|---|---|---|---|---|---|---|
| 1 | $\overline{BF} + \overline{AB} + \overline{AC}$ | 61 seconds | 1.694 | 1252 | 2.371 | (4.065) |
| 2 | $\overline{BF} + \overline{AB} + \overline{AD} + \overline{CD}$ | 81 seconds | 2.250 | 1327 | 2.513 | 4.763 |
| 3 | $\overline{BF} + \overline{BE} + \overline{DE} + \overline{CD}$ | 76 seconds | 2.111 | 1294 | 2.451 | 4.562 |
| 4 | $\overline{BF} + \overline{BE} + \overline{DE} + \overline{AD} + \overline{AC}$ | 106 seconds | 2.944 | 1695 | 3.210 | 6.154 |

TimeVal = Total Est. Trav. Time * timeWeight
timeWeight = (1 / 36)

DistVal = Total Dist * distWeight
distWeight = (1 / 528)

PrefVal = (TimeVal + DistVal)

*FIG. 41*

| No. | Path | estTime | TimeVal | totalDist | DistVal | PrefVal |
|---|---|---|---|---|---|---|
| 1 | $\overline{BF} + \overline{AB} + \overline{AC}$ | 61 seconds | 1.00000 | 1252 | 1.00000 | 1.00000 |
| 2 | $\overline{BF} + \overline{AB} + \overline{AD} + \overline{CD}$ | 81 seconds | 1.32787 | 1327 | 1.05990 | 1.19388 |
| 3 | $\overline{BF} + \overline{BE} + \overline{DE} + \overline{CD}$ | 76 seconds | 1.24590 | 1294 | 1.03354 | 1.13972 |
| 4 | $\overline{BF} + \overline{BE} + \overline{DE} + \overline{AD} + \overline{AC}$ | 106 seconds | 1.73770 | 1695 | 1.35383 | 1.54577 | leastTime = 61 seconds
leastDist = 1252 feet

TimeVal = estTime / leastTime
DistVal = totalDist / leastDist

PrefVal = ( (TimeVal * timeWeight) + (DistVal * distWeight) ) / (timeWeight + distWeight)

FIG. 42

```
path findPreferredPath(List<path> pathList, timeofday t, int distWeight, int timeWeight)
{
    dist leastDist = new dist();
    time leastTime = new time();

foreach (path x in pathList)
    {
        dist totalDist = findDist(x);
        x.totalDist = totalDist;
        if (totalDist < leastDist)
        {           leastDist = totalDist;         } time estTime = findAvgTime(x, t);
        x.estTime = estTime;
        if (estTime < leastTime)
        {           leastTime = estTime;         }
    } prefvalue p = new prefvalue();
    path prefPath = new path();

foreach (path x in pathList)
    {
        dist curDistVal = x.totalDist / leastDist;
        time curTimeVal = x.estTime / leastTime;
        prefvalue curPrefVal = ( (curDistVal * distWeight) + (curTimeVal * timeWeight) ) / (distWeight + timeWeight);

if (curPrefVal > p)
        {
            p = curPrefVal;
            prefPath = x;
        }
    } return prefPath;
}
```

FIG. 43

|  | From | | | |
|---|---|---|---|---|
| | 1 | 2 | 3 | 4 |
| Distance To 1 | | | | |
| 2 | | | | |
| 3 | | | | |
| 4 | | | | |

*FIG. 51*

|  | From | | | |
|---|---|---|---|---|
| | 1 | 2 | 3 | 4 |
| | 0 feet | | | |

Distance To: 1, 2, 3, 4

Potential Path 1: $\overline{BF} + \overline{BE}$
165 + 264 = 429

Potential Path 2: $\overline{BF} + \overline{AB} + \overline{AD} + \overline{DE}$
165 + 363 + 238 + 304 = 1070

| Road Segment | Distance |
|---|---|
| $\overline{AB}$ | 363 feet |
| $\overline{AC}$ | 724 feet |
| $\overline{AD}$ | 238 feet |
| $\overline{BE}$ | 264 feet |
| $\overline{BF}$ | 165 feet |
| $\overline{CD}$ | 561 feet |
| $\overline{DE}$ | 304 feet |

FIG. 55

| Path No. | Path | Total Distance |
|---|---|---|
| 1 | $\overline{BF} + \overline{BE}$ | 429 |
| 2 | $\overline{BF} + \overline{AB} + \overline{AD} + \overline{DE}$ | 1070 |

FIG. 56

|  | From | | | |
|---|---|---|---|---|
| Distance To | 1 | 2 | 3 | 4 |
| 1 | 0 feet | | | |
| 2 | 429 feet | | | |
| 3 | | | | |
| 4 | | | | |

FIG. 57

| Distance To | From | | | |
|---|---|---|---|---|
| | 1 | 2 | 3 | 4 |
| 1 | 0 feet | 429 feet | | |
| 2 | 429 feet | | | |
| 3 | | | | |
| 4 | | | | |

*FIG. 58*

| Distance To | | From | | | |
|---|---|---|---|---|---|
| | | 1 | 2 | 3 | 4 |
| | 1 | 0 feet | 429 feet | 528 feet | 1252 feet |
| | 2 | 429 feet | 0 feet | 542 feet | 865 feet |
| | 3 | 528 feet | 542 feet | 0 feet | 724 feet |
| | 4 | 1252 feet | 865 feet | 724 feet | 0 feet |

FIG. 59

|  | From | | | |
|---|---|---|---|---|
| | 1 | 2 | 3 | 4 |
| 1 | | | | |
| 2 | | | | |
| 3 | | | | |
| 4 | | | | |

Time To

| Path No. | Path | Total Time |
|---|---|---|
| 1 | $\vec{FB} + \vec{BE}$ | 30 secs |
| 2 | $\vec{FB} + \vec{BA} + \vec{AD} + \vec{DE}$ | 99 seconds |

*FIG. 63*

|  | From | | | |
|---|---|---|---|---|
| | 1 | 2 | 3 | 4 |
| Time To 1 | n/a | | | |
| 2 | 30 secs | | | |
| 3 | | | | |
| 4 | | | | |

*FIG. 64*

|  | From | | | |
|---|---|---|---|---|
| | 1 | 2 | 3 | 4 |
| 1 | n/a | 21 secs | | |
| 2 | 30 secs | | | |
| 3 | | | | |
| 4 | | | | |

Time To

FIG. 66

|  | | From | | | |
|---|---|---|---|---|---|
|  | | 1 | 2 | 3 | 4 |
| Time To | 1 | n/a | 21 secs | 28 secs | 52 secs |
| | 2 | 30 secs | n/a | 45 secs | 28 secs |
| | 3 | 24 secs | 23 secs | n/a | 24 secs |
| | 4 | 48 secs | 28 secs | 24 secs | n/a |

*FIG. 67*

|  |  | \multicolumn{4}{c}{From} |  |  |  |
|---|---|---|---|---|---|
|  |  | 1 | 2 | 3 | 4 |
| Distance To | 1 | n/a | 429 feet | 528 feet | 1252 feet |
| | 2 | 429 feet | n/a | 542 feet | 865 feet |
| | 3 | 528 feet | 542 feet | n/a | 724 feet |
| | 4 | 1252 feet | 865 feet | 724 feet | n/a |
| Time To | 1 | n/a | 21 secs | 28 secs | 52 secs |
| | 2 | 30 secs | n/a | 45 secs | 28 secs |
| | 3 | 24 secs | 23 secs | n/a | 24 secs |
| | 4 | 48 secs | 28 secs | 24 secs | n/a |

*FIG. 68*

| | | From | | | |
|---|---|---|---|---|---|
| | | 1 | 2 | 3 | 4 |
| Time To | 1 | n/a | 21 secs | 28 secs | 52 secs |
| | 2 | 30 secs | n/a | 45 secs | 28 secs |
| | 3 | 24 secs | 23 secs | n/a | 24 secs |
| | 4 | 48 secs | 28 secs | 24 secs | n/a |

| Potential Route 1 | |
|---|---|
| Route Portion | Est. Travel Time |
| 1 -> 2 | 30 secs |
| 2 -> 3 | 23 secs |
| 3 -> 4 | 24 secs |
| Total | 77 secs |

Potential Route 1: 1 -> 2 -> 3 -> 4

| Time To | From | | | |
|---|---|---|---|---|
| | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Route 3 | |
|---|---|
| Route Portion | Est. Travel Time |
| 4 -> 3 | 24 secs |
| 3 -> 2 | 45 secs |
| 2 -> 1 | 21 secs |
| Total | 90 secs |

Potential Route 3: 4 -> 3 -> 2 -> 1

| Time To | From | | | |
|---|---|---|---|---|
| | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Route 4 | |
|---|---|
| Route Portion | Est. Travel Time |
| 2 -> 4 | 28 secs |
| 4 -> 3 | 24 secs |
| 3 -> 1 | 28 secs |
| Total | 80 secs |

Potential Route 4: 2 -> 4 -> 3 -> 1

| Route No. | Route | Total Est. Time |
|---|---|---|
| 1 | 1 -> 2 -> 3 -> 4 | 77 secs |
| 2 | 1 -> 3 -> 4 -> 2 | (76 secs) |
| 3 | 4 -> 3 -> 2 -> 1 | 90 secs |
| 4 | 2 -> 4 -> 3 -> 1 | 80 secs |

FIG. 74

Problem: Two Trucks for Visiting Four Locations (1,2,3,4)

| Time To | From | | | |
|---|---|---|---|---|
| | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Assignment 1 | |
|---|---|
| Routes | Est. Travel Time |
| 1 -> 2 | 30 secs |
| 2 -> 1 | 21 secs |
| 3 -> 4 | 24 secs |
| 4 -> 3 | 24 secs |

Potential Assignment 1: 1,2 AND 3,4

| Time To | From | | | |
|---|---|---|---|---|
| | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Assignment 1 | |
|---|---|
| Routes | Est. Travel Time |
| 2 -> 1 | 21 secs |
| 3 -> 4 | 24 secs |
| Total | 45 secs |

Potential Assignment 1: 1,2 AND 3,4

| Time To | | From | | | |
|---|---|---|---|---|---|
| | | 1 | 2 | 3 | 4 |
| | 1 | n/a | 21 secs | 28 secs | 52 secs |
| | 2 | 30 secs | n/a | 45 secs | 28 secs |
| | 3 | 24 secs | 23 secs | n/a | 24 secs |
| | 4 | 48 secs | 28 secs | 24 secs | n/a |

| Potential Assignment 2 | |
|---|---|
| Routes | Est. Travel Time |
| 1 -> 3 | 24 secs |
| 3 -> 1 | 28 secs |
| 2 -> 4 | 28 secs |
| 4 -> 2 | 28 secs |
| Total | 52 secs |

Potential Assignment 2: 1,3 AND 2,4

| Time To | From | | | |
|---|---|---|---|---|
| | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Assignment 3 | |
|---|---|
| Routes | Est. Travel Time |
| 1 -> 4 | (48 secs) |
| 4 -> 1 | 52 secs |
| 2 -> 3 | (23 secs) |
| 3 -> 2 | 45 secs |
| Total | 71 secs |

Potential Assignment 3: 1,4 AND 2,3

Problem: Two Trucks at Location 1 for Visiting Three Locations (2,3,4)

| | From | | | |
|---|---|---|---|---|
| | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

Time To

| Potential Assignment 1 | | |
|---|---|---|
| Truck | Routes | Est. Travel Time |
| 1 | 1 -> 2 -> 3 | (53 secs) |
| 1 | 1 -> 3 -> 2 | 69 secs |
| 2 | 1 -> 4 | (48 secs) |
| Total | Preferred Routes | 101 secs |

Potential Assignment 1: 2,3 AND 4 weightedEstVal = weight * assignmentEstTime

FIG. 86

$$normalizedEstVal = \frac{assignmentEstTime}{minEstTime}$$

FIG. 88

Constraints and Penalties

Constraint: Route does not include road with ▽ | Curviness ▽ | >= ▽ | 1.05

Penalty: 3 points | If >= ▽

Add Constraint

Save | Cancel

FIG. 91

Constraints and Penalties

1 Constraint: Route does not include road with ▽ | Curviness ▽ | >= ▽ | 1.05

Penalty: 3 points | For Every ▽ | 0.05 | over | 1.00

*Add Constraint*

Save | Cancel

*FIG. 92*

$$Penalty_n = \frac{points}{100}$$

FIG. 93A $$adjustedVal = weightedEstVal + \sum Penalty_n$$

FIG. 93B $$adjustedVal = normalizedEstVal + \sum Penalty_n$$

FIG. 93C

Potential Assignment 3: 3,4 AND 2

Potential Assignment 3

| Truck | Routes | Est. Travel Time | Penalty | Penalty Val. |
|---|---|---|---|---|
| 1 | 1 -> 3 -> 4 | 48 secs | 6 points | 0.06 |
| 1 | 1 -> 4 -> 3 | 72 secs | 6 points | 0.06 |
| 2 | 1 -> 2 | 30 secs | 0 points | 0.06 |

Problem: Two Trucks at Location 1 for Visiting Three Locations (2,3,4)

| | | Potential Solutions | | | | |
|---|---|---|---|---|---|---|
| Solution No. | Assign. No. | Routes | T. Est. Time | N. Est. Val. | Pen. Val. | Adj. Val. |
| 1 | 1 | 1 -> 2 -> 3 AND 1 -> 4 | 101 secs | 1.295 | 0.060 | 1.355 |
| 2 | 1 | 1 -> 3 -> 2 AND 1 -> 4 | 117 secs | 1.500 | 0.060 | 1.560 |
| 3 | 2 | 1 -> 2 -> 4 AND 1 -> 3 | 82 secs | 1.051 | 0.000 | 1.051 |
| 4 | 2 | 1 -> 4 -> 2 AND 1 -> 3 | 100 secs | 1.282 | 0.000 | 1.282 |
| 5 | 3 | 1 -> 3 -> 4 AND 1 -> 2 | 78 secs | 1.000 | 0.060 | 1.060 |
| 6 | 3 | 1 -> 3 -> 4 AND 1 -> 2 | 102 secs | 1.307 | 0.060 | 1.367 |

1 -> 4

| Path No. | Path | Total Est. Trav. Time | WEVal | PenVal | AdjVal |
|---|---|---|---|---|---|
| 1 | $\vec{FB} + \vec{BA} + \vec{AC}$ | 48 seconds | 0.800 | 0.060 | 0.860 |
| 2 | $\vec{FB} + \vec{BA} + \vec{AD} + \vec{DC}$ | 51 seconds | 0.850 | 0.000 | (0.850) |
| 3 | $\vec{FB} + \vec{BE} + \vec{ED} + \vec{DC}$ | 58 seconds | 0.966 | 0.000 | 0.966 |
| 4 | $\vec{FB} + \vec{BE} + \vec{ED} + \vec{DA} + \vec{AC}$ | 77 seconds | 1.283 | 0.060 | 1.343 |

Weighted Est. Val = Total Est. Trav. Time * timeWeight
timeWeight = (1 / 60)

AdjVal = (WEVal + PenVal)

AdjVal To

| | | From | | | |
|---|---|---|---|---|---|
| | | 1 | 2 | 3 | 4 |
| | 1 | n/a | 0.350 | 0.467 | 0.926 |
| | 2 | 0.500 | n/a | 0.750 | 0.467 |
| | 3 | 0.400 | 0.383 | n/a | 0.460 |
| | 4 | 0.850 | 0.467 | 0.450 | n/a |

| Potential Assignment 1 | | |
|---|---|---|
| Truck | Routes | AdjVal |
| 1 | 1 -> 2 -> 3 | (0.883) |
| 1 | 1 -> 3 -> 2 | 1.150 |
| 2 | 1 -> 4 | (0.850) |
| Total | Preferred Routes | 1.733 |

Potential Assignment 1: 2,3 AND 4

Problem: Two Trucks at Location 1 for Visiting Three Locations (2,3,4)

| Potential Solutions | | | |
|---|---|---|---|
| Solution No. | Assign. No. | Routes | Adj. Val. |
| 1 | 1 | 1 -> 2 -> 3 AND 1 -> 4 | 1.733 |
| 2 | 1 | 1 -> 3 -> 2 AND 1 -> 4 | 2.883 |
| 3 | 2 | 1 -> 2 -> 4 AND 1 -> 3 | 1.367 |
| 4 | 2 | 1 -> 4 -> 2 AND 1 -> 3 | 1.717 |
| 5 | 3 | 1 -> 3 -> 4 AND 1 -> 2 | 1.350 |
| 6 | 3 | 1 -> 3 -> 4 AND 1 -> 2 | 1.810 |

1 -> 4

Potential Path 1: $\vec{FB} + \vec{BA} + \vec{AC}$

| Potential Path 1 | | | | |
|---|---|---|---|---|
| Path Portion | Est. Travel Time | WEVal | PenVal | AdjVal |
| $\vec{FB}$ | 5 seconds | 0.083 | 0.000 | 0.083 |
| Straight from $\vec{FB}$ onto $\vec{BA}$ | 4 seconds | 0.066 | 0.000 | 0.066 |
| $\vec{BA}$ | 8 seconds | 0.133 | 0.000 | 0.133 |
| Straight from $\vec{BA}$ onto $\vec{AC}$ | 7 seconds | 0.116 | 0.000 | 0.166 |
| $\vec{AC}$ | 24 seconds | 0.400 | 0.060 | 0.460 |
| Total | 48 seconds | 0.800 | 0.060 | 0.860 |

|  | | From | | | |
|---|---|---|---|---|---|
|  |  | 1 | 2 | 3 | 4 |
| Distance To | 1 | n/a | 374 feet (EDE) |  |  |
|  | 2 | 374 feet (EDE) | n/a |  |  |
|  | 3 |  |  | n/a |  |
|  | 4 |  |  |  | n/a |

*FIG. 105*

| Distance To | | From | | | |
|---|---|---|---|---|---|
| | | 1 | 2 | 3 | 4 |
| | 1 | n/a | 374 feet (EDE) | 521 feet (EDE) | |
| | 2 | 374 feet (EDE) | n/a | | |
| | 3 | 521 feet (EDE) | | n/a | |
| | 4 | | | | n/a |

FIG. 107

|  | From | | | |
|---|---|---|---|---|
| Distance To | 1 | 2 | 3 | 4 |
| 1 | n/a | 374 feet (EDE) | 521 feet (EDE) | 1139 feet (EDE) |
| 2 | 374 feet (EDE) | n/a | 366 feet (EDE) | 812 feet (EDE) |
| 3 | 521 feet (EDE) | 366 feet (EDE) | n/a | 655 feet (EDE) |
| 4 | 1139 feet (EDE) | 812 feet (EDE) | 655 feet (EDE) | n/a |

*FIG. 108*

|  |  | \multicolumn{4}{c}{From} |  |  |  |
|---|---|---|---|---|---|
|  |  | 1 | 2 | 3 | 4 |
| Distance To | 1 | n/a | 374 feet (EDE) | 521 feet (EDE) | 1139 feet (EDE) |
|  | 2 | 374 feet (EDE) | n/a | 366 feet (EDE) | 812 feet (EDE) |
|  | 3 | 521 feet (EDE) | 366 feet (EDE) | n/a | 655 feet (EDE) |
|  | 4 | 1139 feet (EDE) | 812 feet (EDE) | 655 feet (EDE) | n/a |
| Time To | 1 | n/a | 14 secs (EDE) | 20 secs (EDE) | 44 secs (EDE) |
|  | 2 | 14 secs (EDE) | n/a | 14 secs (EDE) | 32 secs (EDE) |
|  | 3 | 20 secs (EDE) | 14 secs (EDE) | n/a | 26 secs (EDE) |
|  | 4 | 44 secs (EDE) | 32 secs (EDE) | 26 secs (EDE) | n/a |

*FIG. 109*

| Time To | From | | | |
|---|---|---|---|---|
| | | 1 | 2 | 3 | 4 |
| 1 | n/a | 14 secs (EDE) | 20 secs (EDE) | 44 secs (EDE) |
| 2 | 14 secs (EDE) | n/a | 14 secs (EDE) | 32 secs (EDE) |
| 3 | 20 secs (EDE) | 14 secs (EDE) | n/a | 26 secs (EDE) |
| 4 | 44 secs (EDE) | 32 secs (EDE) | 26 secs (EDE) | n/a |

| Potential Route 1 | |
|---|---|
| Route Portion | Est. Travel Time |
| 1 -> 2 | 14 secs |
| 2 -> 3 | 14 secs |
| 3 -> 4 | 26 secs |
| Total | 54 secs |

Potential Route 1: 1 -> 2 -> 3 -> 4

|   | From |   |   |   |
|---|---|---|---|---|
|   | 1 | 2 | 3 | 4 |
| Time To 1 | n/a | 14 secs (EDE) | 20 secs (EDE) | 44 secs (EDE) |
| 2 | 14 secs (EDE) | n/a | 14 secs (EDE) | 32 secs (EDE) |
| 3 | 20 secs (EDE) | 14 secs (EDE) | n/a | 26 secs (EDE) |
| 4 | 44 secs (EDE) | 32 secs (EDE) | 26 secs (EDE) | n/a |

| Potential Route 2 | |
|---|---|
| Route Portion | Est. Travel Time |
| 1 -> 3 | 20 secs |
| 3 -> 4 | 26 secs |
| 4 -> 2 | 32 secs |
| Total | 78 secs |

Potential Route 2: 1 -> 3 -> 4 -> 2

| Route No. | Route | Total Est. Time |
|---|---|---|
| 1 | 1 -> 2 -> 3 -> 4 | 54 secs |
| 2 | 1 -> 3 -> 4 -> 2 | 78 secs |
| 3 | 4 -> 3 -> 2 -> 1 | 54 secs |
| 4 | 2 -> 4 -> 3 -> 1 | 78 secs |

*FIG. 112*

|  | | From | | | |
|---|---|---|---|---|---|
|  | | 1 | 2 | 3 | 4 |
| Distance To | 1 | n/a | 374 feet (EDE) | 521 feet (EDE) | 1139 feet (EDE) |
| | 2 | 429 feet | n/a | 366 feet (EDE) | 812 feet (EDE) |
| | 3 | 521 feet (EDE) | 366 feet (EDE) | n/a | 655 feet (EDE) |
| | 4 | 1139 feet (EDE) | 812 feet (EDE) | 655 feet (EDE) | n/a |
| Time To | 1 | n/a | 14 secs (EDE) | 20 secs (EDE) | 44 secs (EDE) |
| | 2 | 30 secs | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

*FIG. 113*

| | | From | | | |
|---|---|---|---|---|---|
| | | 1 | 2 | 3 | 4 |
| Time To | 1 | n/a | 14 secs (EDE) | 20 secs (EDE) | 44 secs (EDE) |
| | 2 | 14 secs (EDE) | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

| Potential Assignment 1 | |
|---|---|
| Routes | Est. Travel Time |
| 1,2 | 14 secs |
| 3,4 | 26 secs |
| Total | 40 secs |

Potential Assignment 1: 1,2 AND 3,4

| | | From | | | |
|---|---|---|---|---|---|
| | | 1 | 2 | 3 | 4 |
| Time To | 1 | n/a | 14 secs (EDE) | 20 secs (EDE) | 44 secs (EDE) |
| | 2 | 14 secs (EDE) | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

| Potential Assignment 2 | |
|---|---|
| Routes | Est. Travel Time |
| 1,3 | 20 secs |
| 2,4 | 32 secs |
| Total | 52 secs |

Potential Assignment 2: 1,3 AND 2,4

| Time To | | From | | | |
|---|---|---|---|---|---|
| | | 1 | 2 | 3 | 4 |
| | 1 | n/a | 14 secs (EDE) | 20 secs (EDE) | 44 secs (EDE) |
| | 2 | 14 secs (EDE) | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

| Potential Assignment 3 | |
|---|---|
| Routes | Est. Travel Time |
| 1,4 | 44 secs |
| 2,3 | 14 secs |
| Total | 58 secs |

Potential Assignment 3: 1,4 AND 2,3

| Assignment No. | Assignment | Total Est. Time |
|---|---|---|
| 1 | 1,2 AND 3,4 | 40 secs |
| 2 | 1,3 AND 2,4 | 52 secs |
| 3 | 1,4 AND 2,3 | 58 secs |

FIG. 117

From

| Time To | 1 | 2 | 3 | 4 |
|---|---|---|---|---|
| 1 | n/a | 21 secs | 28 secs | 52 secs |
| 2 | 30 secs | n/a | 45 secs | 28 secs |
| 3 | 24 secs | 23 secs | n/a | (24 secs) |
| 4 | 48 secs | 28 secs | (24 secs) | n/a |

| Order | Est. Travel Time |
|---|---|
| 3 -> 4 | (24 secs) |
| 4 -> 3 | 24 secs |

Possible Orders: 3 -> 4 OR 4 -> 3

```
int[] bestFit = new int[intervals];

for (int j=0; i<=intervals; i++) {
    theSum = 0;
    foreach (roadSegment r in theSegments) {
        theSum = theSum + r[i].normalizedAvgTravelTime;
    }
    bestFit[j] = theSum / intervals;
}
```

FIG. 127

$$\text{normalizedAverageTravelTime}(A \rightarrow C, 0{:}00 - 0{:}59) = 0.9$$

$$\text{normalizedAverageTravelTime}(C \rightarrow A, 0{:}00 - 0{:}59) = 0.85$$

$$\text{normalizedAverageTravelTime}(A \rightarrow D, 0{:}00 - 0{:}59) = 0.7$$

$$\text{normalizedBestFit}(0{:}00 - 0{:}59) = \frac{0.9 + 0.85 + 0.7}{3} = \boxed{0.81\overline{6}}$$

FIG. 128 normalizedBestFit(0:00 - 0:59) = 0.81̄6 normalizedBestFit(1:00 - 1:59) = 0.81̄6 normalizedBestFitDelta(0:00 - 0:59 -> 1:00 - 1:59) = 0.0 normalizedBestFit(1:00 - 1:59) = 0.81̄6 normalizedBestFit(2:00 - 2:59) = 0.9 normalizedBestFitDelta(1:00 - 1:59 -> 2:00 - 2:59) = 0.08̄3 secondOrderDelta(0:00 - 0:59 -> 1:00 - 1:59, 1:00 - 1:59 -> 2:00 - 2:59) = 0.08̄3 - 0.0 = (0.08̄3)

*FIG. 132* secondOrderDelta(0:00 - 0:59 -> 1:00 - 1:59, 1:00 - 1:59 -> 2:00 - 2:59) = 0.08$\overline{3}$ minThreshold = 0.08

0.08$\overline{3}$ > 0.08 secondOrderDelta(0:00 - 0:59 -> 1:00 - 1:59, 1:00 - 1:59 -> 2:00 - 2:59) > minThreshold

FIG. 133

```
List<jTime> theList = newList<jTime>();

foreach (jTime thisTime in bestFit.getTimes()) {
    curValue = bestFit.getValueAt(thisTime);
    preDelta = curValue - bestFit.getValueAt(thisTime - theInterval);
    postDelta = bestFit.getValueAt(thisTime + theInterval) - curValue;
    curSecondDelta = postDelta - preDelta;
    if (Abs(curSecondDelta) > minThreshold) {
        theList.Add(thisTime);
    }
}
```

FIG. 137

UTILIZING A GEO-LOCATOR SERVICE AND ZONE SERVERS TO REDUCE COMPUTER RESOURCE REQUIREMENTS FOR DETERMINING HIGH QUALITY SOLUTIONS TO ROUTING PROBLEMS

The present application hereby incorporates herein by reference the entire disclosure of Appendices A-D.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to software for providing solutions to routing problems, such as vehicle routing problems.

Software which is configured to provide solutions to vehicle routing problems is increasingly ubiquitous. Most smart phones offer access to simplistic routing software which can be used to generate and display an optimized route for a user's vehicle.

However, conventional approaches utilized by typical routing software present a number of problems, particularly when considering determination of routing solutions for more complicated or complex routing problems, such as those involving a large number of locations or a large geographical area.

Needs exist for improvement in providing solutions to routing problems. One or more of these needs and other needs are addressed by one or more aspects of the present invention.

SUMMARY OF THE INVENTION

The present invention includes many aspects and features. Moreover, while many aspects and features relate to, and are described in, the context of vehicle routing, the present invention is not limited to use only in this context, as will become apparent from the following summaries and detailed descriptions of aspects, features, and one or more embodiments of the present invention.

One aspect relates to a method involving utilizing a geo-locator service and zone servers to reduce server resource requirements for determining optimized solutions to routing problems. The method includes maintaining, by a geo-locator service at a first server, data corresponding to a plurality of defined zones each corresponding to a geographic area, wherein each defined zone has a defined boundary, a plurality of the defined zones each overlap with other of the defined zones, and a plurality of the defined zones are each located entirely within another defined zone. The method further includes maintaining a plurality of servers, each server including road network data for a respective one of the zones of the plurality of defined zones; electronically communicating, from a requesting device to a geo-locator service at a first server, a request comprising information for a plurality of locations involved in a routing problem; electronically determining, by the geo-locator service based on the list of locations and the maintained list of defined zones, a smallest defined zone that contains all of the locations of the list of locations; electronically returning, by the geo-locator service to the requesting device in response to the received request, data comprising an indication of the determined zone and an identifier for the zone server corresponding to the determined zone; electronically communicating, from the requesting device to the zone server corresponding to the determined zone based on the returned identifier for the zone server, problem data for the routing problem comprising data for the plurality of locations involved in the routing problem; electronically determining, at the zone server corresponding to the determined zone, a set of one or more optimized solutions to the routing problem using a plurality of calculated travel time estimates accessed from one or more computed shortest path matrices; and returning, from the zone server corresponding to the determined zone to the requesting device, data corresponding to the determined set of one or more optimized solutions to the routing problem. The use of a geo-locator service and zone servers enables the use of servers having less memory which can handle determination of optimized solutions to routing problems involving locations spanning a smaller geographic area even if they are incapable of handling determination of optimized solutions to routing problems involving locations spanning a larger geographic area, and enables efficient assignment of requests to an appropriate server without unduly burdening high value servers having sufficient memory to handle determination of optimized solutions to routing problems involving locations spanning a very large geographic area with determination of optimized solutions to routing problems involving locations spanning a smaller geographic area.

In a feature of this aspect, maintaining, by a geo-locator service at a first server, data corresponding to a plurality of defined zones each corresponding to a geographic area comprises maintaining, for each defined zone, a list of coordinates defining the defined boundary for that zone.

In a feature of this aspect, maintaining, by a geo-locator service at a first server, data corresponding to a plurality of defined zones each corresponding to a geographic area comprises maintaining, for each defined zone, a list of latitude and longitude coordinates defining the defined boundary for that zone.

In a feature of this aspect, electronically communicating, from a requesting device to a geo-locator service at a first server, a request comprising information for a plurality of locations involved in a routing problem comprises electronically communicating coordinates for each of the plurality of locations.

In a feature of this aspect, electronically communicating, from a requesting device to a geo-locator service at a first server, a request comprising information for a plurality of locations involved in a routing problem comprises electronically communicating latitude and longitude coordinates for each of the plurality of locations.

In a feature of this aspect, the returned identifier comprises a server name.

In a feature of this aspect, the returned identifier comprises an internet protocol (IP) address.

In a feature of this aspect, the returned identifier comprises a uniform resource locator (URL).

In a feature of this aspect, the requesting device comprises a computer having a web browser loaded thereon, and wherein electronically communicating, from a requesting device to a geo-locator service at a first server, a request comprising information for a plurality of locations involved in a routing problem comprises electronically communicating via a web browser.

In a feature of this aspect, the requesting device comprises a computer having a web browser loaded thereon, and wherein electronically communicating, from a requesting device to a geo-locator service at a first server, a request comprising information for a plurality of locations involved in a routing problem comprises electronically communicating via hypertext transfer secure protocol (HTTPs).

In a feature of this aspect, the requesting device comprises a desktop computer.

In a feature of this aspect, the requesting device comprises a laptop computer.

In a feature of this aspect, the requesting device comprises a tablet.

In a feature of this aspect, the requesting device comprises a phone.

Another aspect relates to a method involving utilizing a geo-locator service and zone servers to reduce server resource requirements for determining optimized solutions to routing problems. The method includes maintaining, by a geo-locator service at a first server, data corresponding to a plurality of defined zones each corresponding to a geographic area, wherein each defined zone has a defined boundary, a plurality of the defined zones each overlap with other of the defined zones, and a plurality of the defined zones are each located entirely within another defined zone. The method includes maintaining a plurality of servers, each server including road network data for one or more of the zones of the plurality of defined zones; electronically communicating, from a requesting device to a geo-locator service at a first server, a request comprising information for a plurality of locations involved in a routing problem; electronically determining, by the geo-locator service based on the list of locations and the maintained list of defined zones, a smallest defined zone that contains all of the locations of the list of locations; electronically returning, by the geo-locator service to the requesting device in response to the received request, data comprising an identifier for accessing a zone server corresponding to the determined zone; electronically effecting, by the requesting device using the returned identifier for accessing a zone server corresponding to the determined zone, communication of problem data for the routing problem comprising data for the plurality of locations involved in the routing problem; electronically determining, at one or more zone servers corresponding to the determined zone in response to the effected communication of problem data, a set of one or more optimized solutions to the routing problem using a plurality of calculated travel time estimates accessed from one or more computed shortest path matrices; and returning, from the one or more zone servers corresponding to the determined zone to the requesting device, data corresponding to the determined set of one or more optimized solutions to the routing problem. The use of a geo-locator service and zone servers enables the use of servers having less memory which can handle determination of optimized solutions to routing problems involving locations spanning a smaller geographic area even if they are incapable of handling determination of optimized solutions to routing problems involving locations spanning a larger geographic area, and enables efficient assignment of requests to an appropriate server without unduly burdening high value servers having sufficient memory to handle determination of optimized solutions to routing problems involving locations spanning a very large geographic area with determination of optimized solutions to routing problems involving locations spanning a smaller geographic area.

In a feature of this aspect, the requesting device comprises a desktop computer.

In a feature of this aspect, the requesting device comprises a laptop computer.

In a feature of this aspect, the requesting device comprises a tablet.

In a feature of this aspect, the requesting device comprises a phone.

Another aspect relates to a method involving utilizing a geo-locator service and zone servers to reduce server resource requirements for determining optimized solutions to routing problems. The method includes maintaining, by a geo-locator service at a first server, data corresponding to a plurality of defined zones each corresponding to a geographic area, wherein each defined zone has a defined boundary, a plurality of the defined zones each overlap with other of the defined zones, and a plurality of the defined zones are each located entirely within another defined zone. The method further includes maintaining a plurality of servers, each server including road network data for one or more of the zones of the plurality of defined zones; electronically communicating, from a requesting device to a geo-locator service at a first server, a request comprising information for a plurality of locations involved in a routing problem; electronically determining, by the geo-locator service based on the list of locations and the maintained list of defined zones, a smallest defined zone that contains all of the locations of the list of locations; electronically returning, by the geo-locator service to the requesting device in response to the received request, data comprising an identifier for accessing a zone server corresponding to the determined zone; electronically effecting, by the requesting device using the returned identifier for accessing a zone server corresponding to the determined zone, communication of problem data for the routing problem comprising data for the plurality of locations involved in the routing problem; electronically computing, at one or more zone servers corresponding to the determined zone in response to the effected communication of problem data, one or more shortest path matrices comprising shortest path data for directional shortest paths between pairs of locations of the plurality of locations; and returning, from the one or more zone servers corresponding to the determined zone to the requesting device, data corresponding to the computed one or more shortest path matrices. The use of a geo-locator service and zone servers enables the use of servers having less memory which can handle determination of optimized solutions to routing problems involving locations spanning a smaller geographic area even if they are incapable of handling determination of optimized solutions to routing problems involving locations spanning a larger geographic area, and enables efficient assignment of requests to an appropriate server without unduly burdening high value servers having sufficient memory to handle determination of optimized solutions to routing problems involving locations spanning a very large geographic area with determination of optimized solutions to routing problems involving locations spanning a smaller geographic area.

One aspect relates to a graphical user interface method involving one or more graphical user interfaces for providing preferred solutions to multi-objective routing problems. The method includes presenting, to a user via an electronic display associated with an electronic device, a first graphical user interface comprising a map; receiving, from the user via one or more input devices associated with the electronic device, first user input corresponding to identification of one or more locations involved in a routing problem; receiving, from the user via one or more input devices associated with the electronic device, second user input corresponding to engagement with a user interface element configured to access a constraints graphical user interface; displaying, to the user via the electronic display associated with the electronic device, a second graphical user interface comprising one or more user interface elements configured to allow a user to specify one or more constraints and, for each specified constraint, one or more penalties; receiving, from the user via one or more input devices associated with the electronic device, third user input corresponding to definition of one or more constraints, and, for each defined constraint, one or more penalties; and electronically determining, based on the identification of one or more locations involved in the routing problem and the defined constraints and penalties, a plurality of preferred solutions to the routing problem. Such electronic determining comprises generating a plurality of potential solutions to the routing problem, calculating, for each generated solution, an estimated amount of time for traversal of routes involved in that generated solution, a weighted time value based on the calculated estimated amount of time for traversal of routes involved in that generated solution, and an adjusted value involving a sum of the calculated weighted time value for that generated solution and one or more penalty values calculated based on evaluation of features of that generated solution. Such electronic determining further comprises determining the plurality of preferred solutions based on the calculated adjusted values. The method further includes displaying, to the user via the electronic display associated with the electronic device, the determined plurality of preferred solutions, including displaying, for one or more respective displayed solutions of the determined preferred solutions, an indication of one or more constraints violated by each respective displayed solution.

In a feature of this aspect, displaying, to the user via the electronic display associated with the electronic device, the determined plurality of preferred solutions includes displaying, for each displayed solution, an indication of an estimated total travel time for that solution.

In a feature of this aspect, displaying, to the user via the electronic display associated with the electronic device, the determined plurality of preferred solutions includes displaying, for each displayed solution, an indication of an estimated total travel distance for that solution.

In a feature of this aspect, displaying, to the user via the electronic display associated with the electronic device, the determined plurality of preferred solutions includes displaying, for each displayed solution, an indication of an estimated total travel cost for that solution.

In a feature of this aspect, displaying, to the user via the electronic display associated with the electronic device, the determined plurality of preferred solutions includes displaying, for each displayed solution, an indication of estimated total fuel required for that solution.

In a feature of this aspect, displaying, to the user via the electronic display associated with the electronic device, the determined plurality of preferred solutions includes displaying, for each displayed solution, an indication of an estimated total fuel cost for that solution.

In a feature of this aspect, displaying, to the user via the electronic display associated with the electronic device, the determined plurality of preferred solutions includes displaying, for each displayed solution, an indication of an estimated total labor cost for that solution.

Another aspect relates to a graphical user interface method involving one or more graphical user interfaces for providing preferred solutions to multi-objective routing problems. The method includes presenting, to a user via an electronic display associated with an electronic device, a first graphical user interface comprising a map; receiving, from the user via one or more input devices associated with the electronic device, first user input corresponding to identification of one or more locations involved in a routing problem; receiving, from the user via one or more input devices associated with the electronic device, second user input corresponding to engagement with a user interface element configured to access a constraints graphical user interface; displaying, to the user via the electronic display associated with the electronic device, a second graphical user interface comprising one or more user interface elements configured to allow a user to specify one or more constraints and, for each specified constraint, one or more penalties; receiving, from the user via one or more input devices associated with the electronic device, third user input corresponding to definition of one or more constraints, and, for each defined constraint, one or more penalties; and electronically determining, based on the identification of one or more locations involved in the routing problem and the defined constraints and penalties, a plurality of preferred solutions to the routing problem. Such electronic determining comprises generating a plurality of potential solutions to the routing problem, calculating, for each generated solution, one or more penalty values based on evaluation of features of that generated solution, and determining the plurality of preferred solutions based at least in part on one or more calculated penalty values. The method further includes displaying, to the user via the electronic display associated with the electronic device, the determined plurality of preferred solutions, including displaying, for one or more respective displayed solutions of the determined preferred solutions, an indication of one or more constraints violated by each respective displayed solution.

Another aspect relates to a method providing a technical solution to the technical problem of electronically determining preferred solutions to multi-objective routing problems. The method includes receiving, at a server, problem data for a routing problem comprising coordinates for one or more locations involved in the routing problem, and constraint data defining one or more constraints for the routing problem and one or more penalties associated with each constraint. The method further includes electronically determining, utilizing the one or more locations involved in the routing problem and the defined constraints and penalties, a plurality of preferred solutions to the routing problem. Such electronic determining comprises generating a plurality of potential solutions to the routing problem, and calculating, for each generated solution, an estimated amount of time for traversal of routes involved in that generated solution, a weighted time value based on the calculated estimated amount of time for traversal of routes involved in that generated solution, and an adjusted value involving a sum of the calculated weighted time value for that generated solution and one or more penalty values calculated based on evaluation of features of that generated solution. Such electronic determining further comprises determining the plurality of preferred solutions based on the calculated adjusted values. The method further includes returning, from the server, data corresponding to the determined plurality of preferred solutions to the routing problem.

In a feature of this aspect, returning, from the server, data corresponding to the determined plurality of preferred solutions to the routing problem comprises returning the calculated estimated amount of time for traversal of routes for each solution of the determined plurality of preferred solutions.

In a feature of this aspect, electronically determining, utilizing the one or more locations involved in the routing problem and the defined constraints and penalties, the plurality of preferred solutions to the routing problem comprises calculating, for each generated solution, an estimated total travel distance for that solution, and returning, from the server, data corresponding to the determined plurality of preferred solutions to the routing problem comprises returning the calculated estimated total travel distance for each solution of the determined plurality of preferred solutions.

In a feature of this aspect, electronically determining, utilizing the one or more locations involved in the routing problem and the defined constraints and penalties, the plurality of preferred solutions to the routing problem comprises calculating, for each generated solution, an estimated total fuel cost for that solution, and returning, from the server, data corresponding to the determined plurality of preferred solutions to the routing problem comprises returning the calculated estimated total fuel cost for each solution of the determined plurality of preferred solutions.

In a feature of this aspect, electronically determining, utilizing the one or more locations involved in the routing problem and the defined constraints and penalties, the plurality of preferred solutions to the routing problem comprises calculating, for each generated solution, an estimated total labor cost for that solution, and returning, from the server, data corresponding to the determined plurality of preferred solutions to the routing problem comprises returning the calculated estimated total labor cost for each solution of the determined plurality of preferred solutions.

In a feature of this aspect, electronically determining, utilizing the one or more locations involved in the routing problem and the defined constraints and penalties, the plurality of preferred solutions to the routing problem comprises calculating, for each generated solution, an estimated total cost for that solution, and returning, from the server, data corresponding to the determined plurality of preferred solutions to the routing problem comprises returning the calculated estimated total cost for each solution of the determined plurality of preferred solutions.

One aspect relates to a method involving accelerating the electronic determination of optimized solutions to routing problems by leveraging simplified travel time approximations. The method includes receiving, at a server, problem data for a routing problem comprising information for one or more locations involved in the routing problem; and electronically populating a shortest path matrix with first approximation travel time estimates. Such electronic populating comprises calculating, for each respective possible pair of locations involved in the routing problem, a respective first approximation travel time estimate. Such calculating comprises calculating a respective straight line distance estimate between the respective pair of locations, calculating a deformed distance value representing deformation of the calculated respective straight line distance estimate based on one or more curvature values, and calculating the respective first approximation travel time estimate based on the deformed distance value. Such electronic populating further comprises populating an area of the shortest path matrix corresponding to travel from a respective first location of the respective possible pair of locations to a respective second location of the respective possible pair of locations with the calculated respective first approximation travel time estimate, and populating an area of the shortest path matrix corresponding to travel from the respective second location of the respective possible pair of locations to the respective first location of the respective possible pair of locations with the calculated respective first approximation travel time estimate. The method further includes beginning to electronically determine one or more optimized solutions to the routing problem using one or more of the calculated first approximation travel time estimates contained in the shortest path matrix, while concurrently, in parallel, electronically updating the shortest path matrix with second travel time estimates by calculating, for each of one or more respective ordered pairs of locations involved in the routing problem, a respective second travel time estimate for a shortest path for travel from a respective first location of the respective ordered pair of locations to a respective second location of the respective ordered pair of locations, such calculated respective second travel time estimate being calculated based on road network data, and updating an area of the shortest path matrix corresponding to travel from the respective first location of the respective ordered pair of locations to the respective second location of the respective ordered pair of locations with the calculated respective second travel time estimate. The method further includes completing electronic determination of a set of one or more optimized solutions to the routing problem using one or more of the calculated second travel time estimates accessed from the shortest path matrix; and returning, from the server, data corresponding to the determined set of one or more optimized solutions to the routing problem. The use of first approximation travel time estimates allows for more rapid beginning of a process for electronically determining one or more optimized solutions to the routing problem as compared to having to wait for computation of second travel time estimates for every ordered pair of locations involved in the routing problem, thus allowing for more rapid determination of the determined set of one or more optimized solutions.

In a feature of this aspect, the information for one or more locations involved in the routing problem comprises coordinates for one or more locations involved in the routing problem.

In a feature of this aspect, the information for one or more locations involved in the routing problem comprises latitude and longitude coordinates for one or more locations involved in the routing problem In a feature of this aspect, with respect to calculating, for each respective possible pair of locations involved in the routing problem, the respective first approximation travel time estimate, such calculating comprises calculating the respective straight line distance estimate between the respective pair of locations using the Haversine formula.

In a feature of this aspect, with respect to calculating, for each respective possible pair of locations involved in the routing problem, the respective first approximation travel time estimate, calculating the deformed distance value representing deformation of the calculated respective straight line distance estimate based on one or more curvature values involves calculating the deformed distance value based on one or more curviness values for an area of a road network.

In a feature of this aspect, with respect to calculating, for each respective possible pair of locations involved in the routing problem, the respective first approximation travel time estimate, calculating the deformed distance value representing deformation of the calculated respective straight line distance estimate based on one or more curvature values involves calculating the deformed distance value based on one or more curviness values for one or more road segments.

In a feature of this aspect, with respect to calculating, for each respective possible pair of locations involved in the routing problem, the respective first approximation travel time estimate, calculating the deformed distance value representing deformation of the calculated respective straight line distance estimate based on one or more curvature values involves calculating the deformed distance value based on one or more curviness values for an area of a road network proximate a location of the respective possible pair of locations.

In a feature of this aspect, with respect to calculating, for each respective possible pair of locations involved in the routing problem, the respective first approximation travel time estimate, calculating the deformed distance value representing deformation of the calculated respective straight line distance estimate based on one or more curvature values involves calculating the deformed distance value based on one or more curviness values for an area of a road network proximate both locations of the respective possible pair of locations.

In a feature of this aspect, with respect to calculating, for each respective possible pair of locations involved in the routing problem, the respective first approximation travel time estimate, calculating the deformed distance value representing deformation of the calculated respective straight line distance estimate based on one or more curvature values involves calculating the deformed distance value based on one or more curviness values for an area of a road network located between the locations of the respective possible pair of locations.

In a feature of this aspect, with respect to calculating, for each respective possible pair of locations involved in the routing problem, the respective first approximation travel time estimate, calculating the deformed distance value representing deformation of the calculated respective straight line distance estimate based on one or more curvature values involves calculating the deformed distance value based on one or more curviness values for an area of a road network proximate both locations of the respective possible pair of locations and one or more curviness values for an area of a road network located between the locations of the respective possible pair of locations.

Another aspect relates to a method involving accelerating the electronic determination of optimized solutions to routing problems by leveraging simplified travel time approximations. The method includes receiving, at a server, problem data for a routing problem comprising coordinates for one or more locations involved in the routing problem; and electronically populating a first shortest path matrix with first approximation travel time estimates. Such electronically populating the first shortest path matrix comprises calculating, for each respective possible pair of locations involved in the routing problem, a respective first approximation travel time estimate, such calculating comprising calculating a respective straight line distance estimate between the respective pair of locations, calculating a deformed distance value representing deformation of the calculated respective straight line distance estimate based on one or more curvature values, and calculating the respective first approximation travel time estimate based on the deformed distance value. Such electronically populating the first shortest path matrix further comprises populating an area of the first shortest path matrix corresponding to travel from a respective first location of the respective possible pair of locations to a respective second location of the respective possible pair of locations with the calculated respective first approximation travel time estimate, and populating an area of the first shortest path matrix corresponding to travel from the respective second location of the respective possible pair of locations to the respective first location of the respective possible pair of locations with the calculated respective first approximation travel time estimate. The method further comprises beginning to electronically determine one or more optimized solutions to the routing problem using one or more of the calculated first approximation travel time estimates contained in the shortest path matrix, while concurrently, in parallel, electronically populating a second shortest path matrix with second travel time estimates by calculating, for each of one or more respective ordered pairs of locations involved in the routing problem, a respective second travel time estimate for a shortest path for travel from a respective first location of the respective ordered pair of locations to a respective second location of the respective ordered pair of locations, such calculated respective second travel time estimate being calculated based on road network data, and populating an area of the second shortest path matrix corresponding to travel from the respective first location of the respective ordered pair of locations to the respective second location of the respective ordered pair of locations with the calculated respective second travel time estimate. The method further comprises completing electronic determination of a set of one or more optimized solutions to the routing problem using one or more of the calculated second travel time estimates accessed from the second shortest path matrix; and returning, from the server, data corresponding to the determined set of one or more optimized solutions to the routing problem. The use of first approximation travel time estimates allows for more rapid beginning of a process for electronically determining one or more optimized solutions to the routing problem as compared to having to wait for computation of second travel time estimates for every ordered pair of locations involved in the routing problem, thus allowing for more rapid determination of the determined set of one or more optimized solutions.

One aspect relates to a method involving accelerating the electronic determination of optimized solutions to routing problems by utilizing determined optimal time windows for precomputing optimal path matrices to reduce computer resource usage. The method includes receiving, at a server, problem data for a routing problem comprising information for one or more locations involved in the routing problem; electronically accessing traffic data for a first set of road segments in one or more areas of a road network encompassing the one or more locations, the traffic data comprising speed information for travel along the road segments at various times of day; electronically calculating, based on the accessed traffic data, data for a best fit line representing a best fit for the accessed traffic data, the data for the best fit line including, for each of various respective times of day, a respective best fit speed value for that respective time of day; electronically defining, based on the calculated data for the best fit line, a plurality of traffic windows each having a start time and an end time during a day, electronically defining the plurality of traffic windows comprising electronically determining a plurality of inflection points representing times of day at which a change in a rate of change of the best fit line exceeds a minimum threshold, and electronically defining a start time and an end time for each traffic window of the plurality of traffic windows based on the determined plurality of inflection points, each inflection point representing an end time for one traffic window and a start time for another traffic window. The method further includes electronically populating one or more shortest path matrices with travel time estimates for each defined traffic window by, for each respective defined traffic window, calculating, for each of one or more respective ordered pairs of locations involved in the routing problem, a respective travel time estimate for a shortest path for travel from a respective first location of the respective ordered pair of locations to a respective second location of the respective ordered pair of locations, such calculated respective travel time estimate being calculated based on road network data and traffic data for that respective defined traffic window; electronically determining a set of one or more optimized solutions to the routing problem using a plurality of the calculated travel time estimates accessed from the one or more shortest path matrices; and returning, from the server, data corresponding to the determined set of one or more optimized solutions to the routing problem. The use of traffic windows defined based on changes in rates of change of speeds for traffic on road segments allows for more rapid determination of the set of one or more optimized solutions as compared to requiring on-demand, in-process determination of a shortest path for a particular time during comparison of paths or routes performed as part of a process for determining optimized solutions to the routing problem.

In a feature of this aspect, electronically determining a plurality of inflection points representing times of day at which a change in a rate of change of the best fit line exceeds a minimum threshold comprises applying statistical methods to determine the plurality of inflection points.

In a feature of this aspect, electronically determining a plurality of inflection points representing times of day at which a change in a rate of change of the best fit line exceeds a minimum threshold comprises calculating one or more second derivatives of the best fit line.

In a feature of this aspect, electronically defining a start time and an end time for each traffic window of the plurality of traffic windows based on the determined plurality of inflection points comprises automatically defining a start time for a first traffic window proximate a certain time of day.

In a feature of this aspect, electronically defining a start time and an end time for each traffic window of the plurality of traffic windows based on the determined plurality of inflection points comprises automatically defining a start time for a first traffic window proximate midnight.

In a feature of this aspect, electronically defining a start time and an end time for each traffic window of the plurality of traffic windows based on the determined plurality of inflection points comprises automatically defining an end time for a last traffic window proximate a certain time of day.

In a feature of this aspect, electronically defining a start time and an end time for each traffic window of the plurality of traffic windows based on the determined plurality of inflection points comprises automatically defining an end time for a last traffic window proximate midnight.

In a feature of this aspect, electronically defining a start time and an end time for each traffic window of the plurality of traffic windows based on the determined plurality of inflection points comprises defining a traffic window which overlaps from one day to a next day.

In a feature of this aspect, electronically populating one or more shortest path matrices with travel time estimates for each defined traffic window comprises electronically populating a different shortest path matrix for each defined traffic window.

In a feature of this aspect, electronically populating one or more shortest path matrices with travel time estimates for each defined traffic window comprises electronically populating a single shortest path matrix with travel time estimates for each defined traffic window.

Another aspect relates to a method involving accelerating the electronic determination of optimized solutions to routing problems by utilizing determined optimal time windows for precomputing optimal path matrices to reduce computer resource usage. The method includes receiving, at a server, problem data for a routing problem comprising information for one or more locations involved in the routing problem; electronically accessing traffic data for a first set of road segments in one or more areas of a road network encompassing the one or more locations, the traffic data comprising travel time information for travel along the road segments at various times of day; electronically calculating, based on the accessed traffic data, data for a best fit line representing a best fit for the accessed traffic data, the data for the best fit line including, for each of various respective times of day, a respective best fit travel time value for that respective time of day; and electronically defining, based on the calculated data for the best fit line, a plurality of traffic windows each having a start time and an end time during a day, electronically defining the plurality of traffic windows comprising electronically determining a plurality of inflection points representing times of day at which a change in a rate of change of the best fit line exceeds a minimum threshold, and electronically defining a start time and an end time for each traffic window of the plurality of traffic windows based on the determined plurality of inflection points, each inflection point representing an end time for one traffic window and a start time for another traffic window. The method further includes electronically populating one or more shortest path matrices with travel time estimates for each defined traffic window by, for each respective defined traffic window, calculating, for each of one or more respective ordered pairs of locations involved in the routing problem, a respective travel time estimate for a shortest path for travel from a respective first location of the respective ordered pair of locations to a respective second location of the respective ordered pair of locations, such calculated respective travel time estimate being calculated based on road network data and traffic data for that respective defined traffic window; electronically determining a set of one or more optimized solutions to the routing problem using a plurality of the calculated travel time estimates accessed from the one or more shortest path matrices; and returning, from the server, data corresponding to the determined set of one or more optimized solutions to the routing problem. The use of traffic windows defined based on changes in rates of change of travel times for traffic on road segments allows for more rapid determination of the set of one or more optimized solutions as compared to requiring on-demand, in-process determination of a shortest path for a particular time during comparison of paths or routes performed as part of a process for determining optimized solutions to the routing problem.

Another aspect relates to a method involving accelerating the electronic determination of optimized solutions to routing problems by utilizing determined optimal time windows for precomputing optimal path matrices to reduce computer resource usage. The method includes receiving, at a server, problem data for a routing problem comprising information for one or more locations involved in the routing problem; electronically accessing traffic data for a first set of road segments in one or more areas of a road network encompassing the one or more locations, the traffic data comprising speed information for travel along the road segments at various times of day; and electronically defining, based on the accessed traffic data for the first set of road segments, a plurality of traffic windows each having a start time and an end time during a day, electronically defining the plurality of traffic windows comprising electronically applying statistical methods to the accessed traffic data to determine a plurality of inflection points which represent times of day at which a change in a rate of change of speeds exceeds a minimum threshold, and electronically defining a start time and an end time for each traffic window of the plurality of traffic windows based on the determined plurality of inflection points, each inflection point representing an end time for one traffic window and a start time for another traffic window. The method further includes electronically populating one or more shortest path matrices with travel time estimates for each defined traffic window by, for each respective defined traffic window, calculating, for each of one or more respective ordered pairs of locations involved in the routing problem, a respective travel time estimate for a shortest path for travel from a respective first location of the respective ordered pair of locations to a respective second location of the respective ordered pair of locations, such calculated respective travel time estimate being calculated based on road network data and traffic data for that respective defined traffic window; electronically determining a set of one or more optimized solutions to the routing problem using a plurality of the calculated travel time estimates accessed from the one or more shortest path matrices; and returning, from the server, data corresponding to the determined set of one or more optimized solutions to the routing problem. The use of traffic windows defined based on changes in rates of change of speeds for traffic on road segments allows for more rapid determination of the set of one or more optimized solutions as compared to requiring on-demand, in-process determination of a shortest path for a particular time during comparison of paths or routes performed as part of a process for determining optimized solutions to the routing problem.

Another aspect relates to one or more non-transitory computer readable media containing computer executable instructions executable by one or more processors for performing a disclosed method.

Another aspect relates to a system for performing a disclosed method.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 7 illustrates a table of road segments from FIG. 6 and their corresponding distances;

FIG. 12 illustrates total distance summations for potential paths;

FIG. 13 illustrates a shortest path identification from the distance summations;

FIG. 15 illustrates a table of estimated travel times based on speed limits of the road segments;

FIG. 16 illustrates calculation of estimated travel times for potential paths;

FIG. 17 illustrates estimated travel times and total distances for potential paths;

FIG. 18 fancifully illustrates determination of a preferred path;

FIG. 19 fancifully illustrates determination of a preferred path using estimated travel times and a number of turns;

FIGS. 20-24 illustrate calculation of total estimated travel time for the paths of FIGS. 8-11, updated to account for turning time;

FIGS. 25-29 illustrate calculation of total estimated travel time for the paths of FIGS. 8-11, updated to account for time at various types of intersections and turning time;

FIG. 31 illustrates exemplary average travel time values calculated for road segments based on historical data;

FIG. 32 illustrates exemplary average historical travel time values calculated for navigation from one road segment to another;

FIG. 33-34 illustrate exemplary average travel times for windows of time throughout a day;

FIG. 38 illustrates exemplary travel times for the road segments illustrated in FIG. 37;

FIG. 40 illustrates a calculation of a preference value for a path utilizing a distance weight and a time weight;

FIG. 41 illustrates a calculation of such a preference value for each potential path of FIGS. 8-11;

FIG. 42 illustrates a calculation of normalized time and distance values, and a preference value;

FIG. 43 illustrates exemplary C Sharp style pseudocode for calculation of a preference value based on normalized time and distance values;

FIG. 51 illustrates a simple two-dimensional grid for distance values for shortest paths between each location;

FIG. 52 illustrates a grid for an exemplary scenario in which the distance between any location and itself would be zero;

FIG. 55 illustrates calculation of total distance values for each path in FIG. 53 and FIG. 54;

FIG. 56 illustrates the identification of a shortest distance path;

FIGS. 57-58 illustrate the population of a shortest distance path value in the grid of FIG. 51;

FIG. 59 illustrates the population of all shortest distance path values in the grid of FIG. 51;

FIG. 60 illustrates a simple two-dimensional grid for estimated time values for shortest paths between each location;

FIG. 63 illustrates the identification of the shortest travel time from FIGS. 61-62;

FIG. 64 illustrates the population of a shortest travel time in the grid of FIG. 60;

FIG. 66 illustrates the population of a shortest travel time in the grid of FIG. 60;

FIG. 67 illustrates the population of all shortest travel times in the grid of FIG. 60;

FIG. 68 illustrates the shortest distance and shortest travel times stored in a matrix together;

FIG. 74 illustrates identification of a preferred route;

FIG. 86 illustrates weighting of an estimated time value for an assignment;

FIG. 88 illustrates calculation of a normalized value for an estimated value for an assignment;

FIGS. 91-92 illustrate an exemplary user interface for specifying constraints and penalties for a routing problem;

FIGS. 93A-C fancifully illustrate approaches for the calculation of penalty values and adjusted values taking such penalty values into account;

FIG. 105 illustrates the estimate from FIG. 104 stored in a shortest path matrix;

FIG. 107 illustrates the estimate from FIG. 106 stored in the same shortest path matrix from FIG. 105;

FIG. 108 illustrates population of the shortest path matrix of FIG. 105;

FIG. 109 illustrates population of estimated time values in a shortest path matrix;

FIG. 112 fancifully illustrates identification of a preferred or optimized route;

FIG. 113 illustrates updating the shortest path matrix of FIG. 109 with a computed value;

FIG. 117 fancifully illustrates comparison of potential assignments;

FIG. 127 illustrates exemplary C Sharp style pseudocode for calculation of a best fit line based on normalized average travel time values throughout the day;

FIG. 128 illustrates calculation of a best fit average travel time value for a simplified best fit line for a specific window of time;

FIG. 132 illustrates simplified calculation of a second order delta representing a change in the rate of change at a specific time interval;

FIG. 133 illustrates comparison of the calculated second order delta of FIG. 132 to a threshold value;

FIG. 137 illustrates exemplary C Sharp style pseudocode for simplified determination of times to be utilized for definition of traffic windows;

Figure 141:
Figure 142:
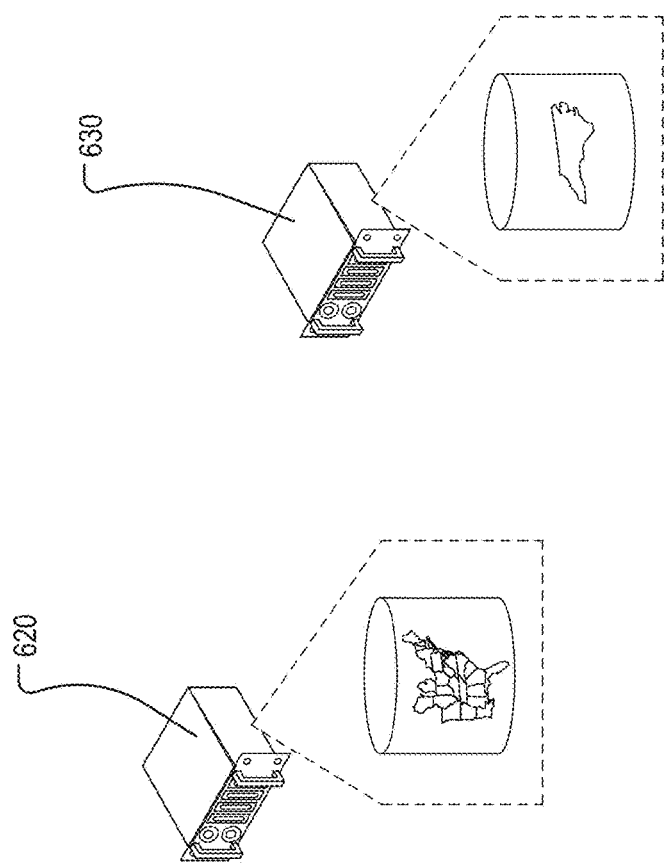
Figure 143:
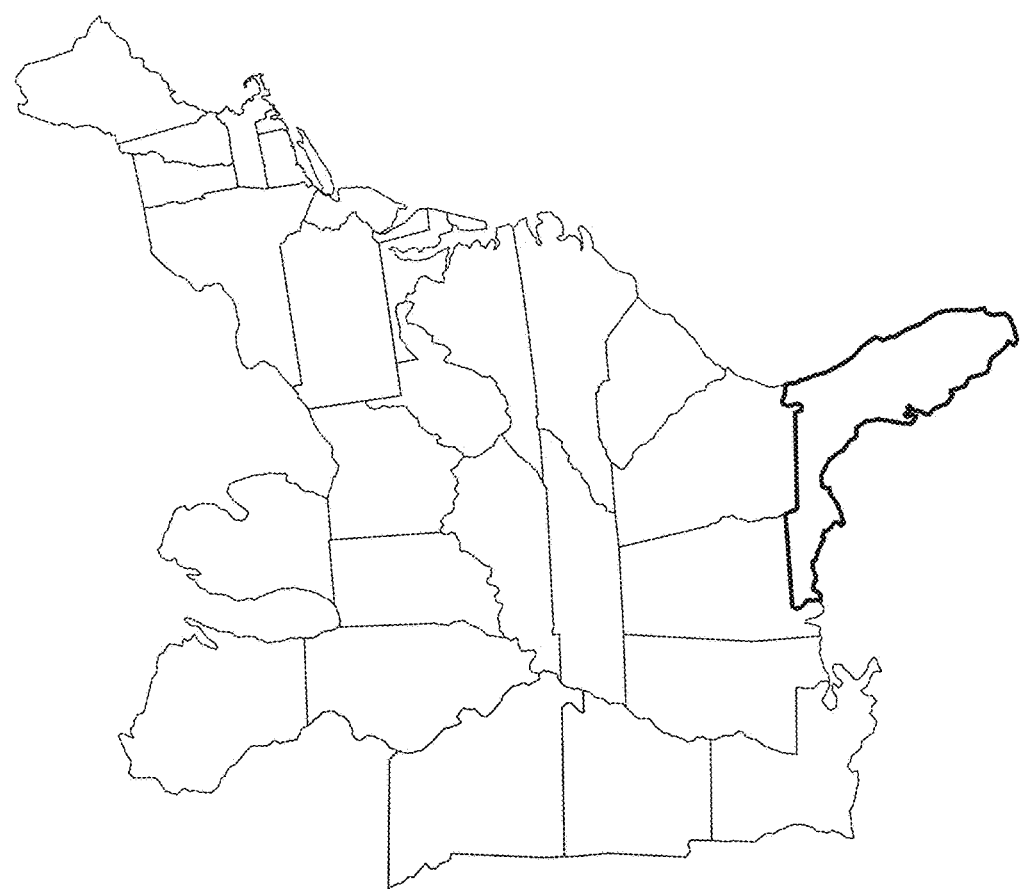
Figure 144:
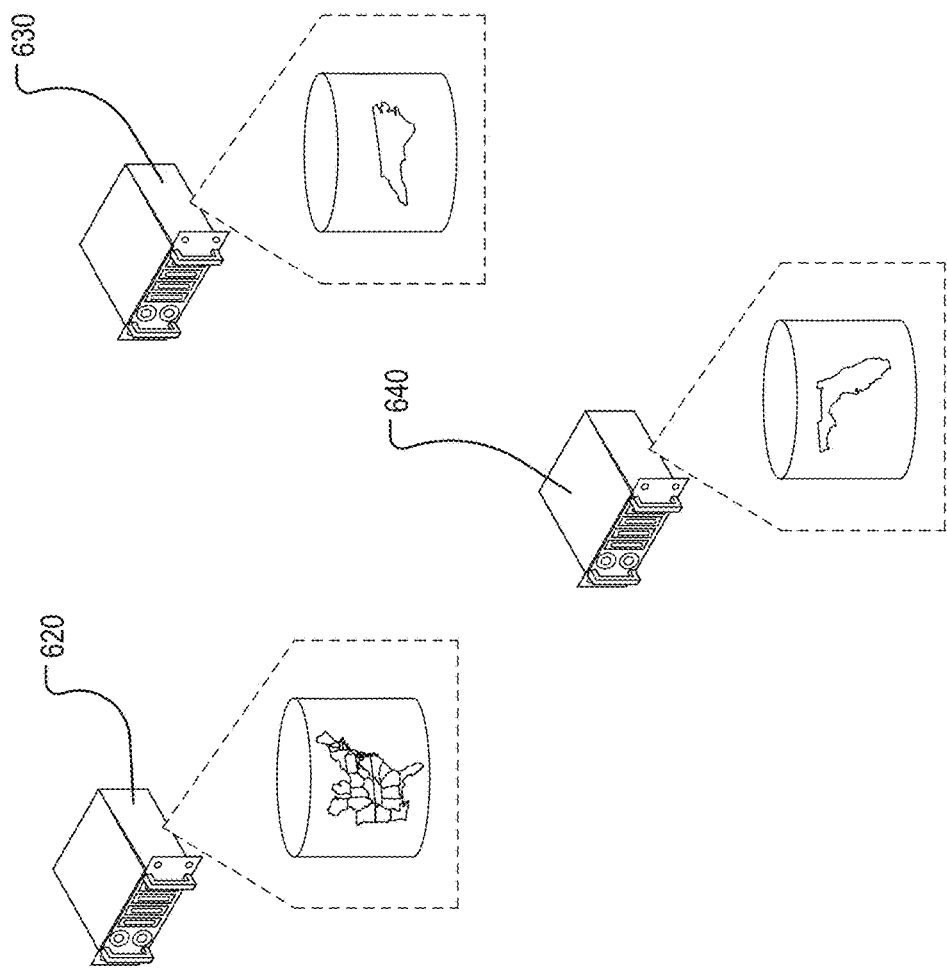
Figure 145:
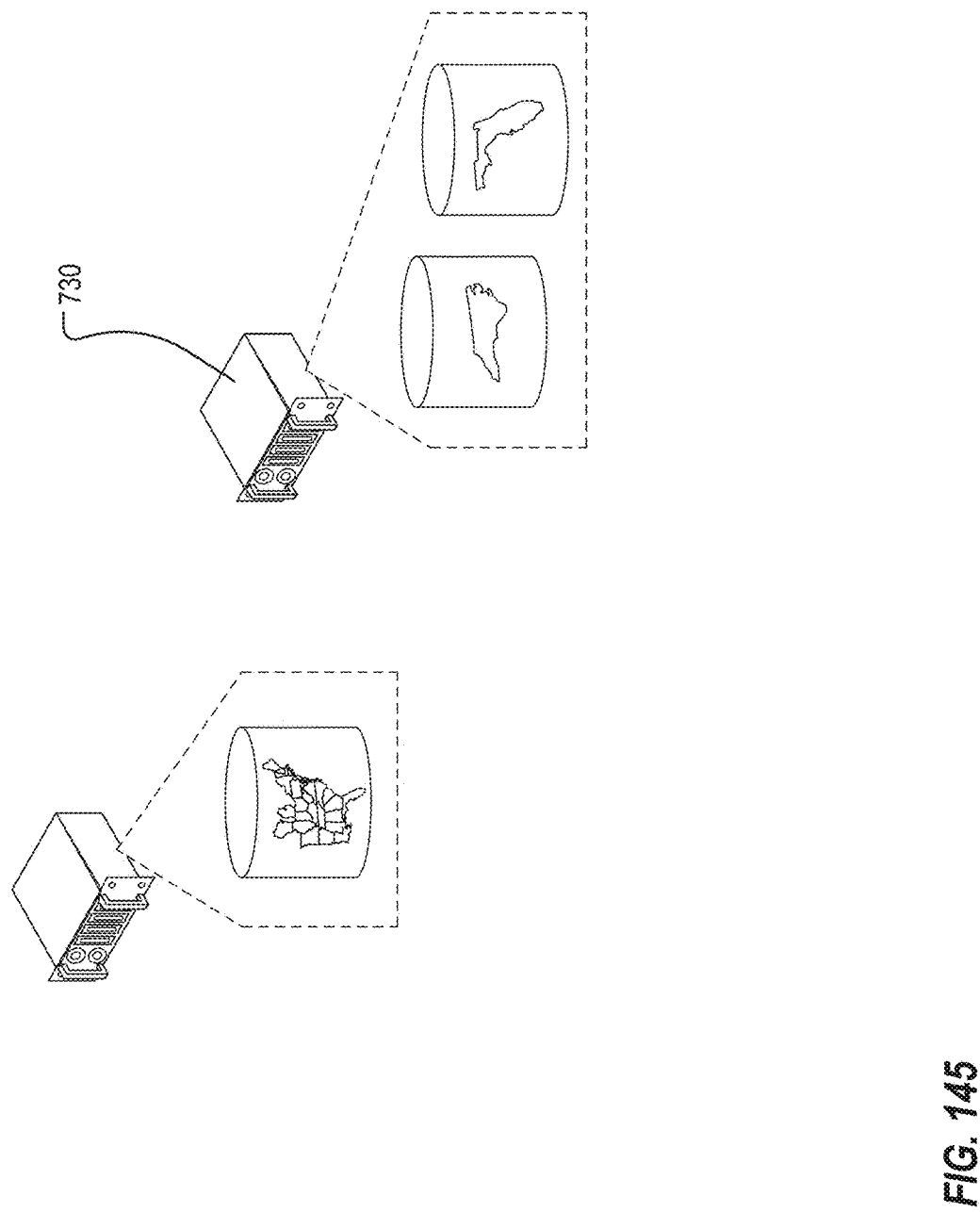
Figure 153:
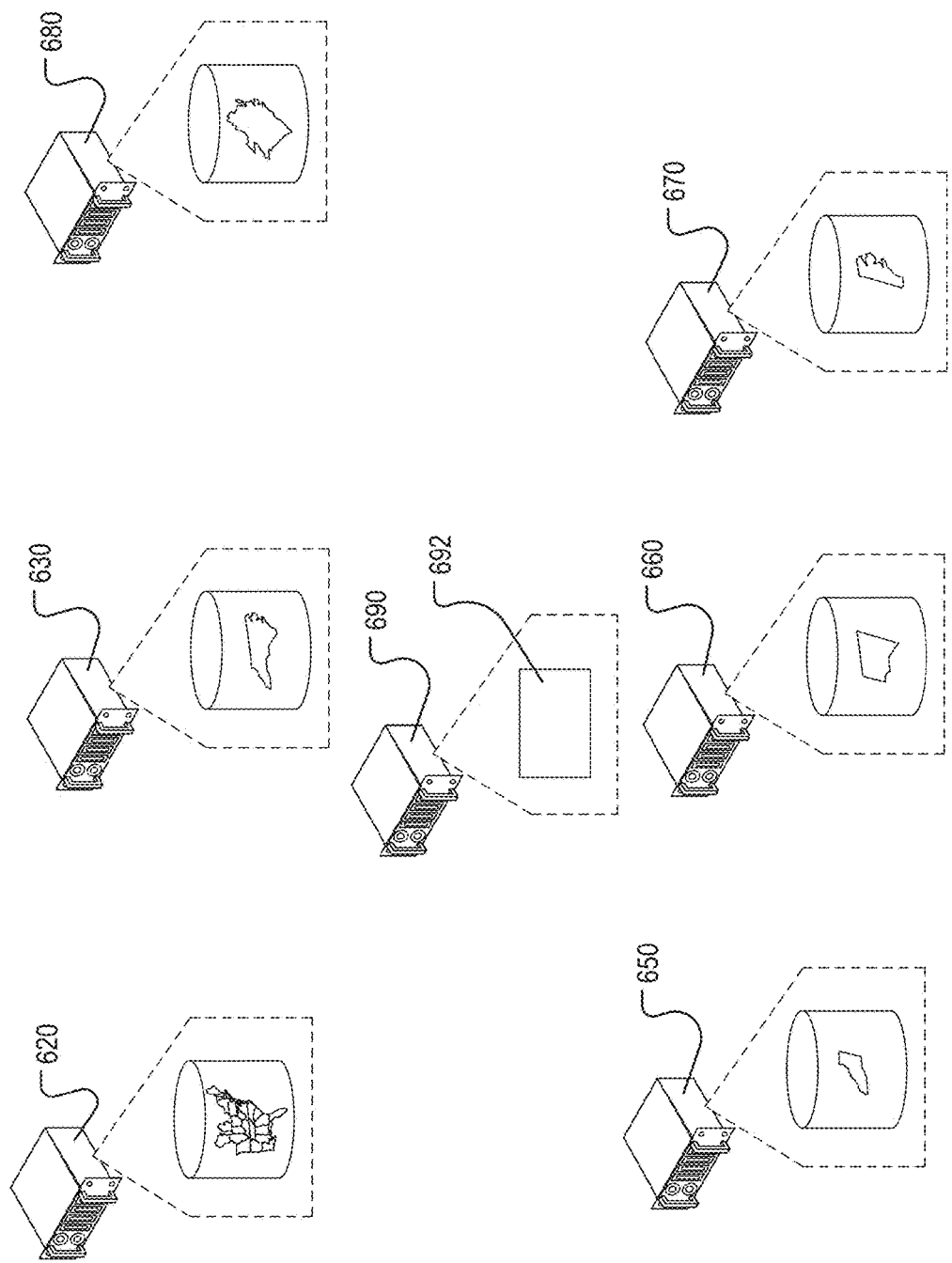
Figure 154:
Figure 159:
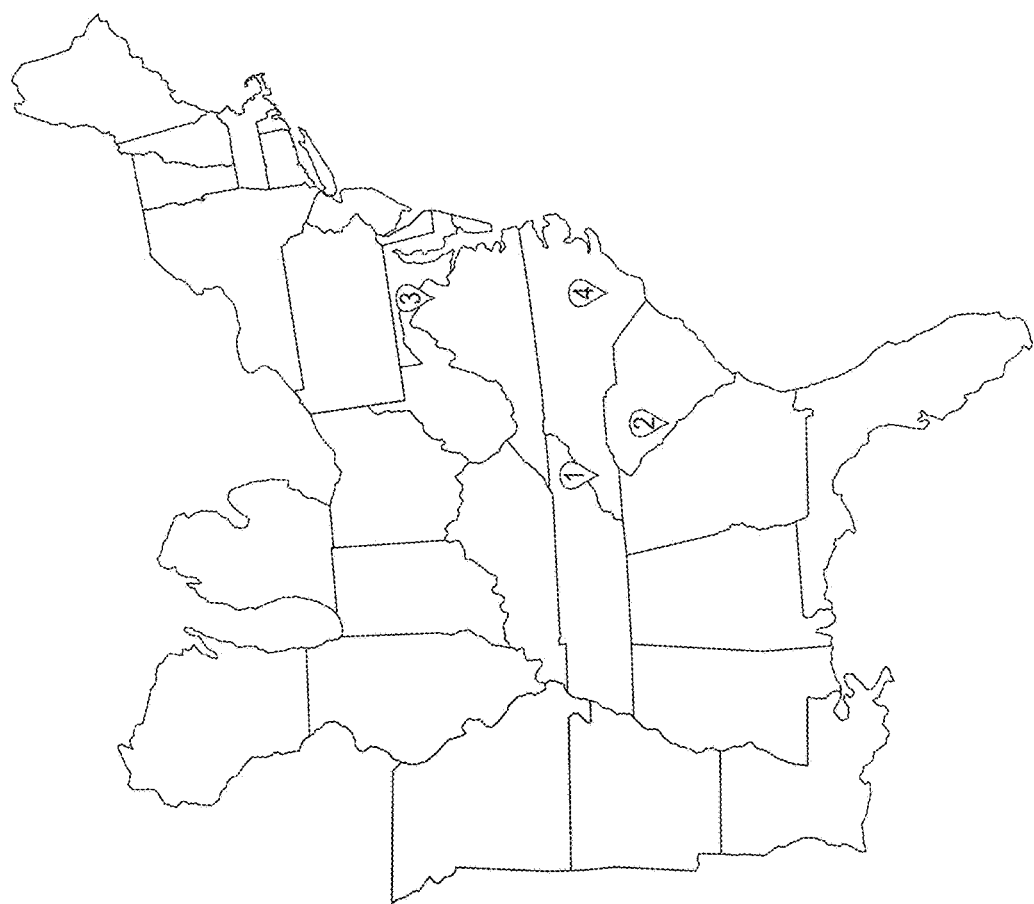
Figure 160:

FIG. 141 fancifully illustrates characterization of the state of North Carolina as a zone;

FIG. 142 fancifully illustrates that a zone may have a designated server;

FIG. 143 fancifully illustrates characterization of the state of Florida as a zone;

FIG. 144 illustrates provision of a server including data for a zone corresponding to Florida;

FIG. 145 illustrates that a single server may include data for two or more zones;

FIGS. 146-152 fancifully illustrate that multiple zones may overlap or be nested inside of one another;

FIG. 153 illustrates a server comprising a geo-locator service which contains information regarding defined zones;

FIG. 154 fancifully illustrates three locations involved in a routing problem;

FIG. 155-158 fancifully illustrate a methodology in which a geo-locator service is utilized to allow a requestor to determine what server to contact to receive information for a routing problem;

FIGS. 159-160 illustrate another example of determination of a smallest defined zone containing all of the locations involved in a routing problem.

DETAILED DESCRIPTION

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

INTRODUCTION

Figure 1:
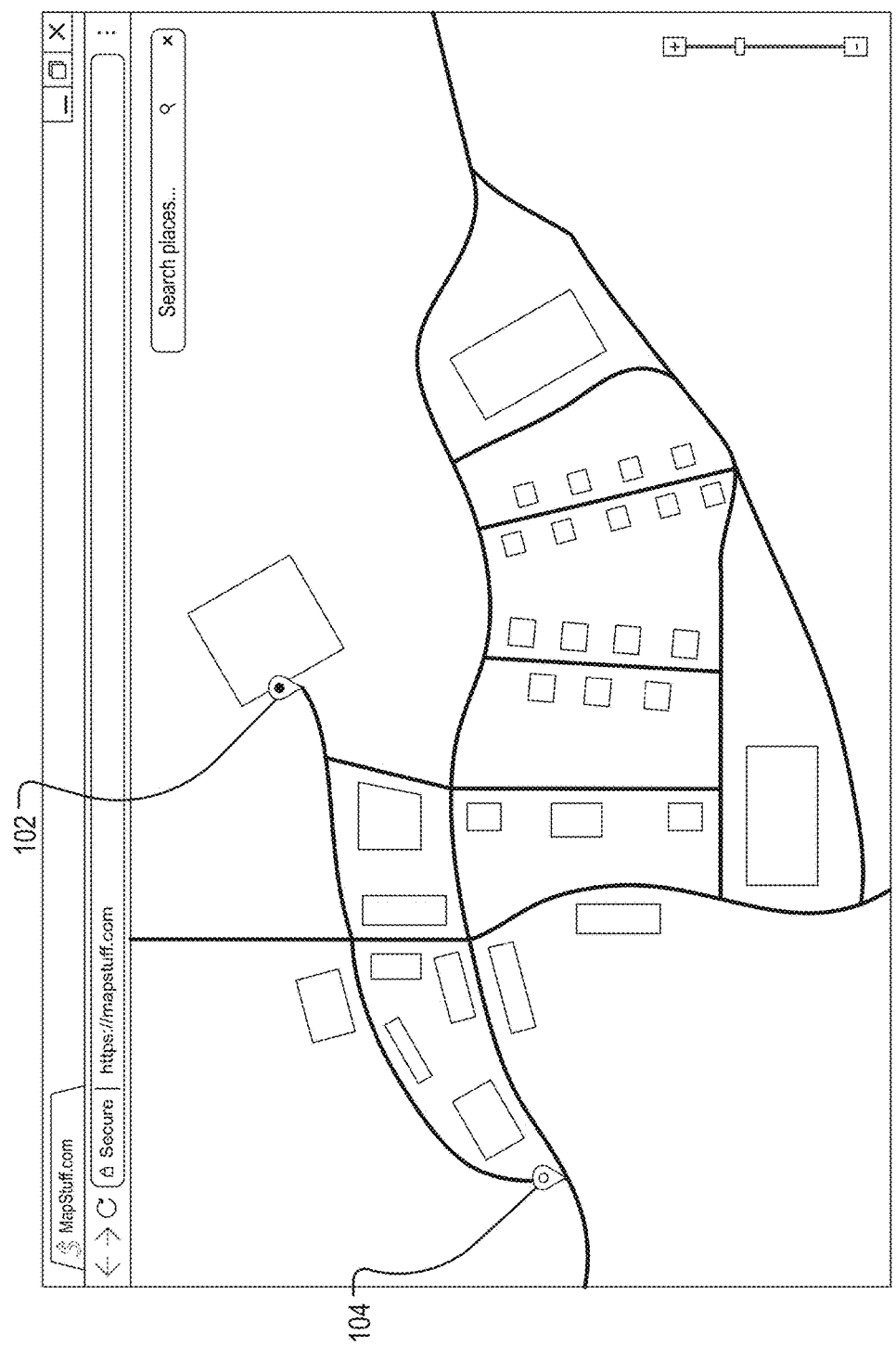
FIG. 1 illustrates an exemplary graphical user interface for exemplary software configured to provide solutions to routing problems.

FIG. 1 illustrates an exemplary graphical user interface for exemplary software which is configured to provide solutions to routing problems. The graphical user interface comprises a map with a first placement marker 102 indicating a start location and second placement marker 104 indicating a desired destination location.

Figure 2:
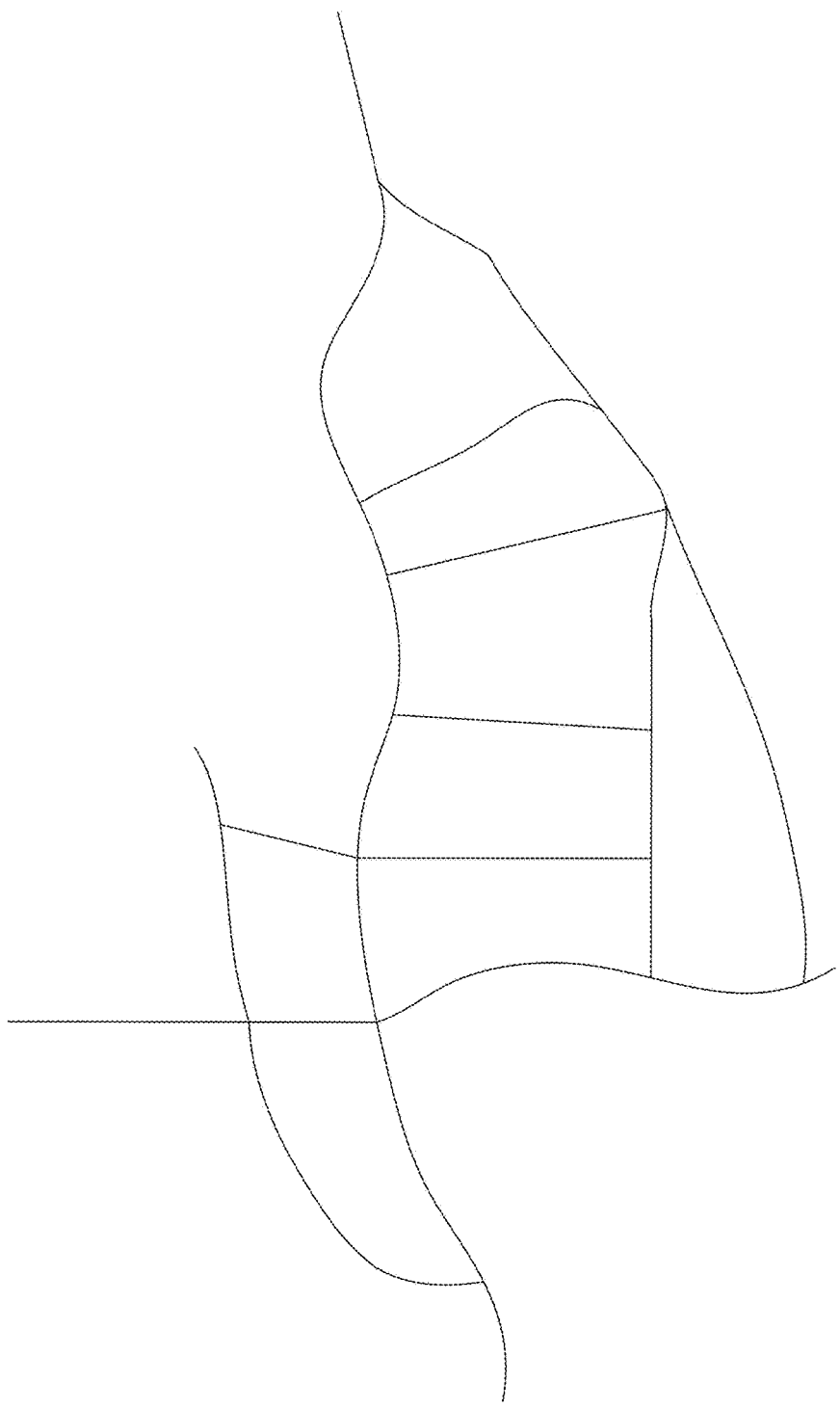
FIG. 2 illustrates a portion of a road network from the graphical user interface of FIG. 1.
Figure 3:
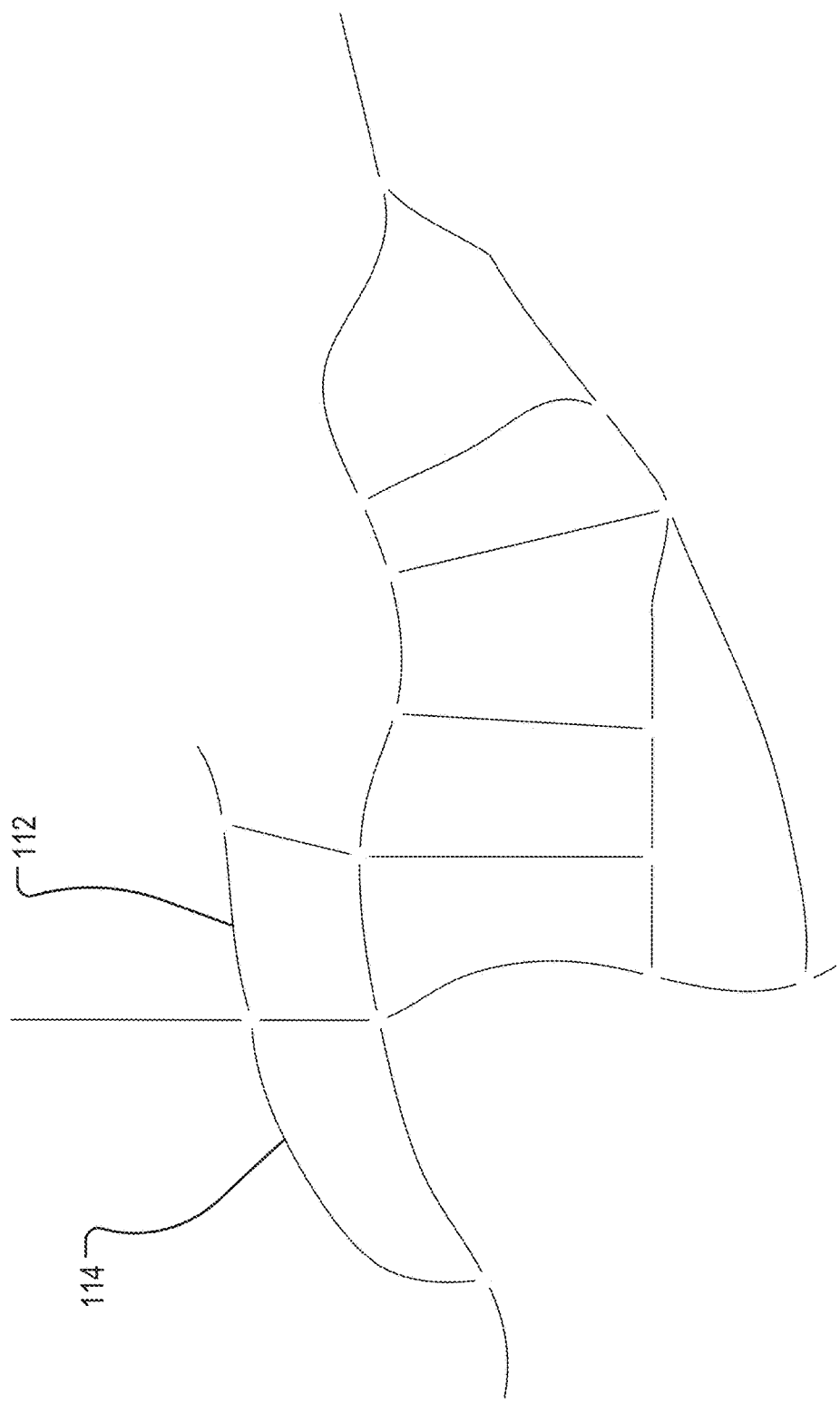
FIG. 3 illustrates road segments from the graphical user interface of FIG. 1.
Figure 4:
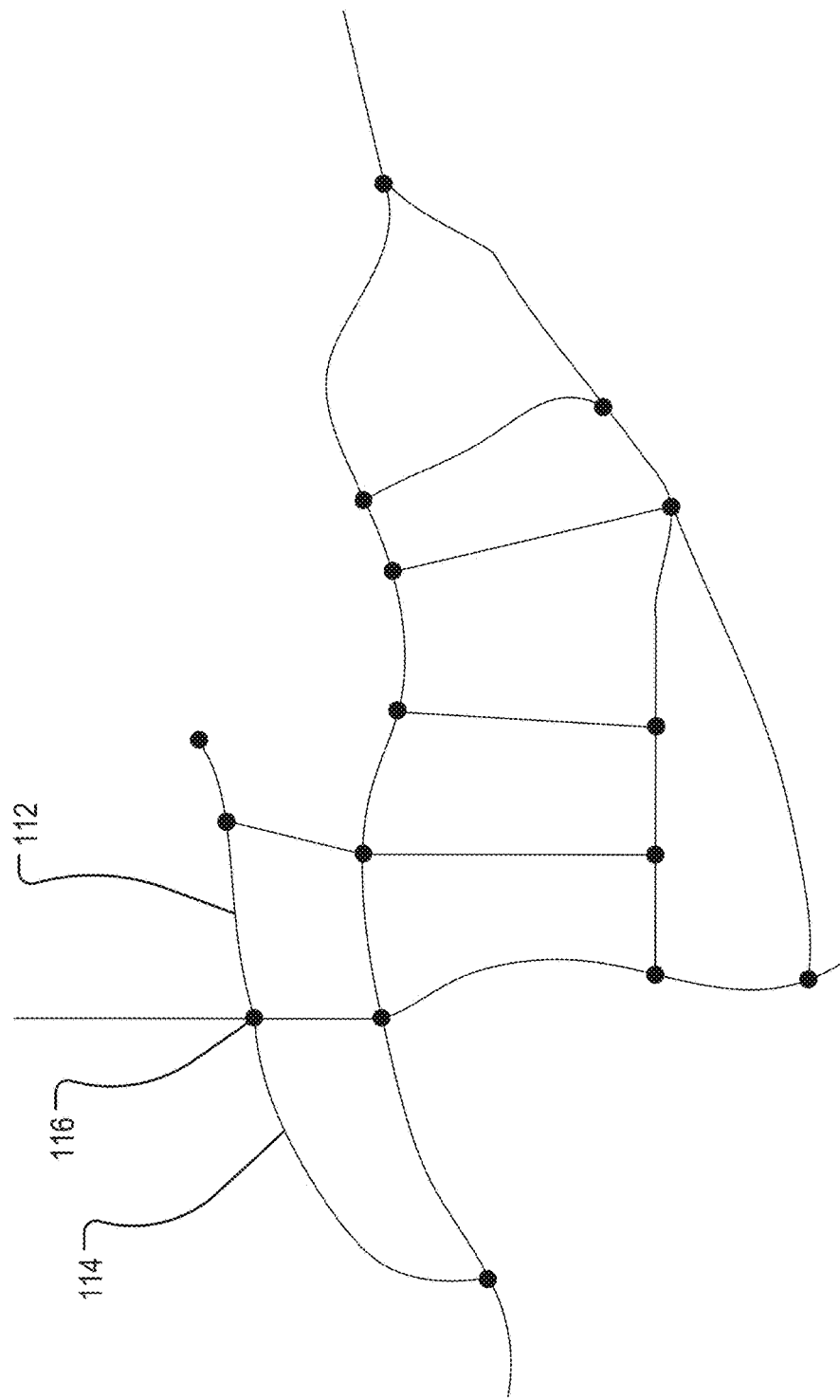
FIG. 4 illustrates road segments connected at connections points.
Figure 5:
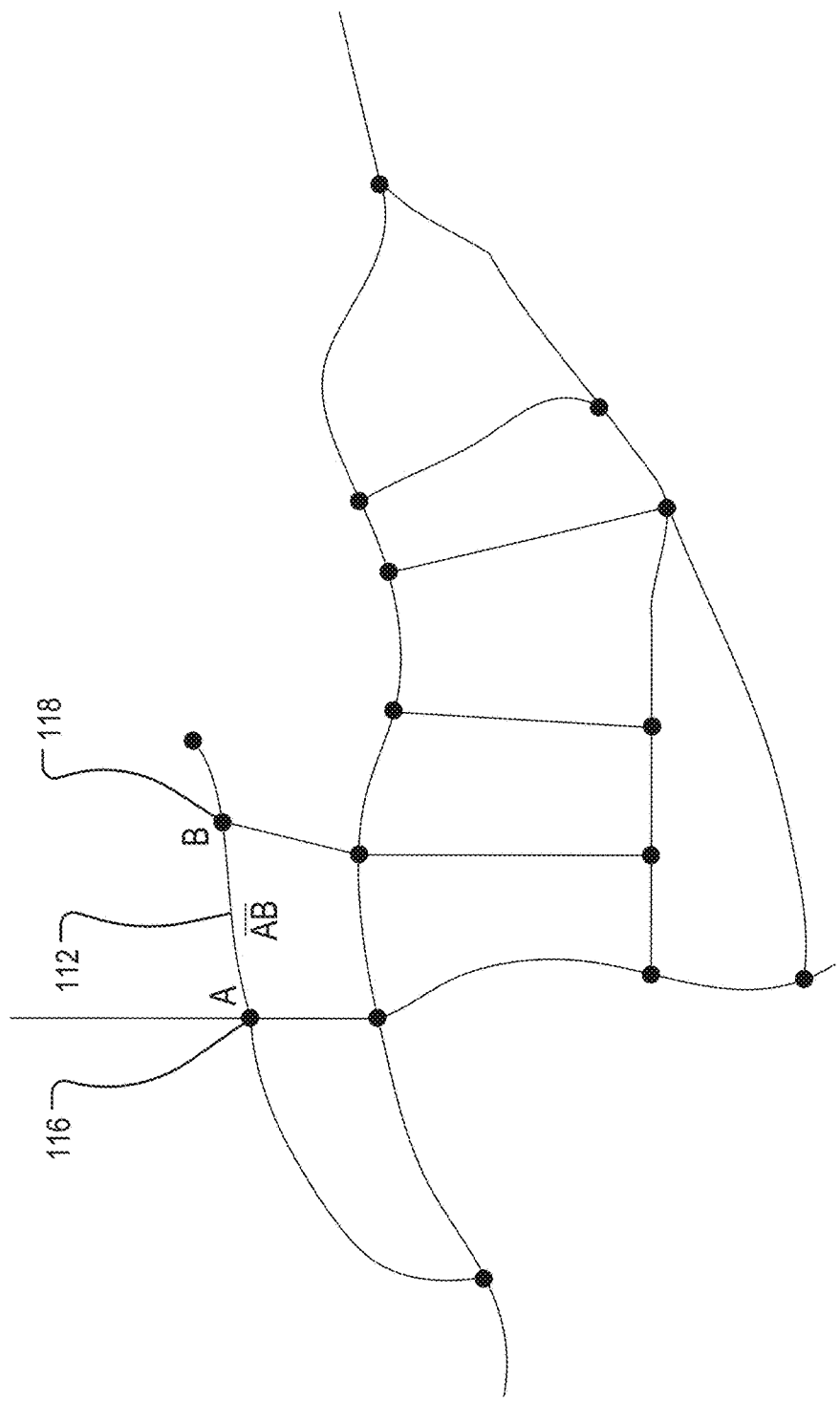
FIG. 5 illustrates a road segment characterized by two end points.
Figure 6:
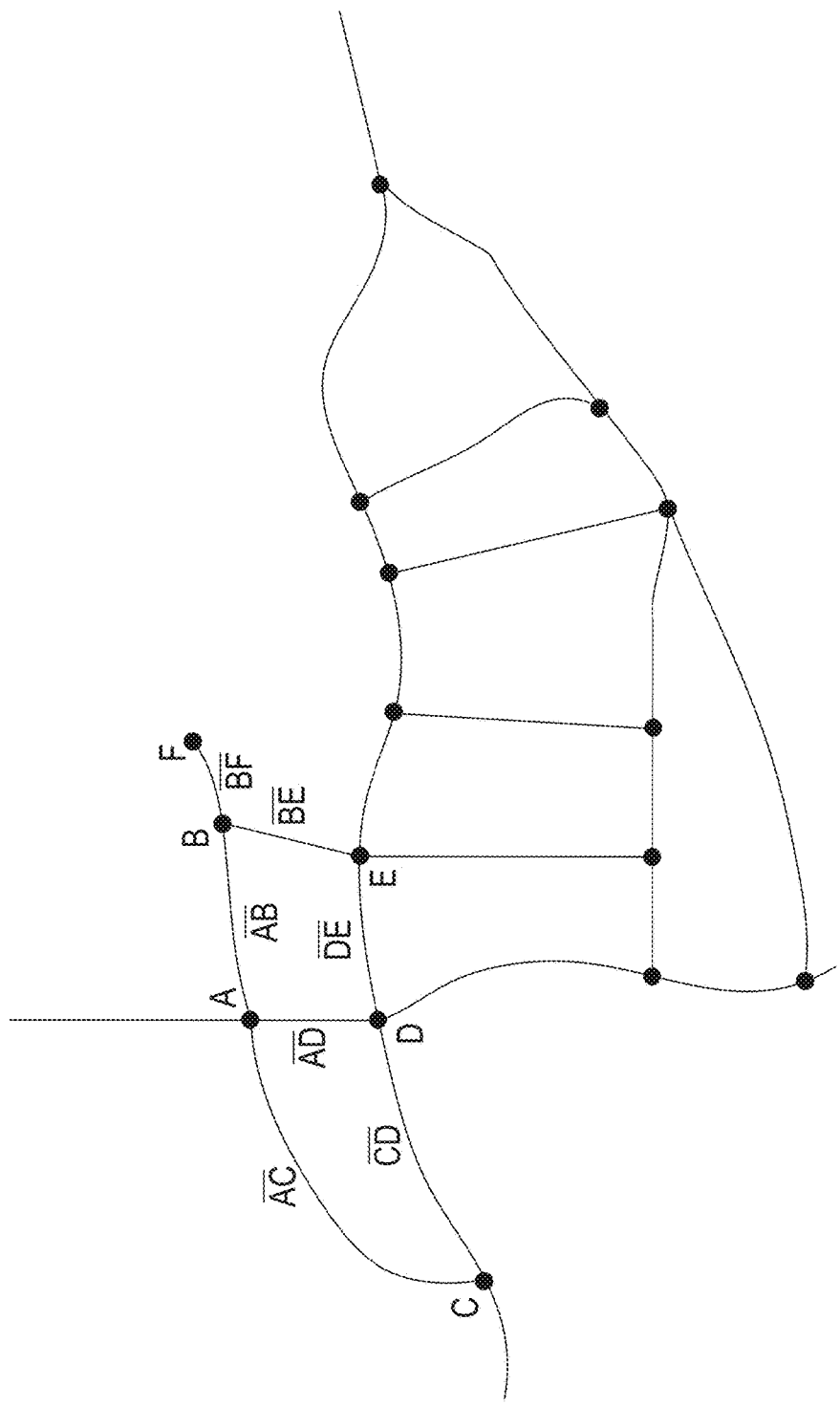
FIG. 6 illustrates multiple road segments, each characterized by two end points.

The graphical user interface is displaying a portion of a road network, which can be more clearly seen in FIG. 2. The road network can be characterized as being made up of road segments, as fancifully illustrated in FIG. 3, in which exemplary road segments 112,114 are called out. The road segments can be characterized as being connected to one another at connections points, as fancifully illustrated in FIG. 4, where exemplary road segments 112,114 are fancifully illustrated as connected at connection point 116. A road segment can be characterized by its end points, as illustrated in FIG. 5, where point 116 is characterized as point A, point 118 is characterized as point B, and road segment 112 is characterized as road segment AB. FIG. 6 illustrates similar characterization of other road segments of the illustrated road network.

A distance of each of these road segments can be determined and stored, as illustrated in FIG. 7. Based on these distances, a total distance of a path from one point to another can be determined. Further, determined distances for various possible paths can be compared to determine an optimal path.

Figure 8:
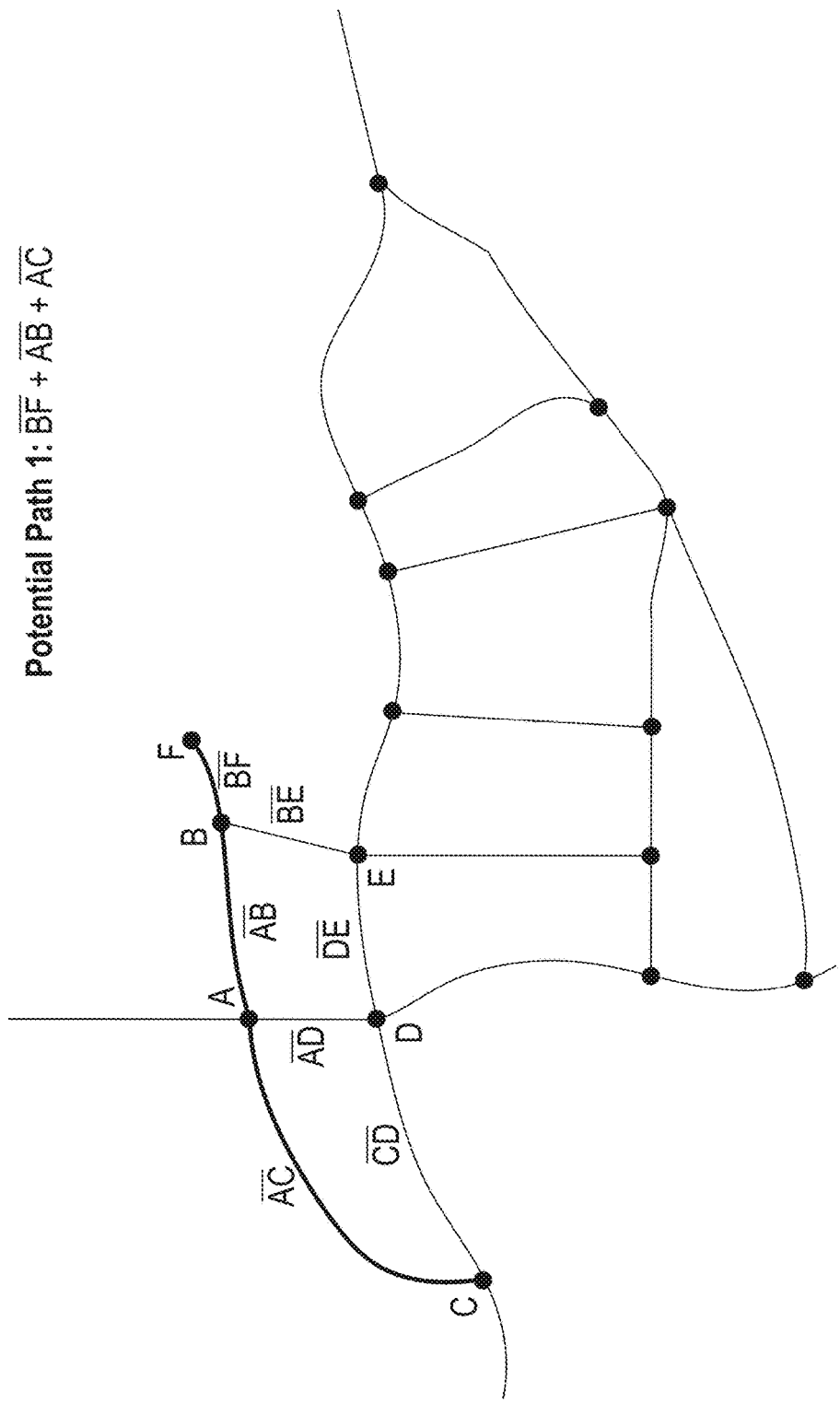
FIG. 8 illustrates a first potential path between points F and C.
Figure 9:
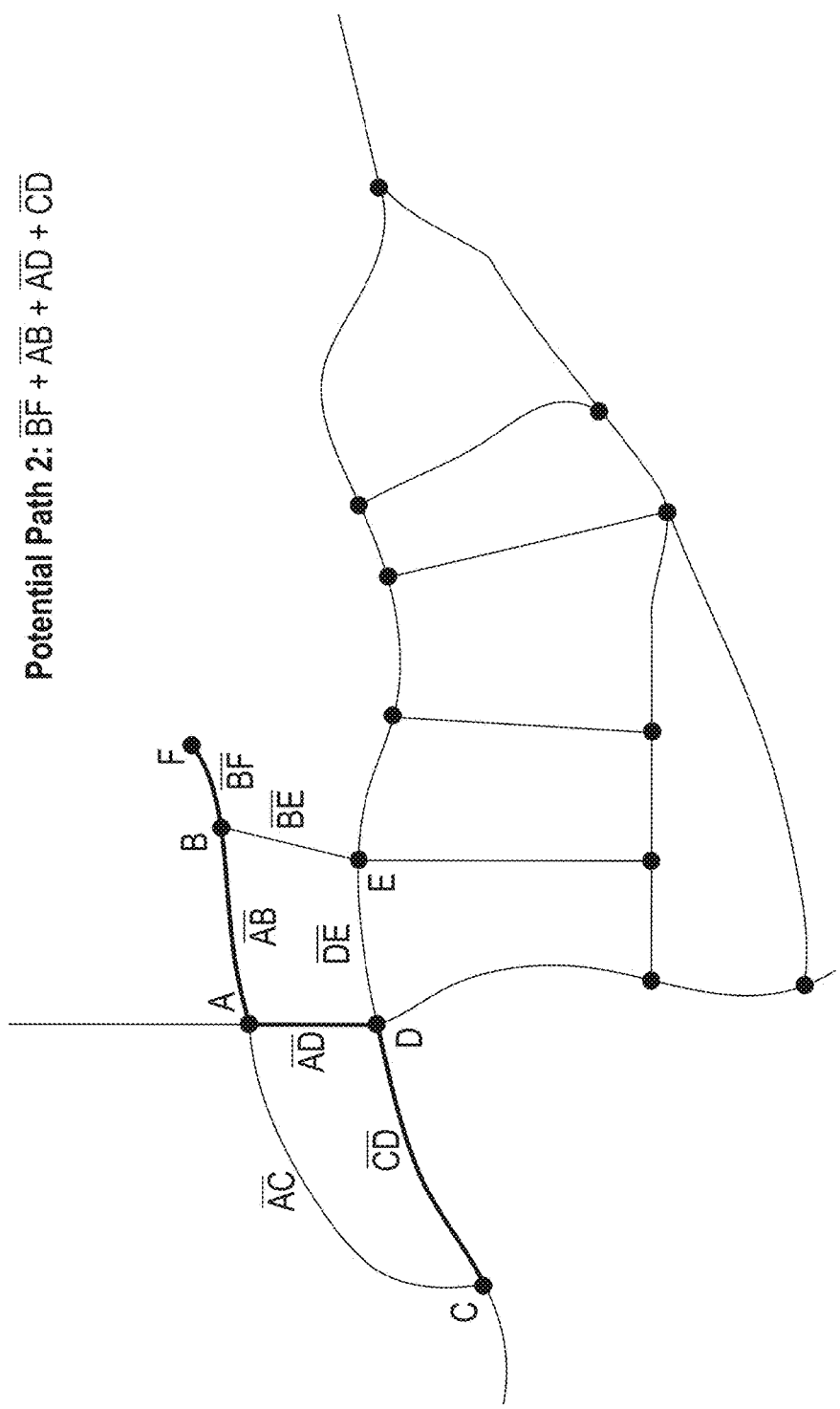
FIG. 9 illustrates a second potential path between points F and C.
Figure 10:
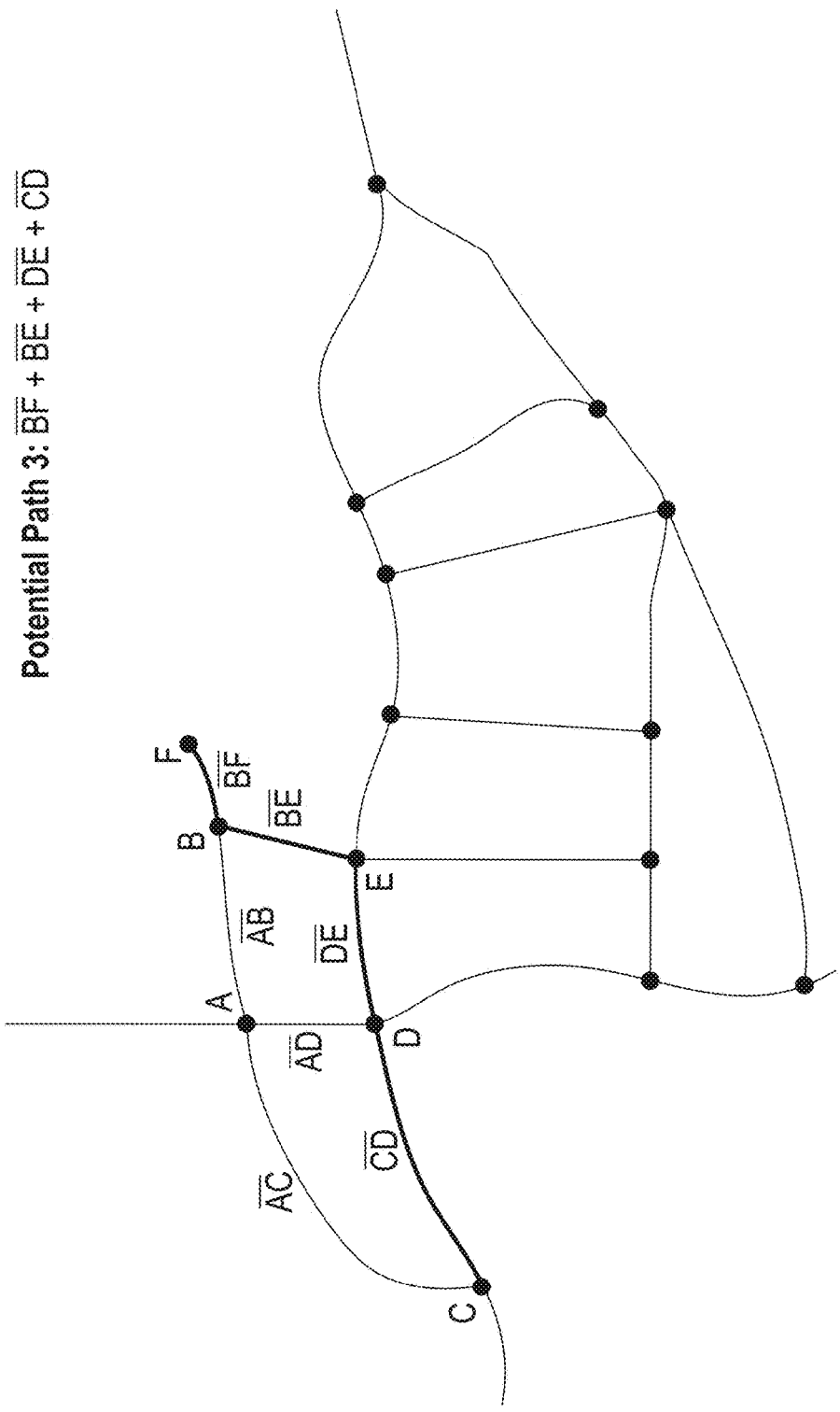
FIG. 10 illustrates a third potential path between points F and C.
Figure 11:
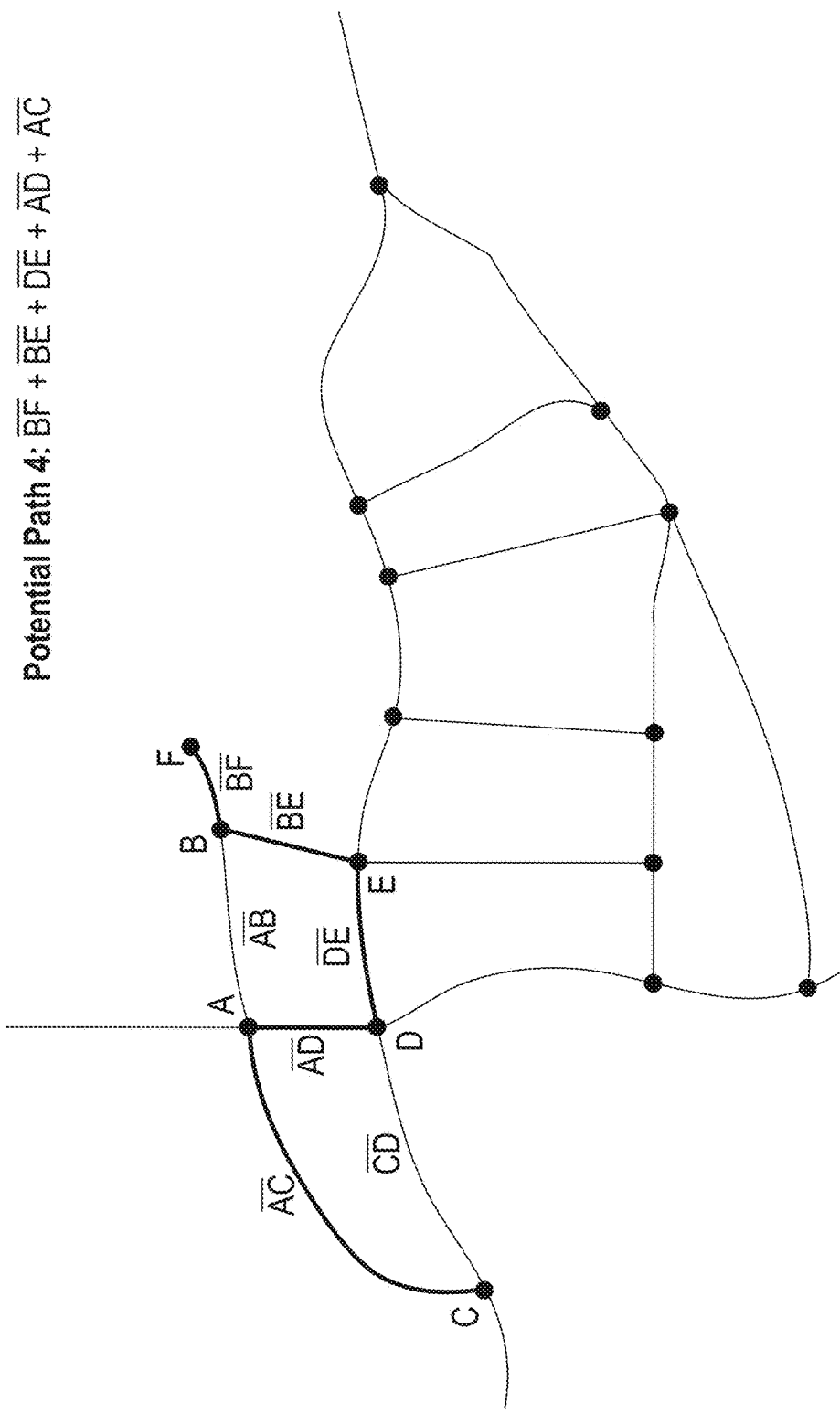
FIG. 11 illustrates a fourth potential path between points F and C.

For example, with reference to points F and C illustrated in FIG. 6, FIG. 8 illustrates a first potential path between points F and C which includes road segments BF, AB, and AC, FIG. 9 illustrates a second potential path between points F and C which includes road segments BF, AB, AD, and AC, FIG. 10 illustrates a third potential path between points F and C which includes road segments BF, BE, DE, and CD, and FIG. 11 illustrates a fourth potential path between points F and C which includes road segments BF, BE, DE, AD, and AC. It will be appreciated that more or less paths may be identified. For example, a search for paths between two points may involve a breadth first or depth first traversal of connecting road segments in an attempt to determine one or more paths from a first point to a second point.

A total distance for each path can be determined by summing up the distances of each road segment that the path traverses, as illustrated in FIG. 12. A shortest path can be identified based on these determined total distances, as illustrated in FIG. 13.

Figure 14:
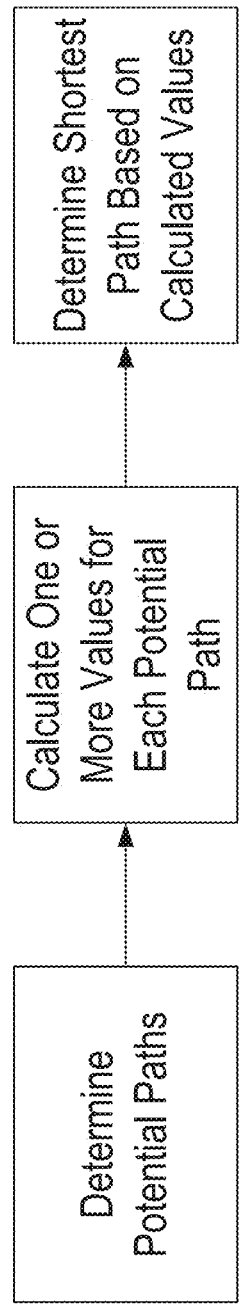
FIG. 14 illustrates a flow for determining a shortest path.

Thus, an exemplary process for determining a shortest path can involve determining one or more potential paths, calculating one or more values (e.g. a total distance) for each potential path, and then determining a shortest path based on the calculated values. FIG. 14 illustrates a flow for such an exemplary process.

Notably, however, other methodologies and approaches may additionally or alternatively be utilized for determining a shortest or preferred path between two points. For example, a search for a shortest or preferred path between two points may involve a breadth first traversal of connecting road segments in an attempt to determine a shortest or preferred path from a first point to a second point.

It will be appreciated that determination of a preferred path may involve not just determination of a path having a shortest total distance, but also may involve determination of a path having a shortest estimated travel time.

For example, an estimated travel time for road segments could be calculated based on speed limits of the road segments, as illustrated in FIG. 15, and these estimated travel times could then be utilized to calculate estimated travel times for paths traversing such road segments. FIG. 16 illustrates calculation of estimated travel times for the paths of FIGS. 8-11.

In some instances, both a determined estimated travel time for a path and a determined total distance for a path may be utilized to select a preferred or shortest path. For example, as illustrated in FIG. 17, three of the four potential paths of FIGS. 8-11 have all been determined to have the same total estimated travel time. Determination of a preferred or shortest path might involve first determining one or more paths having a shortest total estimated travel time, and then using a determined total distance as a further metric to select a preferred or shortest path from among any that have the same (or very similar) total estimated travel time, as illustrated in FIG. 18.

Other criteria could be utilized as well. For example, FIG. 19 illustrates use of a number of turns as a further metric to select a preferred or shortest path from among any that have the same (or very similar) total estimated travel time.

Additionally or alternatively, required turns along a traversed path may be taken into account in calculating an estimated travel time for a path. For example, FIGS. 20-24 illustrate calculation of total estimated travel times for the paths of FIGS. 8-11, updated to add 30 seconds for each required left turn and 10 seconds for each required right turn.

It will be appreciated that the values of 30 seconds and 10 seconds are just exemplary values. Further, more less different values could be utilized for different navigation scenarios (e.g. turns) along a path. For example, FIGS. 25-29 illustrate calculation of total estimated travel times for the paths of FIGS. 8-11, updated to add 15 seconds for going straight at an intersection without a light, 20 seconds for going straight at an intersection with a light, 30 seconds for a left turn at an intersection with a light, 20 seconds for a left turn at an intersection without a light, and 10 seconds for a right turn at an intersection with a light.

Figure 30:
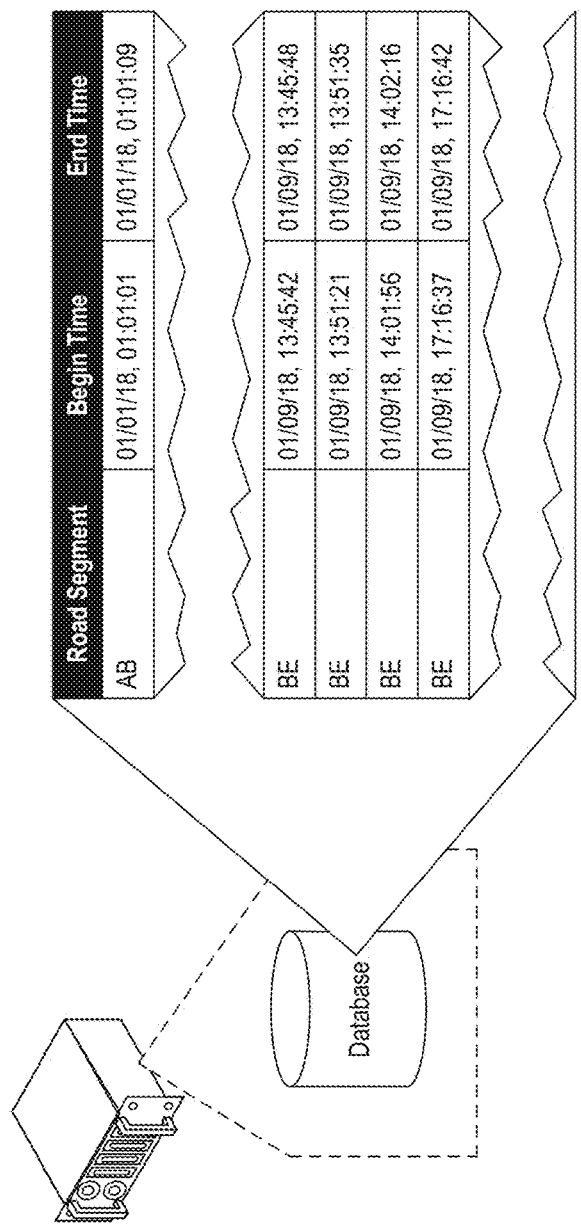
FIG. 30 illustrates exemplary storage of historical data for traversal of road segments.

Moreover, rather than simply being calculated based on speed limits of a road segment, an estimated travel time for a road segment may be determined based on historical data for vehicles that traversed that road segment. For example, global positioning system (GPS) data may be gathered from vehicles with a GPS device traveling on a road segment. FIG. 30 illustrates exemplary storage of historical data for traversal of road segments.

FIG. 31 illustrates exemplary average travel time values calculated for road segments based on gathered historical data for traversal of such road segments.

Similarly, historical data can be gathered on the time it takes vehicles to navigate from one road segment to another (e.g. turn at an intersection), and utilized to determine an estimated travel time for such navigations.

FIG. 32 illustrates exemplary average travel time values calculated for navigation from one road segment to another based on gathered historical data for such navigations.

It will be appreciated that traffic patterns may frequently allow for quicker traversal of a road segment (or navigation from one road segment to another) at certain times of the day, and slower traversal at other times. To account for this, exemplary average travel times may be determined for windows throughout the day, e.g. for 24 one hour windows, as illustrated in FIGS. 33-34.

Determination of a shortest path may involve utilizing the time estimates for a window within which a current time falls, or within which an estimated time of travel falls.

Figure 35:
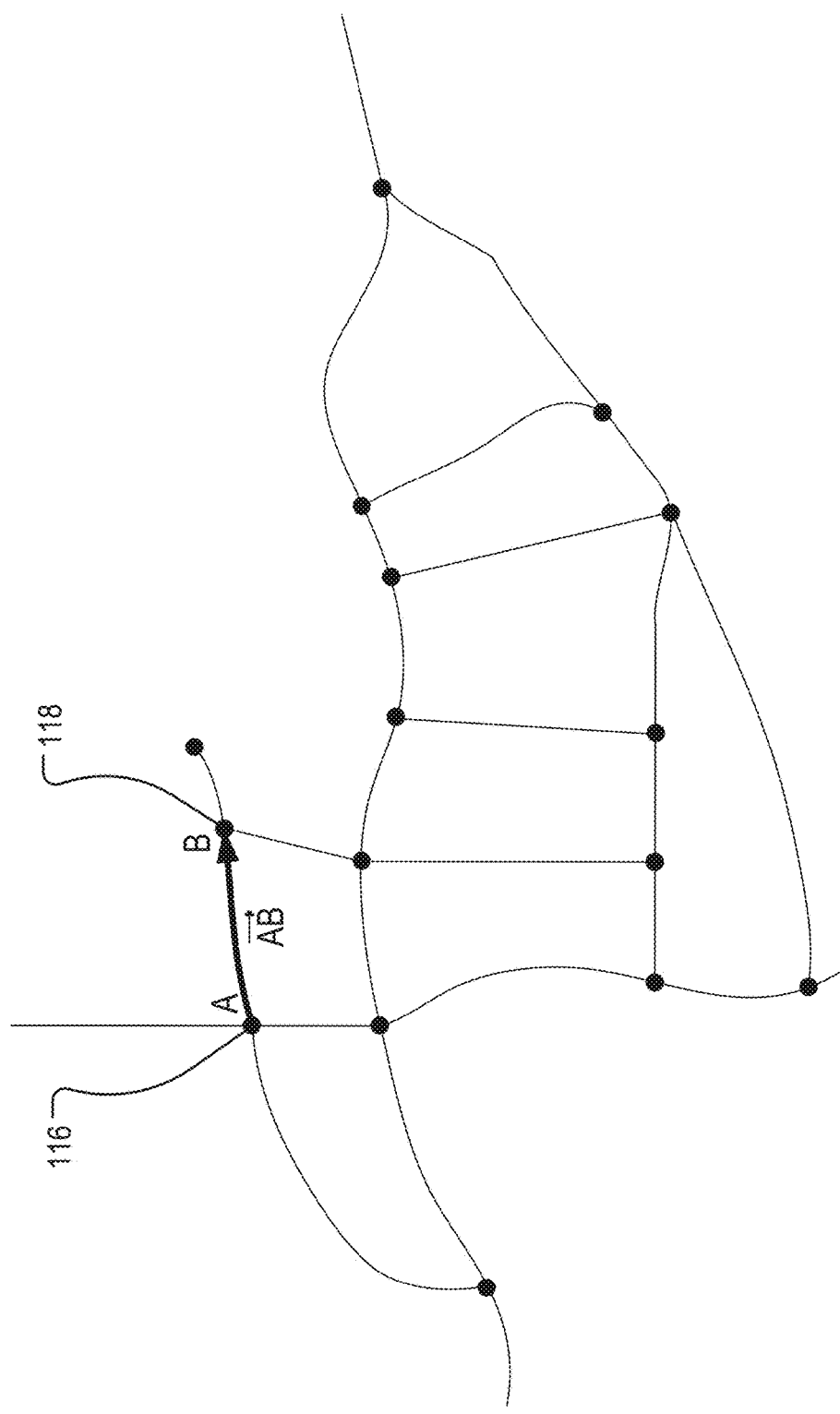
FIG. 35 fancifully illustrates a directional road segment.
Figure 36:
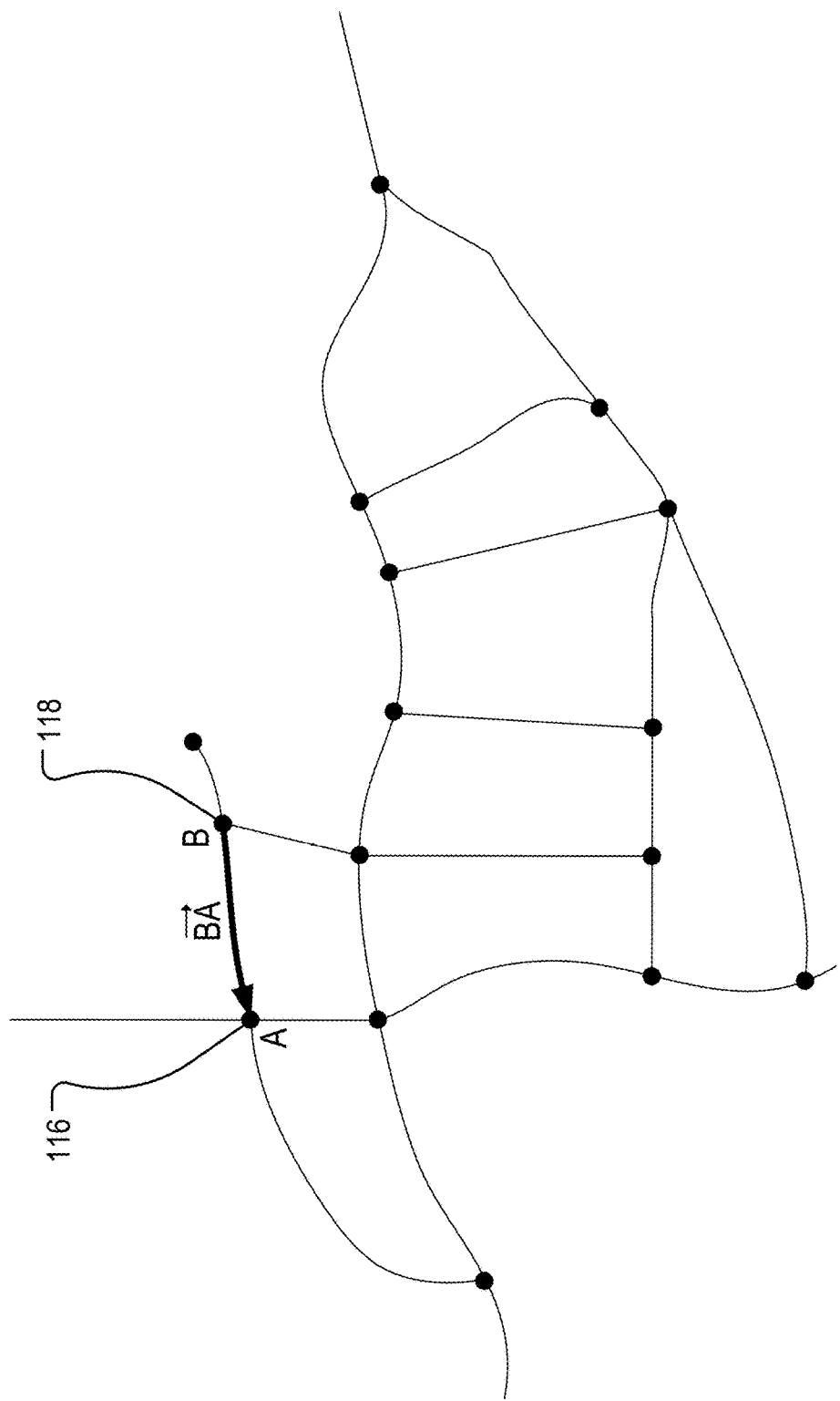
FIG. 36 fancifully illustrates another directional road segment.
Figure 37:
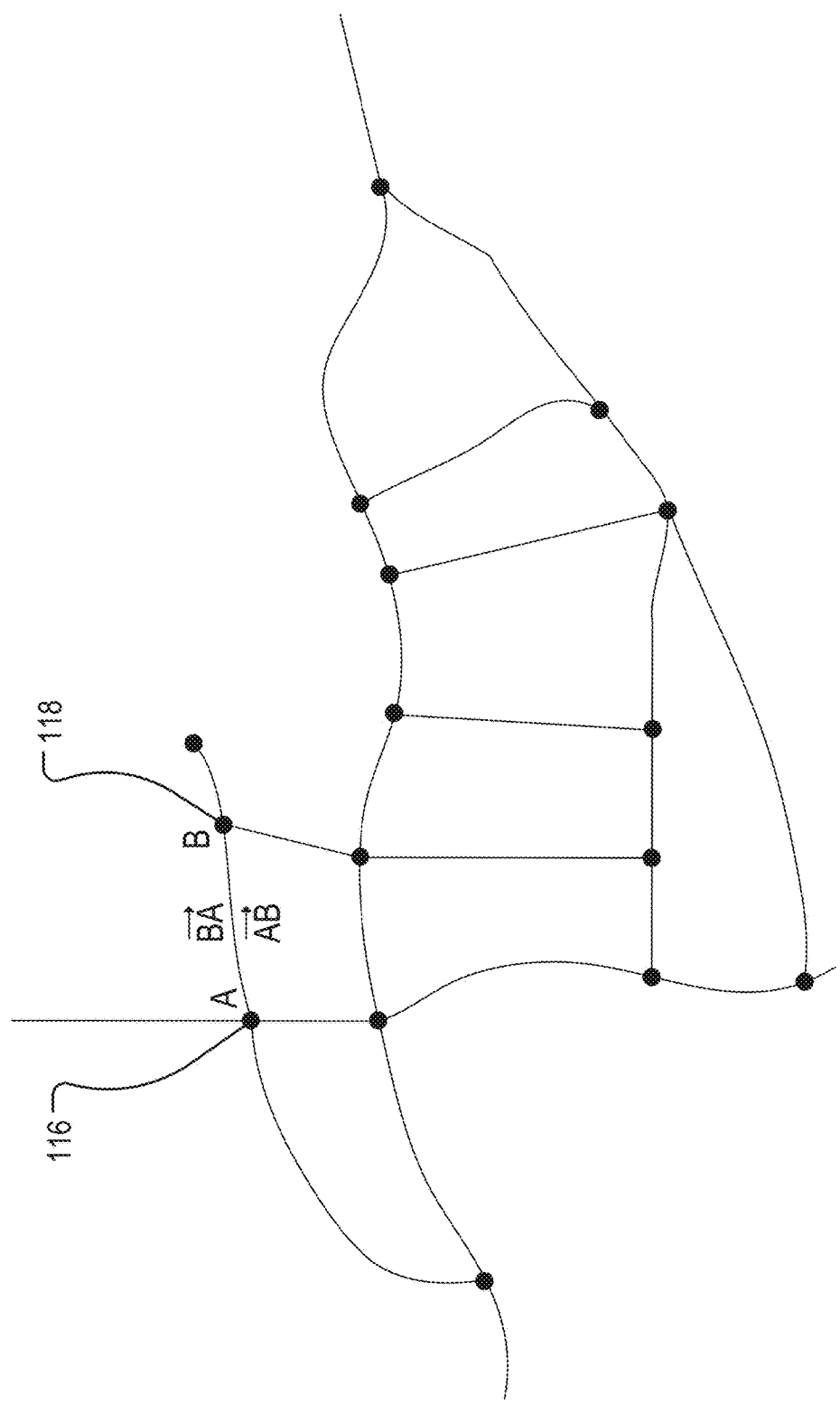
FIG. 37 fancifully illustrates two directional road segments going in opposite directions.

It will further be appreciated that it may frequently take longer or shorter to traverse a road in a first direction, as compared to the opposite direction. In this regard, a two way road between two points can be characterized as representing not just one road segment, but two road segments (one in each direction). For example, FIG. 35 illustrates road segment AB from point 116 to point 118, and FIG. 36 illustrates road segment BA from point 118 to point 116. FIG. 37 illustrates both of these road segments together, and FIG. 38 illustrates different average travel times for each of these road segments.

Figure 39:
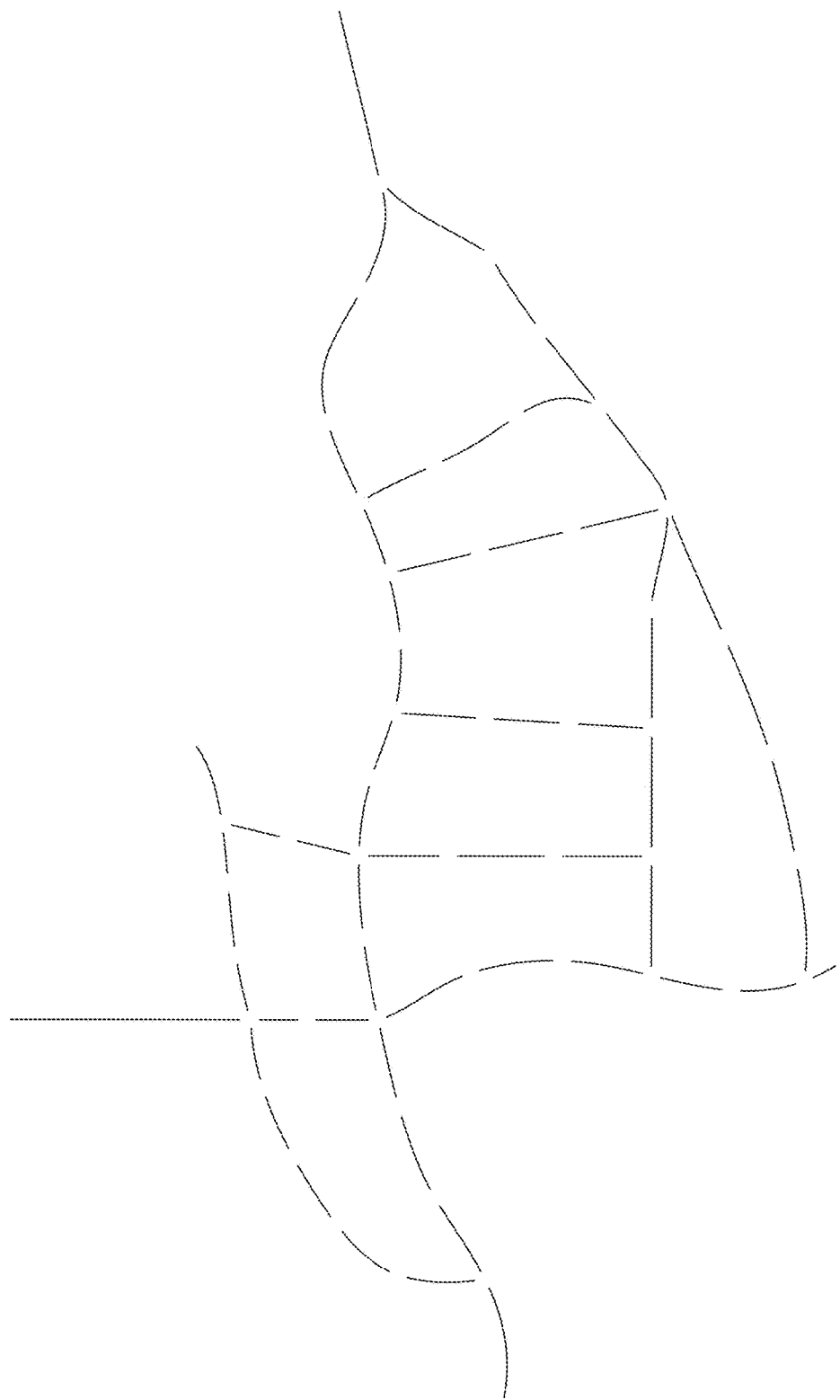
FIG. 39 illustrates a more granular road segmentation.

Although thus far road segments have largely been described as a segment connecting two intersections, it will be appreciated that more or less granular road segments may be defined and utilized. For example, FIG. 39 illustrates more granular road segmentation.

As noted above, determination of a preferred path may involve not just determination of a path having a shortest total distance, but also may involve determination of a path having a shortest estimated travel time. Determination of a preferred path may for example involve calculation of a preference value for a path utilizing a distance weight for a total distance of the path and a time weight for an estimated travel time for the path, as illustrated in FIG. 40. FIG. 41 is a fanciful illustration of calculation of such a preference value for each potential path of FIGS. 8-11.

Determination of a preferred path may also involve calculation of a preference value based on normalized time and distance values. For example, a normalized time value may be generated by dividing each total estimated time amount by a minimum total estimated time amount (or by dividing a minimum total estimated time amount by each total estimated time amount), and a normalized distance value may be generated by dividing each total distance amount by a minimum total distance amount (or by dividing a minimum total distance amount by each total distance amount). FIG. 42 is a fanciful illustration of calculation of normalized time and distance values, and a preference value based on such normalized time and distance values. FIG. 43 illustrates exemplary C Sharp style pseudocode for calculation of such a preference value based on normalized time and distance values.

It will be appreciated that stylized, simplified examples are described herein in a fanciful manner for purposes of clarity of description. Actual implementations will generally involve more complexity.

Figure 44:
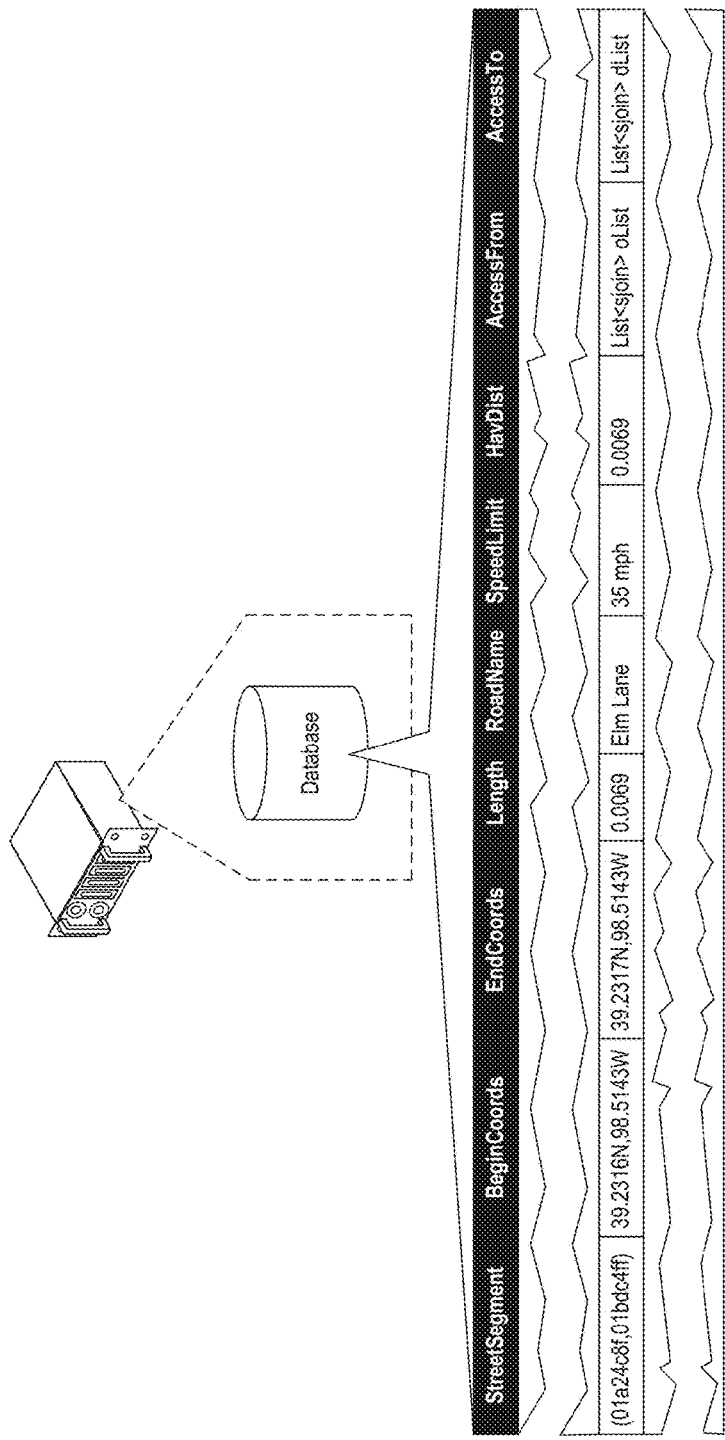
FIG. 44 illustrates exemplary storage of data for a road segment which includes latitude and longitude coordinates.
Figure 45:
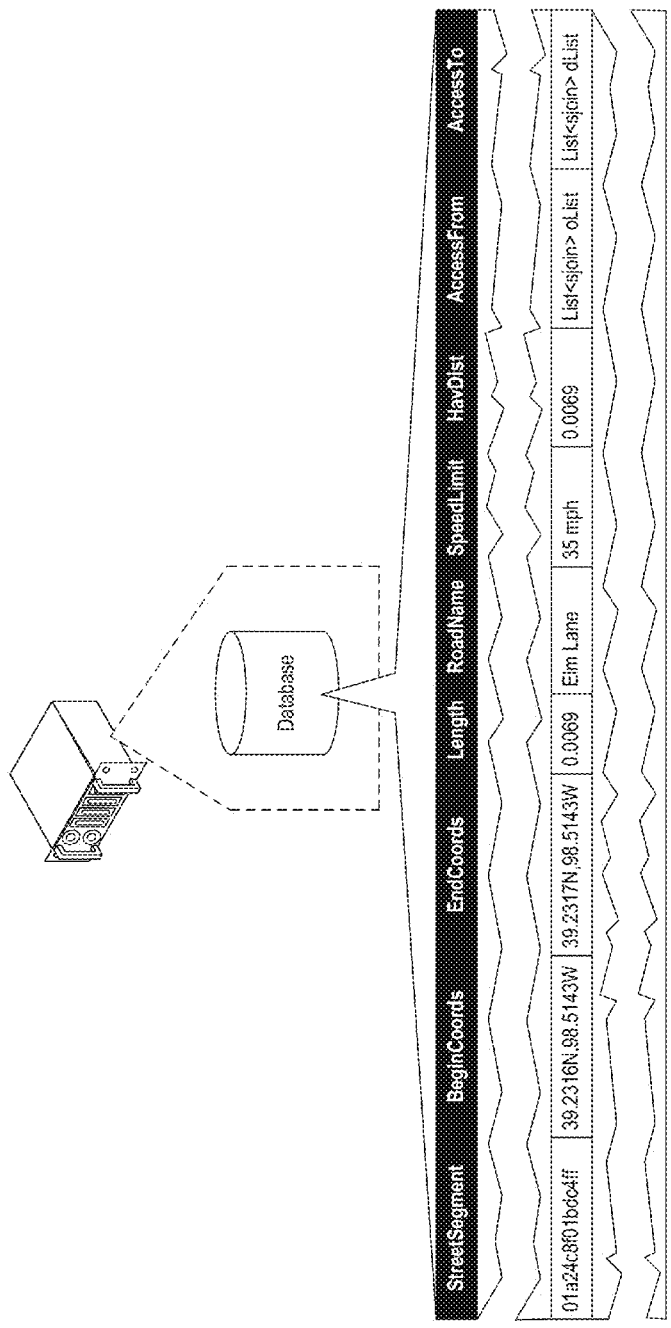
FIG. 45 illustrates the use of an assigned unique identifier for a road segment.

For example, FIG. 44 illustrates exemplary storage of data for a road segment which includes latitude and longitude coordinates for a beginning of a road segment, and latitude and longitude coordinates for an end of the road segment. Although the example of FIG. 44 involves use of an identifier for a road segment which comprises an identifier for each of two end points of the road segment, a road segment may instead include an assigned unique identifier, as illustrated in FIG. 45.

Figure 46:
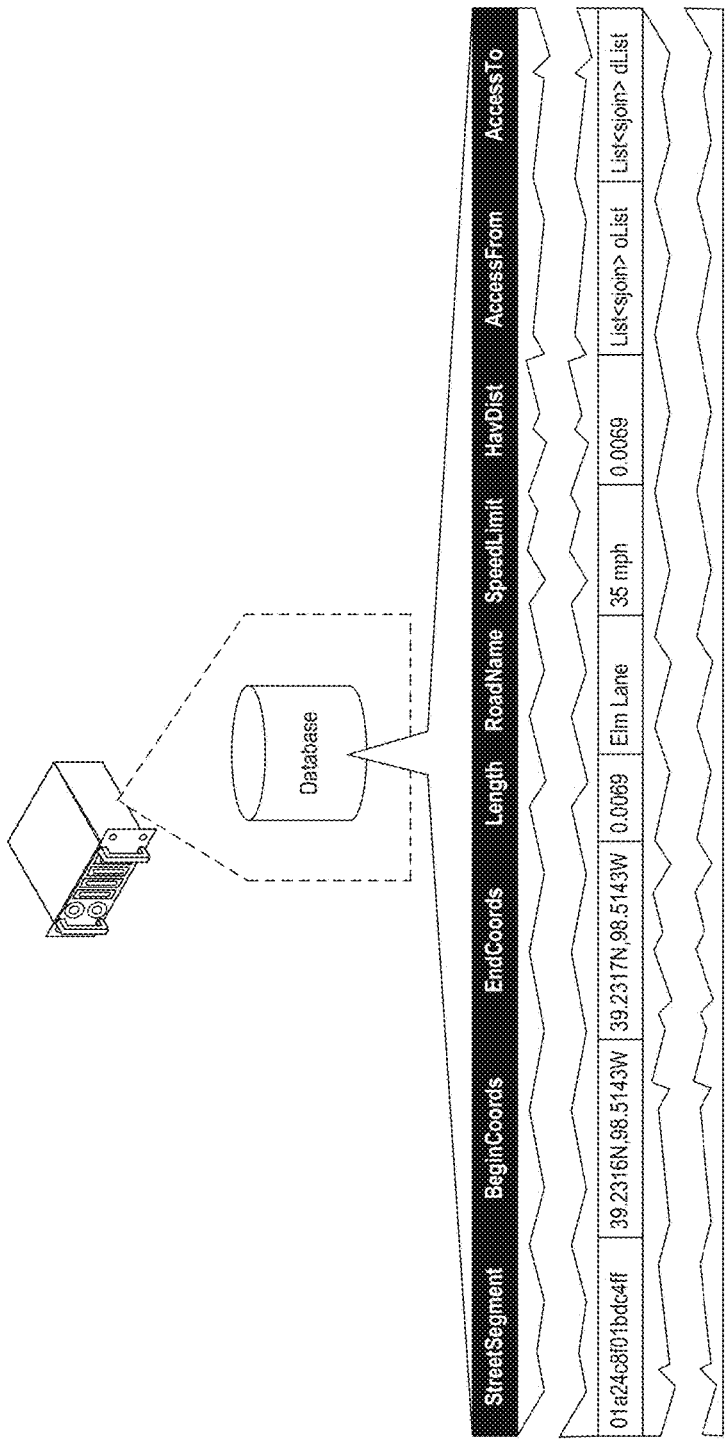
FIG. 46 illustrates data stored for a road segment including a list of connections from the road segment to and from other road segments.

Data stored for a road segment may include a list of joins or connections from the road segment to other road segments, as well as a list of joins or connections to the road segment from other road segments, as illustrated in FIG. 46. Stored data for such a join or connection may include an indication of a joined or connected street segment, an indication of a type of join or connection, and an indication of coordinates at which the join or connection occurs, as illustrated in FIG. 46.

Figure 47:
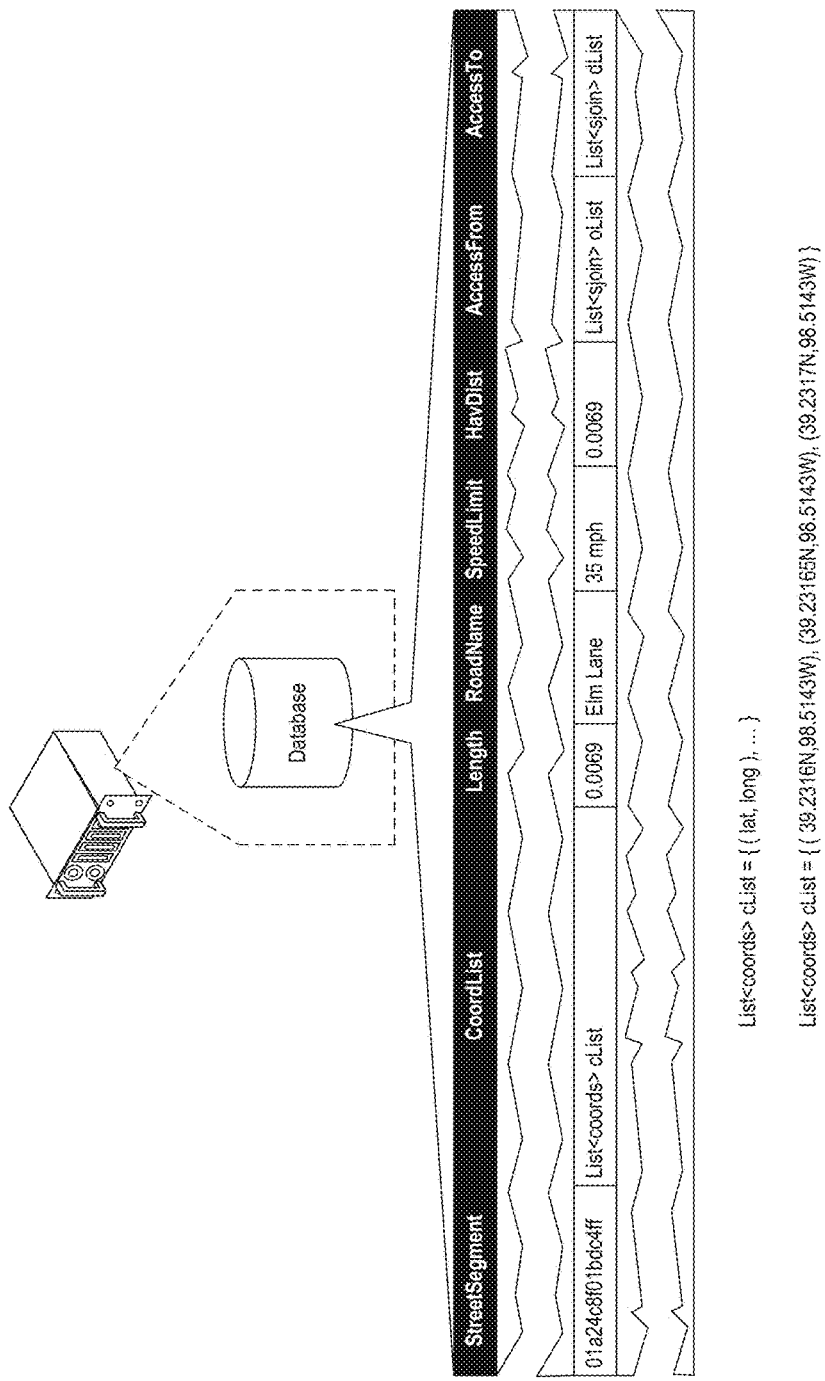
FIG. 47 illustrates stored data for a road segment which includes end points of the road segment as well as a list of points along the road segment.

It will be appreciated that many roads are not straight. Stored data for a road segment may include both a traversal length of the road segment, as well as a "crow flies" distance between ends of the road segment (e.g. a Euclidean distance or a distance calculated via the Haversine formula). Further, stored data for a road segment may include not just coordinates for end points of a road segment, but a list of points along a length of the road segment, as illustrated in FIG. 47.

Figure 48:
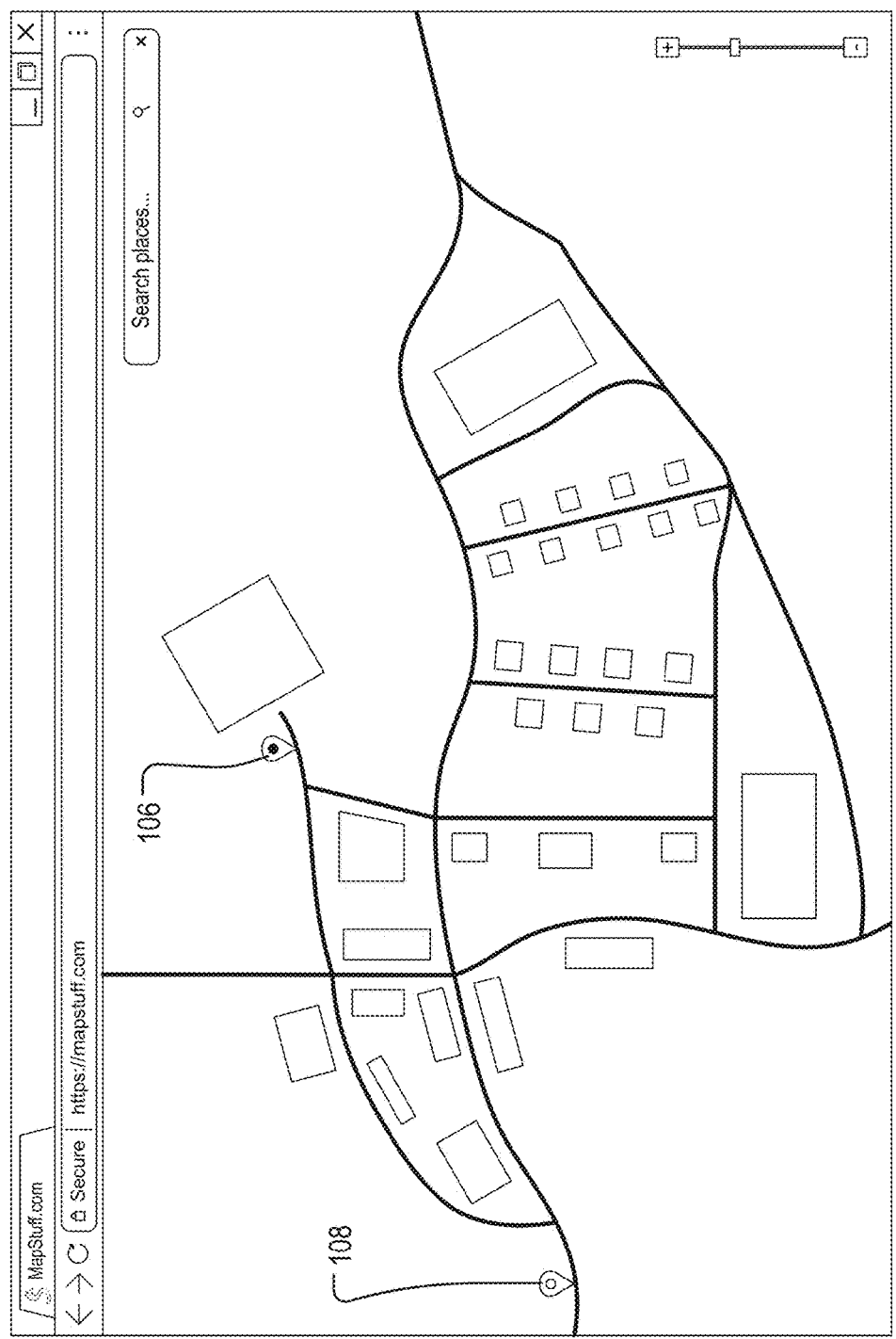
FIG. 48 illustrates an exemplary graphical user interface with a start location and a destination location.
Figure 49:
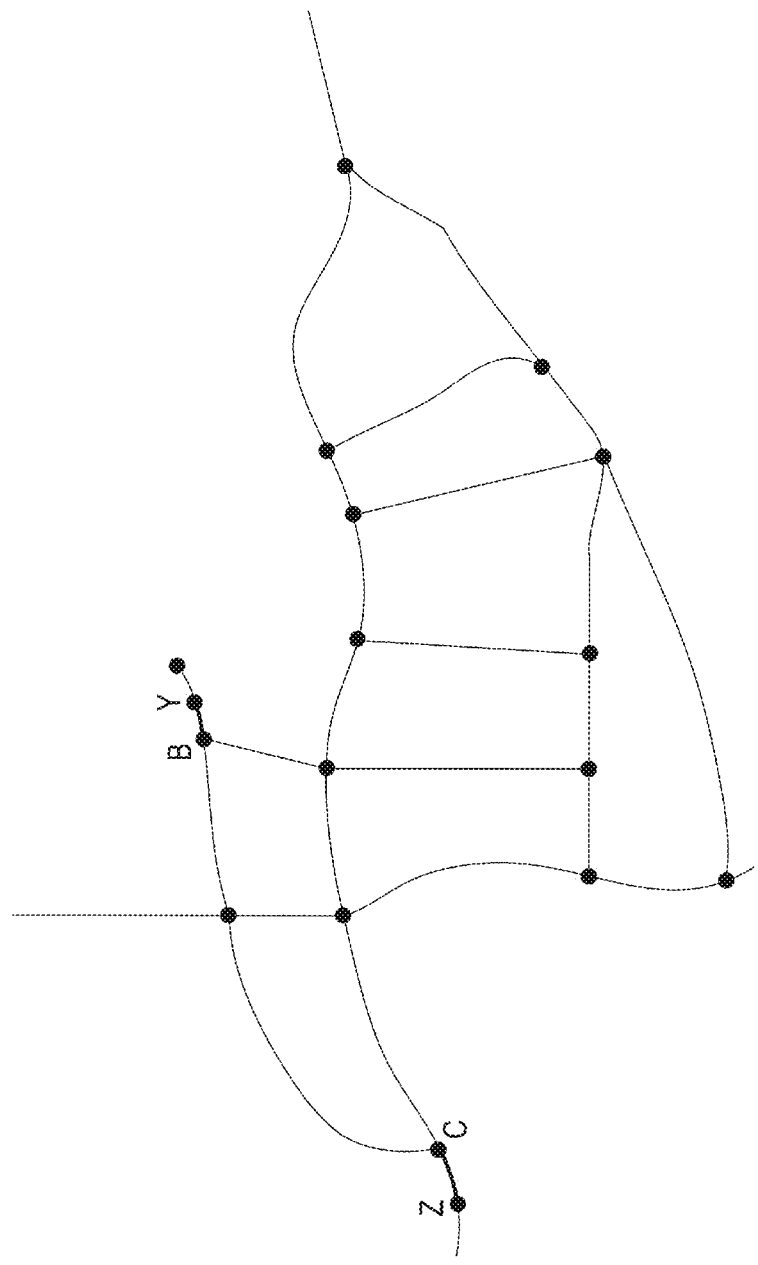
FIG. 49 illustrates points along road segments.

It will be appreciated that in determining a shortest or preferred path between two locations, those two locations will not always fall at an end of a road segment. For example FIG. 48 illustrates an exemplary graphical user interface comprising a map with a first placement marker 106 indicating a start location and second placement marker 108 indicating a desired destination location. Stored data regarding points along road segments enables determination of what road segment the placement marker 106 lies on (or is closest to), as well as determination of a distance from that point to an end of that road segment. FIG. 49 illustrates this in a fanciful manner.

Precomputing Shortest Path Matrices

Figure 50:
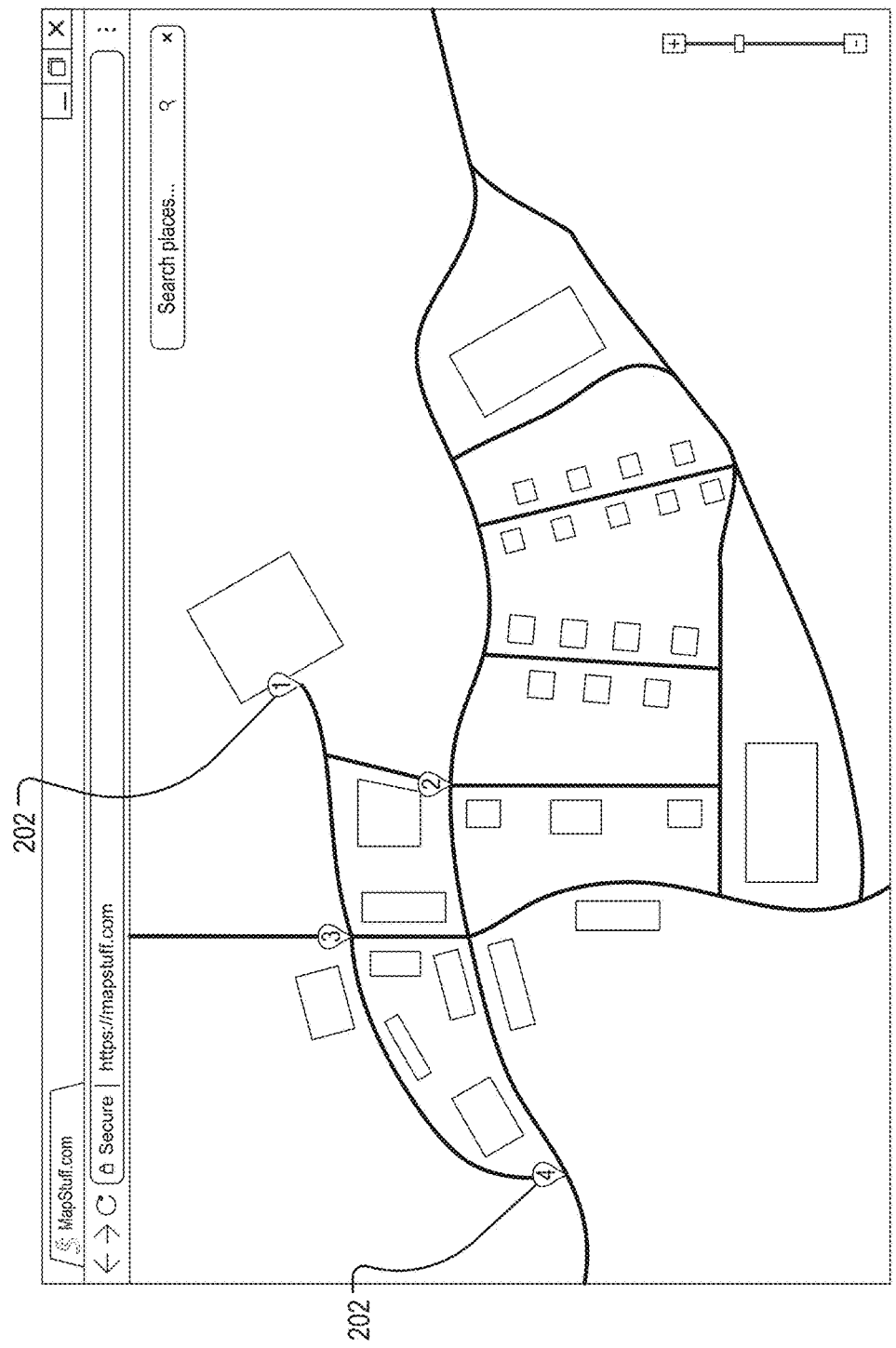
FIG. 50 illustrates an exemplary graphical user interface with markers indicating locations to be visited.

It will be appreciated that it can be useful to determine not only the shortest path between two locations, but also a preferred or optimized route for visiting multiple locations. For example, FIG. 50 illustrates an exemplary graphical user interface comprising a map with placement markers 202 indicating locations to be visited. These can represent locations for use in a routing problem, in which a high quality routing solution is to be determined which involves visiting of all of the specified locations.

In accordance with one or more preferred implementations, determination of a routing solution to a routing problem involves precomputation of information regarding shortest or optimal paths between locations to be visited for the routing problem. This information can be stored in one or more matrices, which can be characterized as shortest path matrices.

Figure 51:
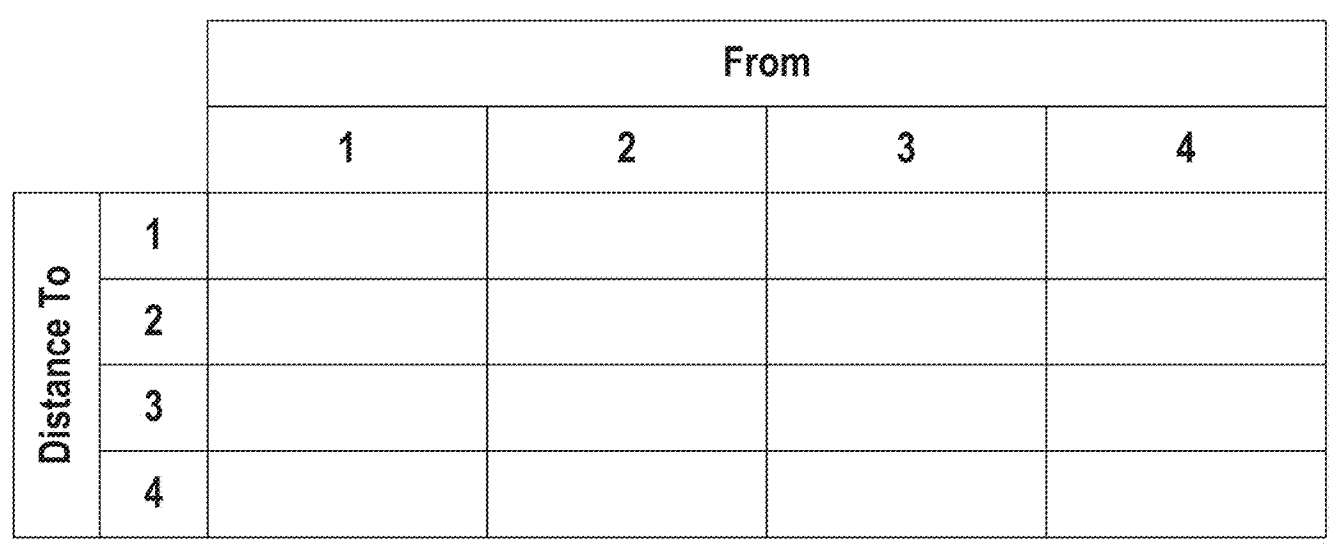

For example, FIG. 51 illustrates a simple two-dimensional grid for distance values for shortest paths between each location.

Figure 52:
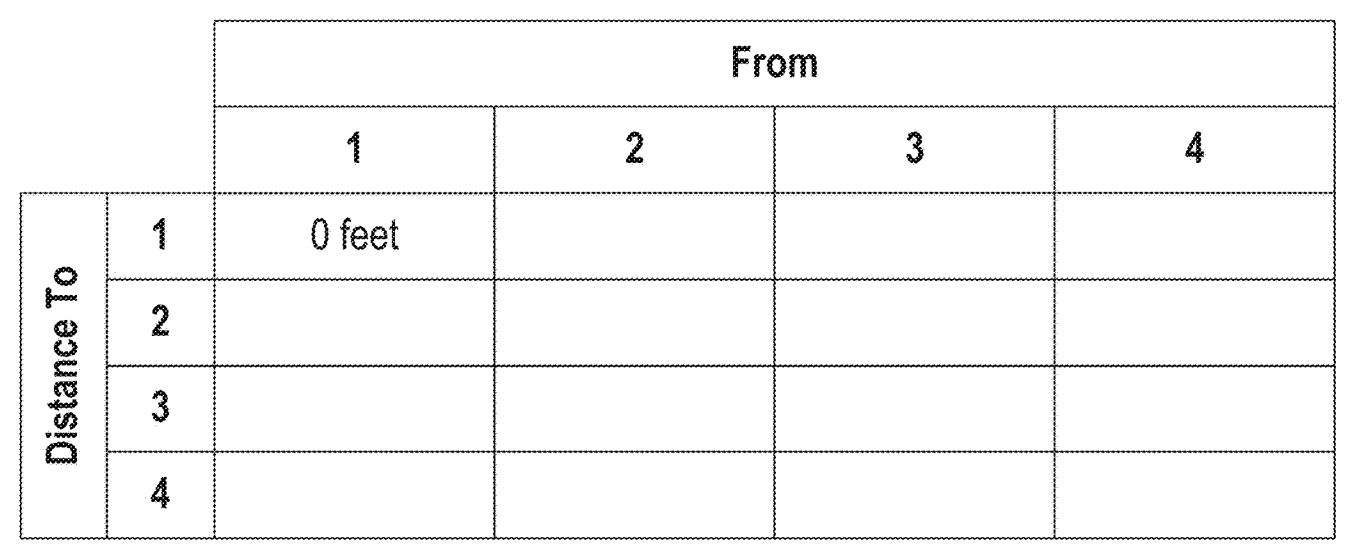

As illustrated in FIG. 52, the distance between any location and itself (e.g. From "1" to "1") would be zero.

Other distance values for each square can be determined based on a determined shortest path, e.g. as described hereinabove.

Figure 53:
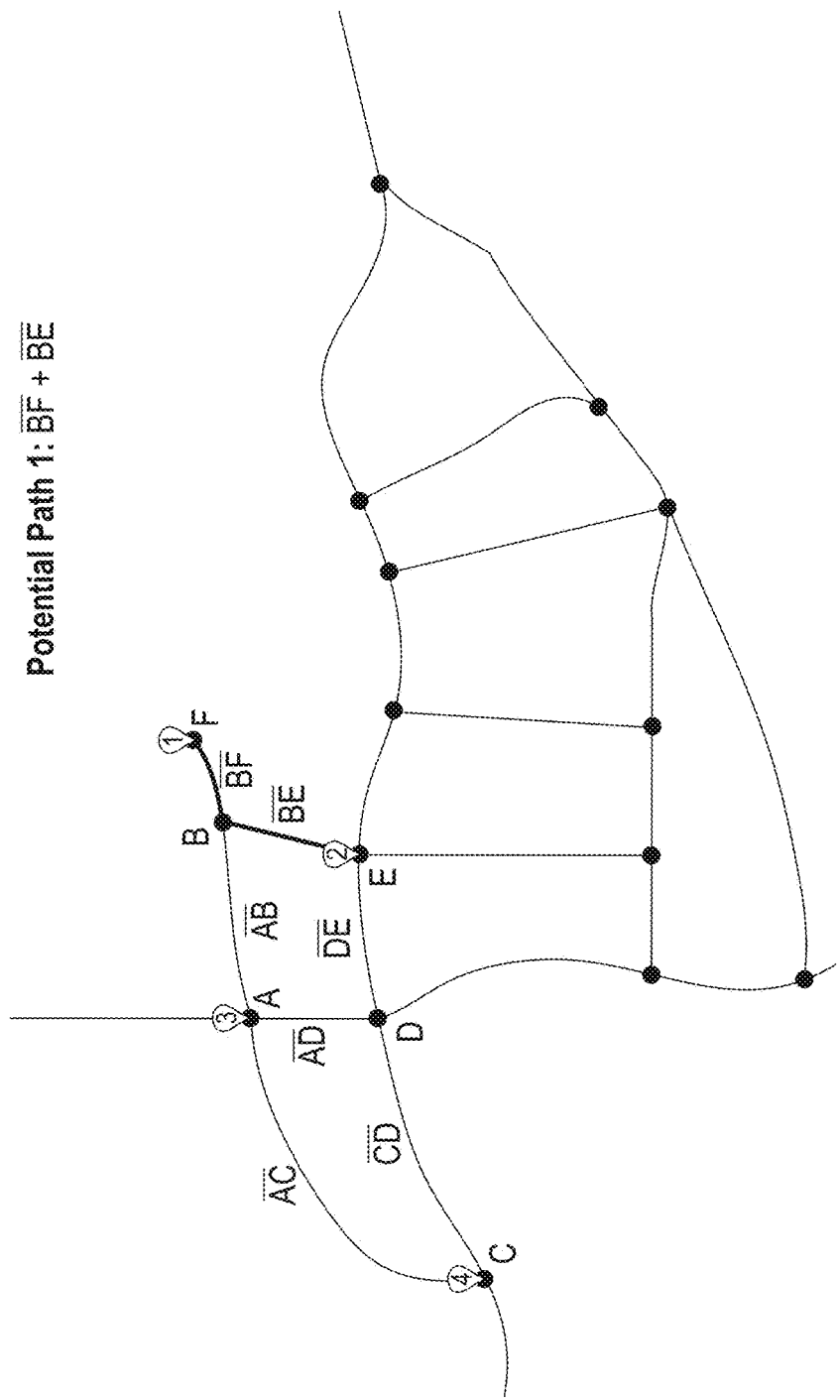
FIG. 53 illustrates a first potential path between two locations.
Figure 54:
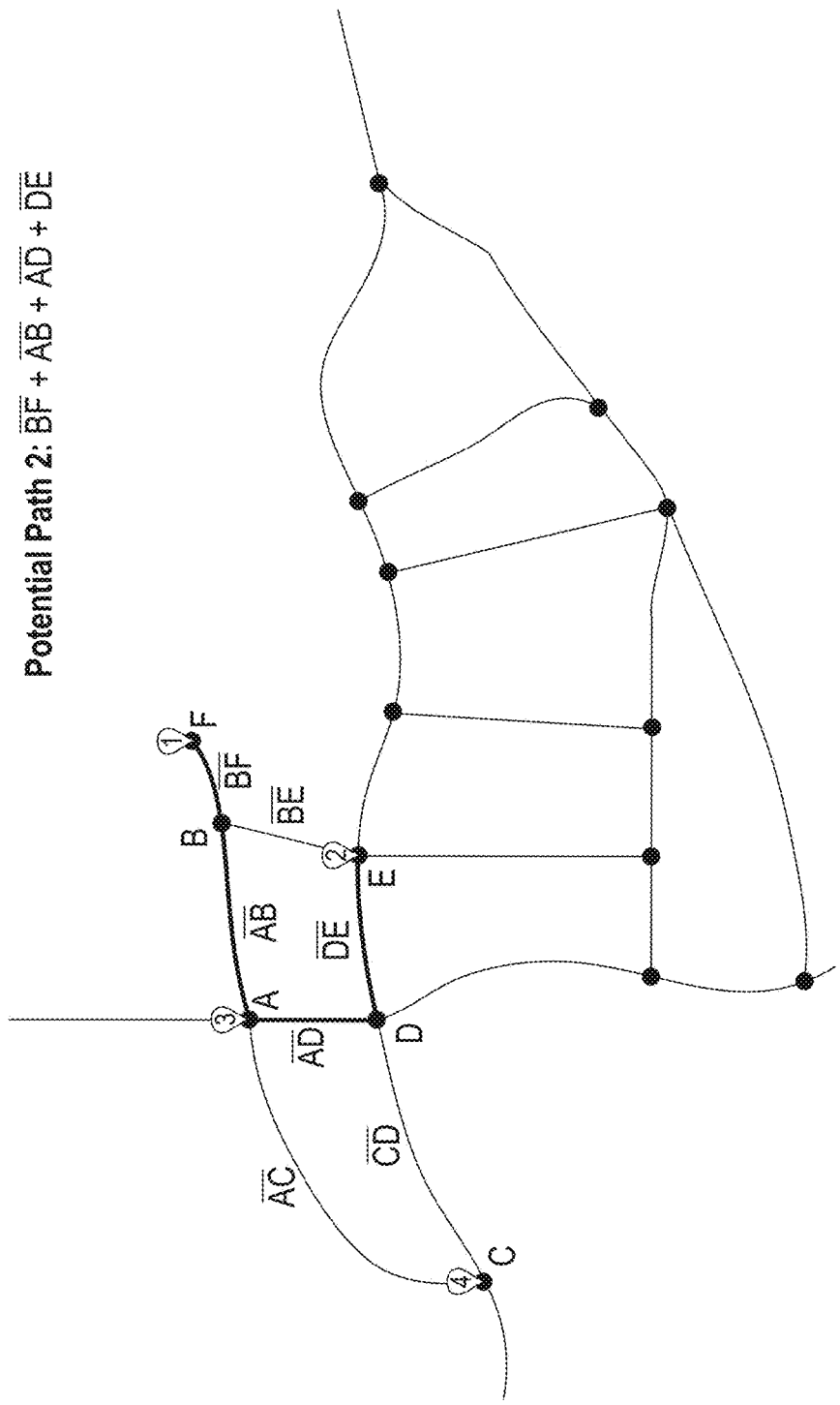
FIG. 54 illustrates a second potential path between the two points of FIG. 53.

As an example, consider travel from location "1" to location "2". As illustrated in FIG. 53, a first potential path would involve traversing road segments BF and BE. Similarly, as illustrated in FIG. 54, a second potential path would involve traversing road segments BF, AB, AD, and DE. As noted above, other paths could be considered as well, or another methodology could be utilized to determine a shortest path (and corresponding distance).

FIG. 55 illustrates calculation of total distance values for each of these paths, and FIG. 56 illustrates identification of the value "429" as the calculated total distance value for the determined shortest path for traversal from location "1" to location "2".

Figure 57:
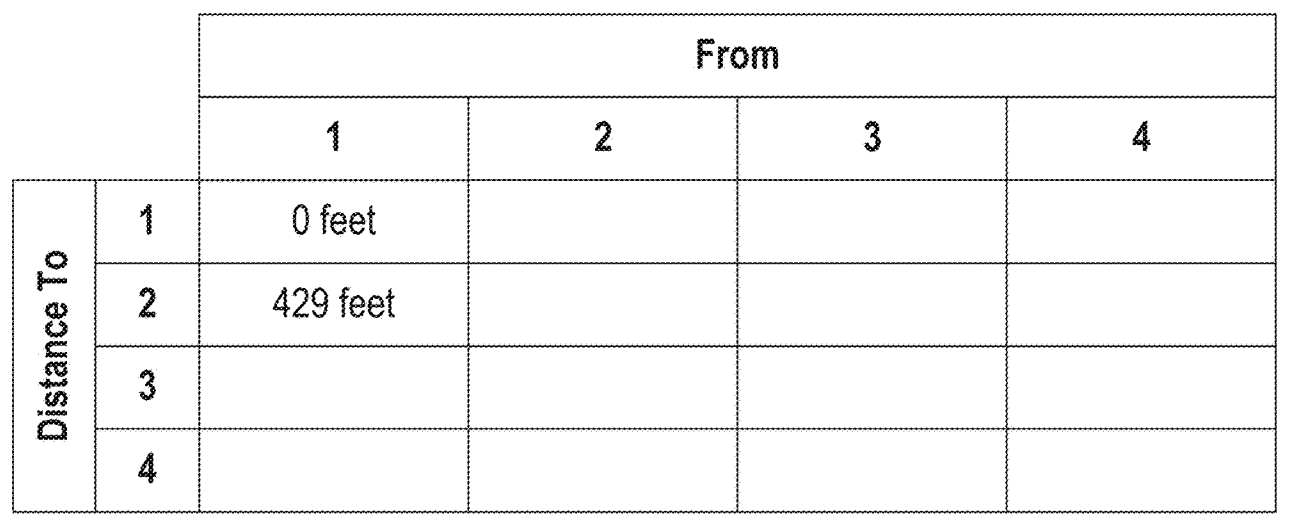

This calculated total distance value for the determined shortest path for traversal from location "1" to location "2" can be stored as a precalculated value in a travel distance matrix, as illustrated in FIG. 57. In this simplistic example, all of the road segments are characterized as bidirectional road segments having the same travel distance in both directions, so a distance value for the shortest path from location "1" to location "2" would be the same as a distance value for the shortest path from location "2" to location "1", as illustrated in FIG. 58.

A shortest path, and distance value therefore, can similarly be determined for traveling from each location to each other location, as illustrated in FIG. 59.

Figure 60:
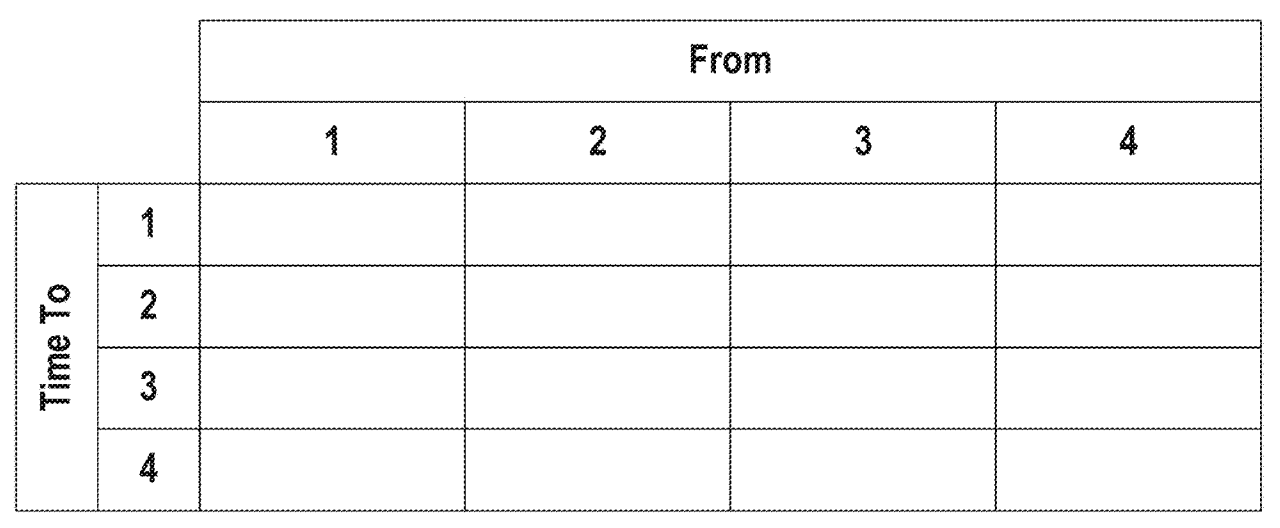

Further, an estimated time value can similarly be calculated for a shortest path between each location. For example, FIG. 60 illustrates a simple two-dimensional grid for estimated time values for shortest paths between each location.

Just like calculated total distance values, estimated time values for each square can be calculated based on a determined shortest path, e.g. as described hereinabove.

As an example, again consider travel from location "1" to location "2", this time using directional road segments (e.g. where travel from A to B in a first direction along road segment AB might have a first estimated travel time and travel from B to A in a second, opposite direction along road segment BA might have a second estimated travel time which may be, but does not have to be, different from the first estimated travel time).

Figure 61:
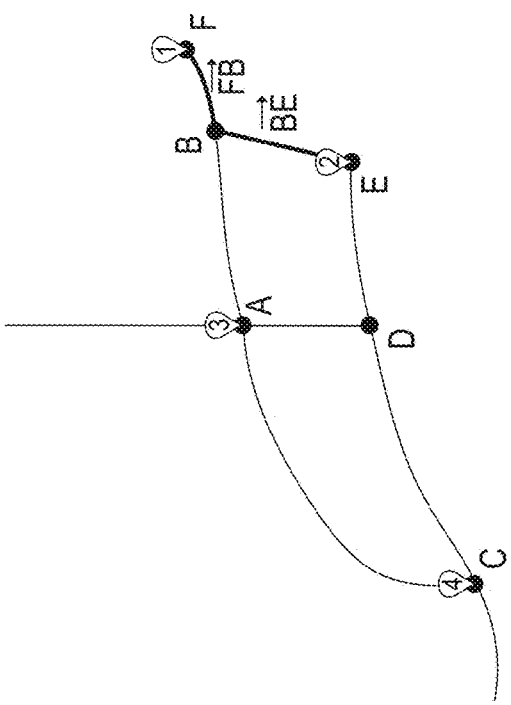
FIGS. 61-62 illustrate a first and second potential path between two locations and the estimated travel time.
Figure 62:
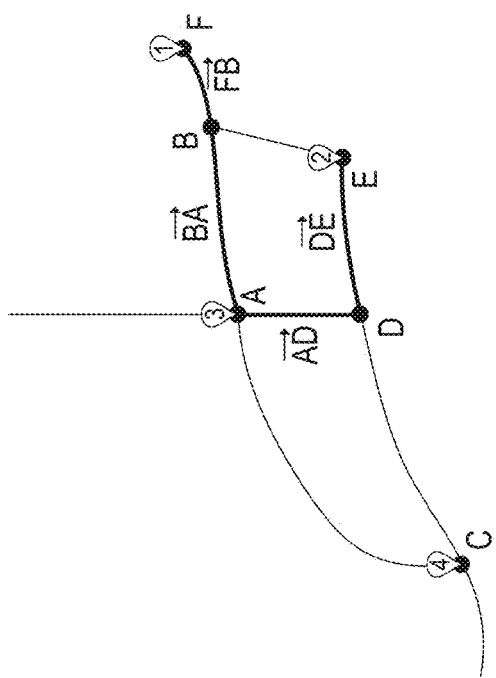

FIG. 61 illustrates a first potential path involving traversing road segments BF and BE, and calculation of an estimated travel time of 30 seconds. Similarly, FIG. 62 illustrates a second potential path involving traversing road segments FB, BA, AD, and DE, and calculation of an estimated travel time of 99 seconds. As noted above, other paths could be considered as well. A shortest path could be determined to be the shortest based on having a lowest estimated travel time. Another methodology could be utilized to determine a shortest path (and estimated travel time).

FIG. 63 illustrates identification of thirty seconds as the calculated total estimated travel time value for the determined shortest path for traversal from location "1" to location "2".

Figure 64:
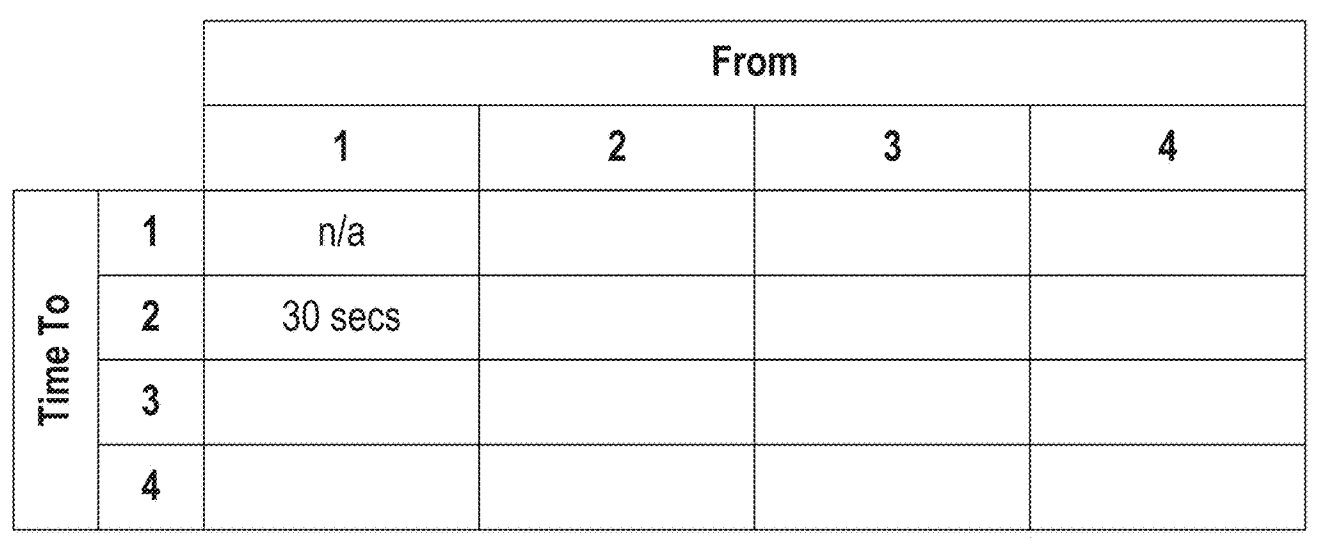

This calculated total estimated travel time value for the determined shortest path for traversal from location "1" to location "2" can be stored as a precalculated value in a travel time matrix, as illustrated in FIG. 64. Unlike the previous example, it cannot necessarily be assumed that the same total estimated travel time for a shortest path will hold for traversal from location "2" to location "1".

Thus, it necessary to also consider travel from location "2" to location "1".

Figure 65:
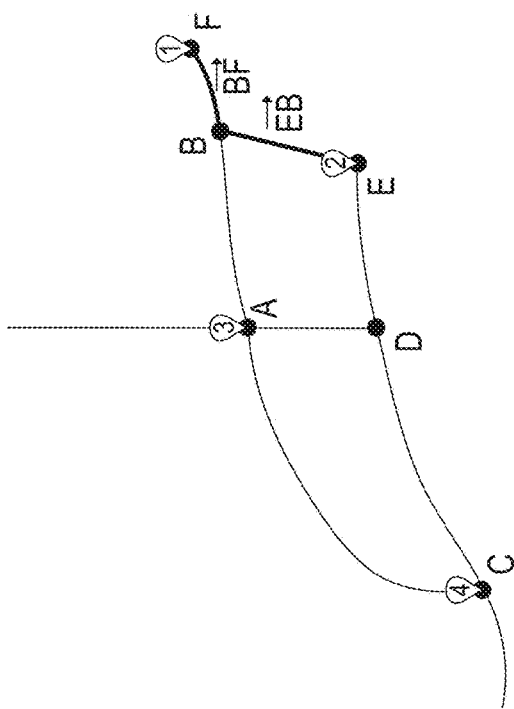
FIG. 65 illustrates a first potential path between the two locations of FIGS. 61-62 in the opposite direction and the estimated travel time.
Figure 66:
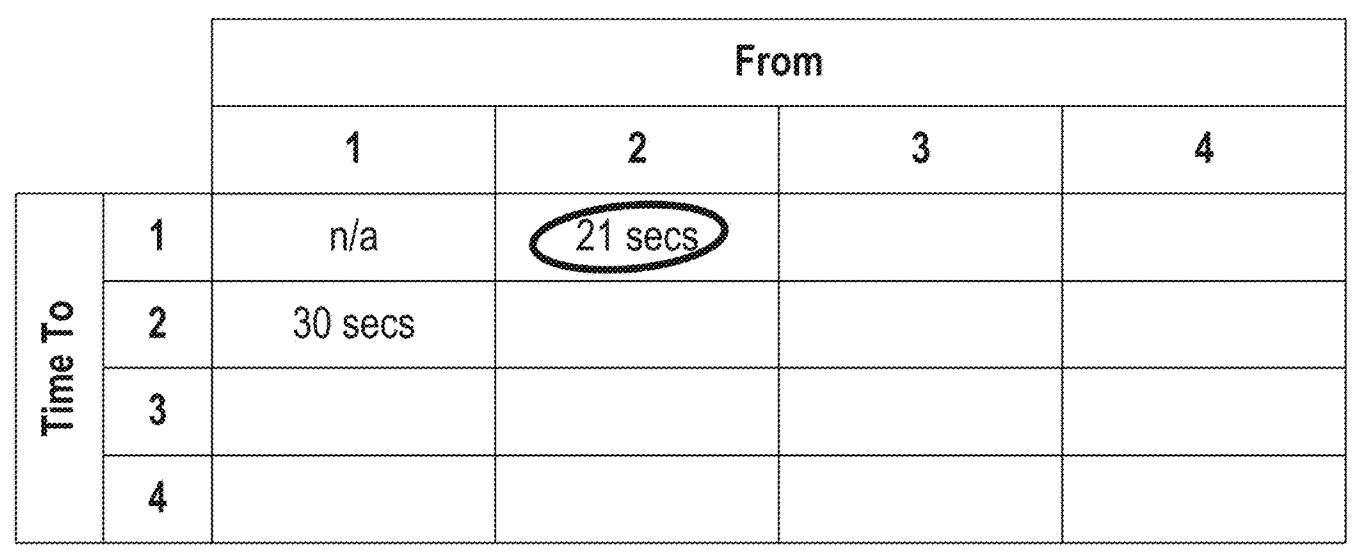

FIG. 65 illustrates a first potential path involving traversing road segments EB and BF, and calculation of an estimated travel time of 21 seconds. This estimated travel time of 21 seconds can be determined to be the estimated travel time for the shortest path from location "2" to location "1", and can be stored as a precalculated value in a travel time matrix, as illustrated in FIG. 66.

A shortest path, and estimated travel time value therefore, can similarly be determined for traveling from each location to each other location, as illustrated in FIG. 67.

These calculated estimated travel time values can even be stored in a matrix together with calculated distance values, as illustrated in FIG. 68.

As noted above, it will be appreciated that traffic patterns may frequently allow for quicker traversal of a road segment (or navigation from one road segment to another) at certain times of the day, and slower traversal at other times. As described above, to account for this, exemplary average travel times may be determined for windows throughout the day, e.g. for 24 one hour windows, as illustrated in FIGS. 33-34, and determination of a shortest path may involve utilizing the time estimates for a window within which a current time falls, or within which an estimated time of travel falls.

Figure 69:
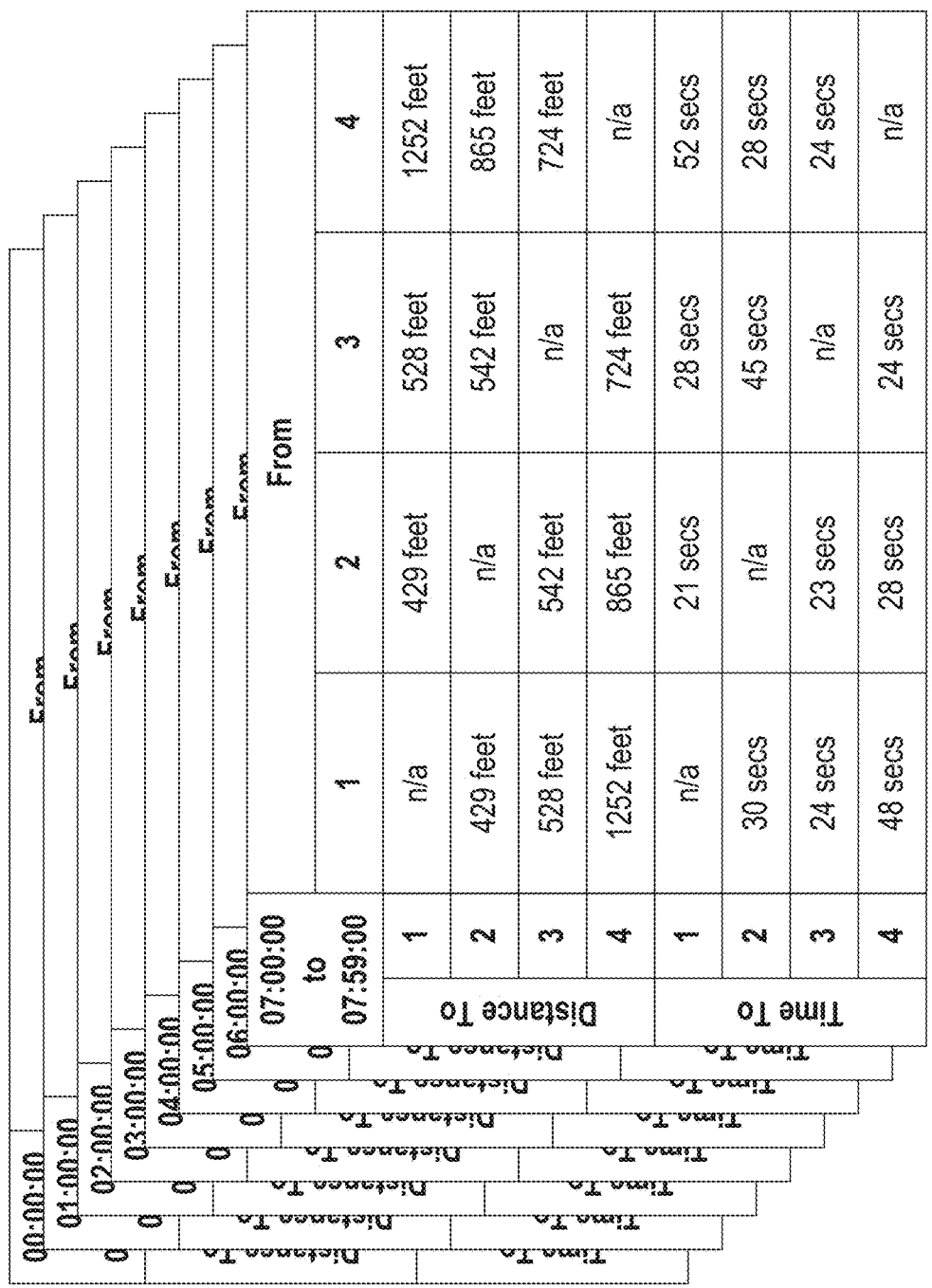
FIG. 69 illustrates a matrix with travel times and distances for multiple time windows each corresponding to an hour of a twenty four hour day.

Similarly, a matrix containing calculated values for determined shortest paths may be precomputed and stored for time windows throughout the day, e.g. for 24 one hour windows, as illustrated in FIG. 69.

Determining High Quality Routes Utilizing Precomputed Shortest Path Matrices

As noted above, it will be appreciated that it can be useful to determine not only the shortest path between two locations, but also a preferred or optimized route for visiting multiple locations. These can represent locations for use in a routing problem, in which one or more preferred or optimized routing solutions are to be determined which involve visiting of all of the specified locations. In accordance with one or more preferred implementations, one or more optimized routes may be determined which represent part of a high quality routing solution. In accordance with one or more preferred implementations, one or more optimized routing solutions may be determined which represent high quality routing solutions, even if they have not been determined or confirmed to be an optimal routing solution.

Returning to the example of FIG. 50, an exemplary approach to determining a high quality routing solution for visiting all four locations will now be outlined utilizing the calculated travel times in the precomputed shortest path matrix of FIG. 67.

Figure 70:
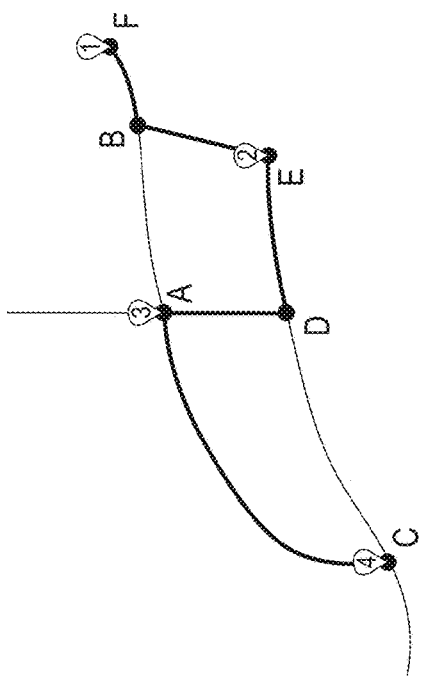
FIGS. 70-73 illustrate four potential routes visiting all four locations illustrated in FIG. 50.

FIG. 70 illustrates a first potential route visiting all four locations which involves traversal from location "1" to location "2", traversal from location "2" to location "3", and traversal from location "3" to location "4". A total estimated travel time for this route can be determined utilizing the precalculated shortest estimated travel times for shortest paths between these locations in the precomputed shortest path matrix. Thus, the route portion representing traversal from location "1" to location "2" can be determined based on the precomputed shortest path matrix to have an estimated travel time of 30 seconds, the route portion representing traversal from location "2" to location "3" can be determined based on the precomputed shortest path matrix to have an estimated travel time of 23 seconds, and the route portion representing traversal from location "3" to location "4" can be determined based on the precomputed shortest path matrix to have an estimated travel time of 24 seconds. A total estimated travel time for the route can be calculated by summing together these estimated travel times for these route portions. This results in a total estimated travel time for the first potential route of 77 seconds, as illustrated in FIG. 70.

Figure 71:
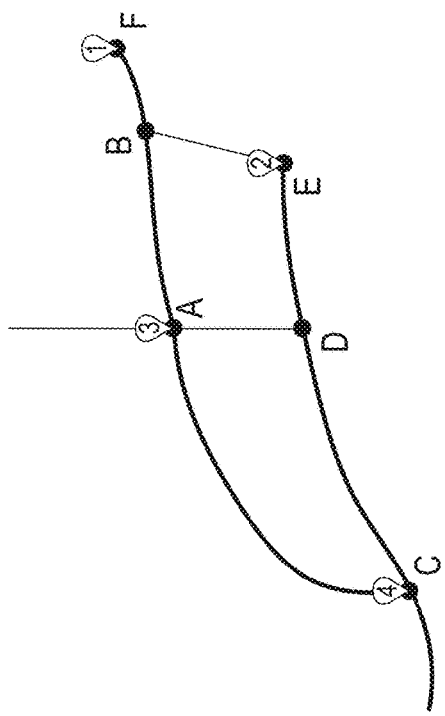

FIG. 71 illustrates a second potential route visiting all four locations which involves traversal from location "1" to location "3", traversal from location "3" to location "4", and traversal from location "4" to location "2". The route portion representing traversal from location "1" to location "3" can be determined based on the precomputed shortest path matrix to have an estimated travel time of 24 seconds, the route portion representing traversal from location "3" to location "4" can be determined based on the precomputed shortest path matrix to have an estimated travel time of 24 seconds, and the route portion representing traversal from location "4" to location "2" can be determined based on the precomputed shortest path matrix to have an estimated travel time of 28 seconds. These calculated estimated travel times for the route portions can be summed together to result in a total estimated travel time for the second potential route of 76 seconds, as illustrated in FIG. 71.

Figure 72:
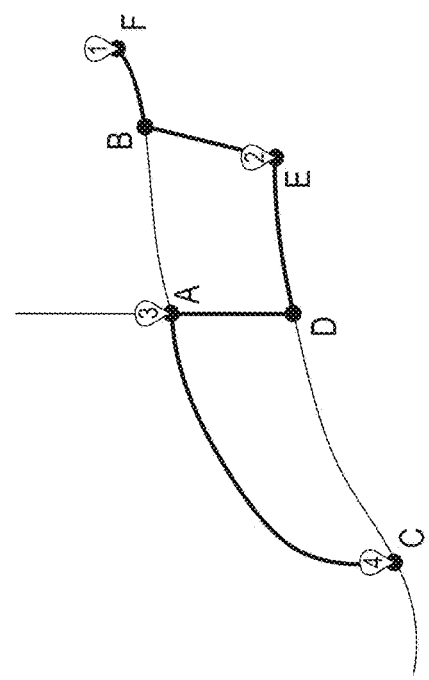

FIG. 72 illustrates a third potential route visiting all four locations which involves traversal from location "4" to location "3", traversal from location "3" to location "2", and traversal from location "2" to location "1". The route portion representing traversal from location "4" to location "3" can be determined based on the precomputed shortest path matrix to have an estimated travel time of 24 seconds, the route portion representing traversal from location "3" to location "2" can be determined based on the precomputed shortest path matrix to have an estimated travel time of 45 seconds, and the route portion representing traversal from location "2" to location "1" can be determined based on the precomputed shortest path matrix to have an estimated travel time of 21 seconds. These calculated estimated travel times for the route portions can be summed together to result in a total estimated travel time for the third potential route of 90 seconds, as illustrated in FIG. 72.

Figure 73:
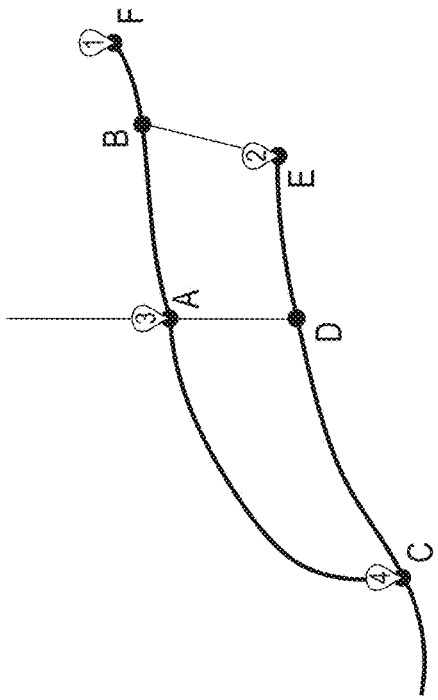

FIG. 73 illustrates a fourth potential route visiting all four locations which involves traversal from location "2" to location "4", traversal from location "4" to location "3", and traversal from location "3" to location "1". The route portion representing traversal from location "2" to location "4" can be determined based on the precomputed shortest path matrix to have an estimated travel time of 28 seconds, the route portion representing traversal from location "4" to location "3" can be determined based on the precomputed shortest path matrix to have an estimated travel time of 24 seconds, and the route portion representing traversal from location "3" to location "1" can be determined based on the precomputed shortest path matrix to have an estimated travel time of 28 seconds. These calculated estimated travel times for the route portions can be summed together to result in a total estimated travel time for the fourth potential route of 90 seconds, as illustrated in FIG. 73.

A preferred or optimized route can be identified based on the calculated total estimated travel times for each potential route, as illustrated in FIG. 74.

It will be appreciated that more or less paths may be identified. For example, a search for routes may involve a breadth first or depth first traversal of paths in an attempt to determine one or more paths.

Further, other methodologies and approaches may additionally or alternatively be utilized for determining a shortest, optimized, or preferred route. For example, a search for a shortest, optimized, or preferred route may involve one or more breadth first traversals of paths in an attempt to determine a shortest, optimized, or preferred route, e.g. a depth first traversal from each of one or more locations identified as being geographically exterior to other locations.

It will be appreciated that routing problems can take various forms. For example, a routing problem may involve determining an optimized route for not just one vehicle, but two or more vehicles, e.g. a fleet of vehicles.

Figure 75:
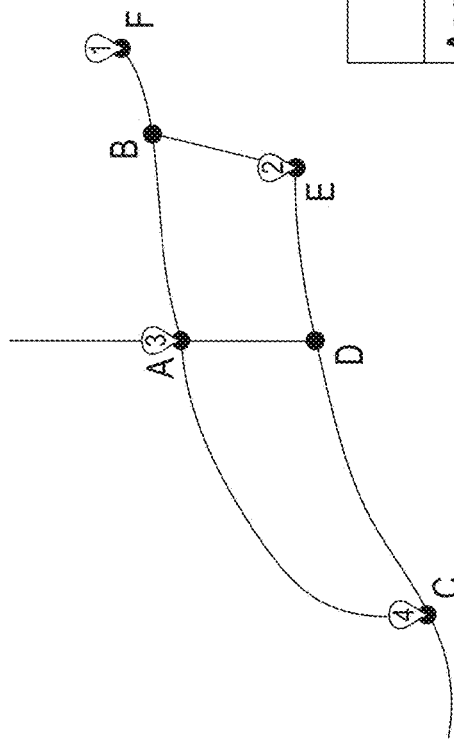
FIG. 75 illustrates three potential assignments of trucks for a routing problem.

Returning again to the locations illustrated in FIG. 50, consider such a routing problem in which two trucks are to visit the four locations (assuming that each truck is to visit two of the locations). FIG. 75 illustrates potential assignments of the trucks for solution of the routing problem. An exemplary approach to determining preferred or optimized assignments for a high quality routing solution will now be outlined utilizing the calculated travel times in the precomputed shortest path matrix of FIG. 67.

Figure 76:
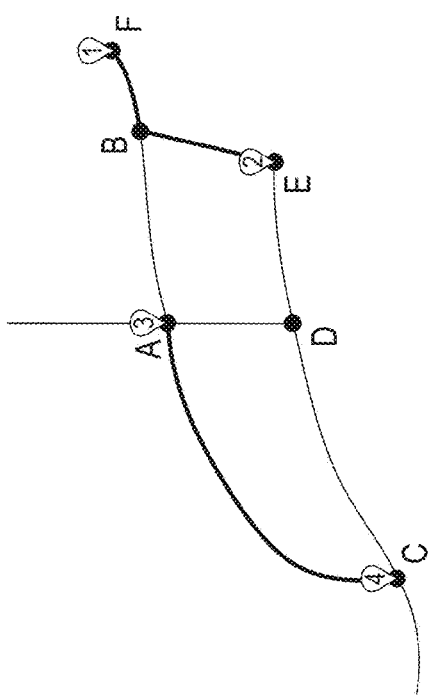
FIGS. 76-77 fancifully illustrate determination of an estimated travel time for a first potential assignment of two trucks.

FIG. 76 illustrates a first potential assignment for two trucks. This first potential assignment involves, for a first truck, use of either a first potential route involving traversal from location "1" to location "2", or a second potential route involving traversal from location "2" to location "1". A total estimated travel time for each potential route for the first truck can be determined utilizing the precalculated shortest estimated travel times for shortest paths between these locations in the precomputed shortest path matrix. Thus, the route involving traversal from location "1" to location "2" can be determined based on the precomputed shortest path matrix to have a total estimated travel time of 30 seconds, and the route involving traversal from location "2" to location "1" can be determined based on the precomputed shortest path matrix to have a total estimated travel time of 21 seconds.

This first potential assignment further involves, for a second truck, use of either a first potential route involving traversal from location "3" to location "4", or a second potential route involving traversal from location "4" to location "3". A total estimated travel time for each potential route for the second truck can be determined utilizing the precalculated shortest estimated travel times for shortest paths between these locations in the precomputed shortest path matrix. Thus, the route involving traversal from location "3" to location "4" can be determined based on the precomputed shortest path matrix to have a total estimated travel time of 24 seconds, and the route involving traversal from location "4" to location "3" can be determined based on the precomputed shortest path matrix to have a total estimated travel time of 24 seconds.

Figure 77:
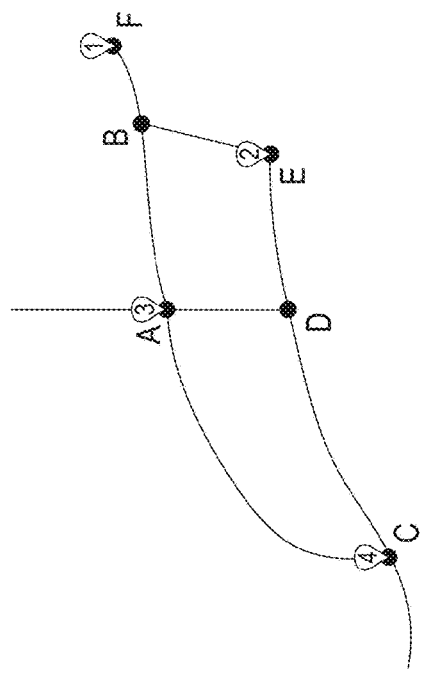

A total estimated travel time for this first potential assignment can be determined by summing together the lowest calculated estimated travel time for each truck, as illustrated in FIGS. 76-77. Here, a total estimated travel time for this first potential assignment can be calculated to be 45 seconds, as illustrated in FIG. 77.

Figure 78:
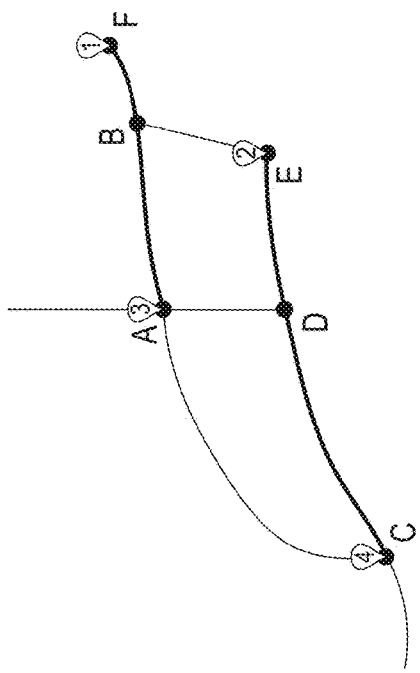
FIG. 78 fancifully illustrates determination of an estimated travel time for a second potential assignment of two trucks.

FIG. 78 illustrates a second potential assignment for two trucks. This second potential assignment involves, for a first truck, use of either a first potential route involving traversal from location "1" to location "3", or a second potential route involving traversal from location "3" to location "1". A total estimated travel time for each potential route for the first truck can be determined utilizing the precalculated shortest estimated travel times for shortest paths between these locations in the precomputed shortest path matrix. Thus, the route involving traversal from location "1" to location "3" can be determined based on the precomputed shortest path matrix to have a total estimated travel time of 24 seconds, and the route involving traversal from location "3" to location "1" can be determined based on the precomputed shortest path matrix to have a total estimated travel time of 28 seconds.

This second potential assignment further involves, for a second truck, use of either a first potential route involving traversal from location "2" to location "4", or a second potential route involving traversal from location "4" to location "2". A total estimated travel time for each potential route for the second truck can be determined utilizing the precalculated shortest estimated travel times for shortest paths between these locations in the precomputed shortest path matrix. Thus, the route involving traversal from location "2" to location "4" can be determined based on the precomputed shortest path matrix to have a total estimated travel time of 28 seconds, and the route involving traversal from location "4" to location "2" can be determined based on the precomputed shortest path matrix to have a total estimated travel time of 28 seconds.

A total estimated travel time for this second potential assignment can be determined by summing together the lowest calculated estimated travel time for each truck, as illustrated in FIG. 78. Here, a total estimated travel time for this first potential assignment can be calculated to be 52 seconds, as illustrated in FIG. 78.

Figure 79:
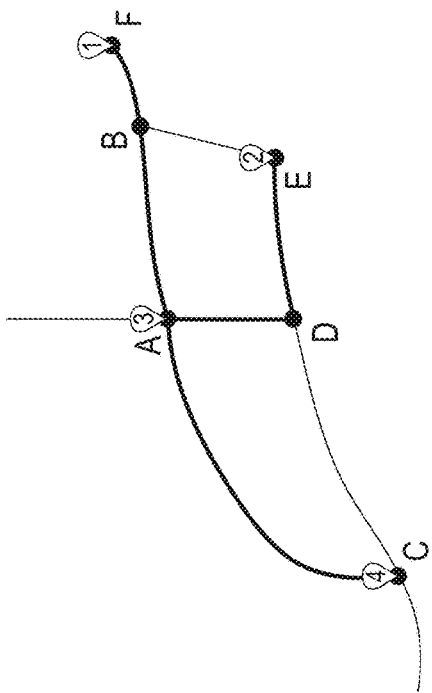
FIG. 79 fancifully illustrates determination of an estimated travel time for a third potential assignment of two trucks.

FIG. 79 illustrates a third potential assignment for two trucks. This third potential assignment involves, for a first truck, use of either a first potential route involving traversal from location "1" to location "4", or a second potential route involving traversal from location "4" to location "1". A total estimated travel time for each potential route for the first truck can be determined utilizing the precalculated shortest estimated travel times for shortest paths between these locations in the precomputed shortest path matrix. Thus, the route involving traversal from location "1" to location "4" can be determined based on the precomputed shortest path matrix to have a total estimated travel time of 48 seconds, and the route involving traversal from location "4" to location "1" can be determined based on the precomputed shortest path matrix to have a total estimated travel time of 52 seconds.

This third potential assignment further involves, for a second truck, use of either a first potential route involving traversal from location "2" to location "3", or a second potential route involving traversal from location "3" to location "2". A total estimated travel time for each potential route for the second truck can be determined utilizing the precalculated shortest estimated travel times for shortest paths between these locations in the precomputed shortest path matrix. Thus, the route involving traversal from location "2" to location "3" can be determined based on the precomputed shortest path matrix to have a total estimated travel time of 23 seconds, and the route involving traversal from location "3" to location "2" can be determined based on the precomputed shortest path matrix to have a total estimated travel time of 45 seconds.

A total estimated travel time for this third potential assignment can be determined by summing together the lowest calculated estimated travel time for each truck, as illustrated in FIG. 79. Here, a total estimated travel time for this first potential assignment can be calculated to be 71 seconds, as illustrated in FIG. 79.

Figure 80:
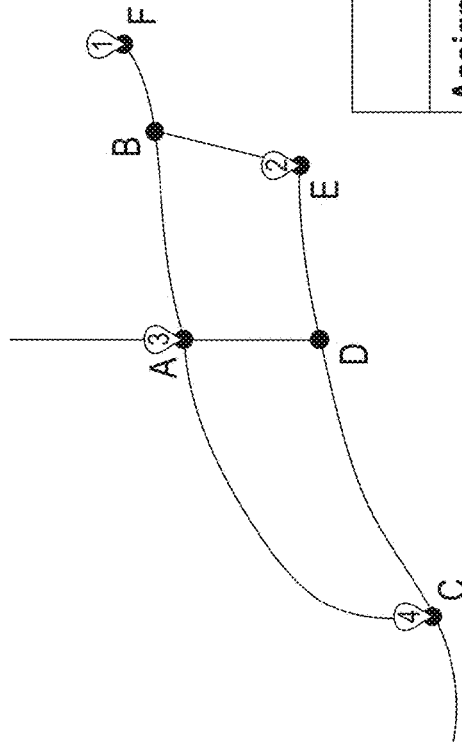
FIG. 80 fancifully illustrates comparison of estimated travel times for different potential assignments of two trucks.

The calculated total estimated travel times for each potential assignment can be compared to determine an optimized or preferred assignment, as illustrated in FIG. 80. The optimized routes that were utilized to determined the calculated total estimated travel times for each potential assignment may be used as optimized routes for a routing solution, or additional determination of optimized routes may be performed.

As noted above, it will be appreciated that routing problems can take various forms. As another example, one or more vehicles may have a set starting location which is to be taken into account in determining a solution.

Figure 81:
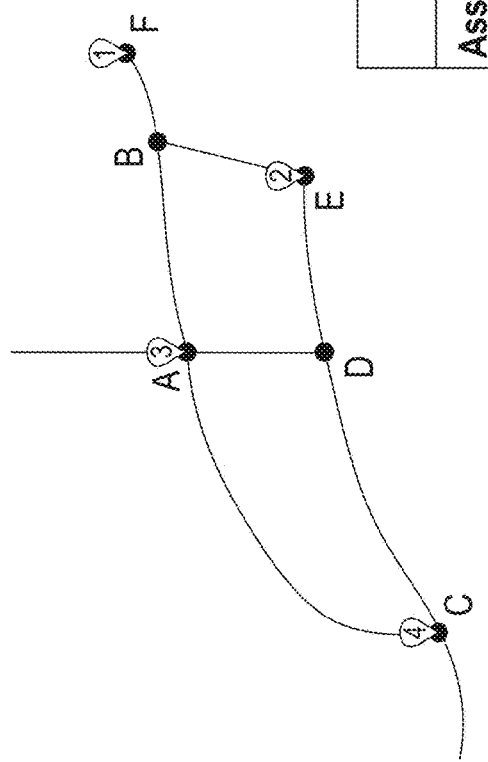
FIG. 81 illustrates three potential assignments of trucks for solution of another routing problem.

Returning again to the locations illustrated in FIG. 50, consider such a routing problem in which two trucks having a set starting location of location "1" are to visit location "2", location "3", and location "4" (assuming that each truck is to visit at least one location). FIG. 81 illustrates potential assignments of the trucks for solution of the routing problem. An exemplary approach to determining preferred or optimized assignments for a high quality routing solution will now be outlined utilizing the calculated travel times in the precomputed shortest path matrix of FIG. 67.

Figure 82:
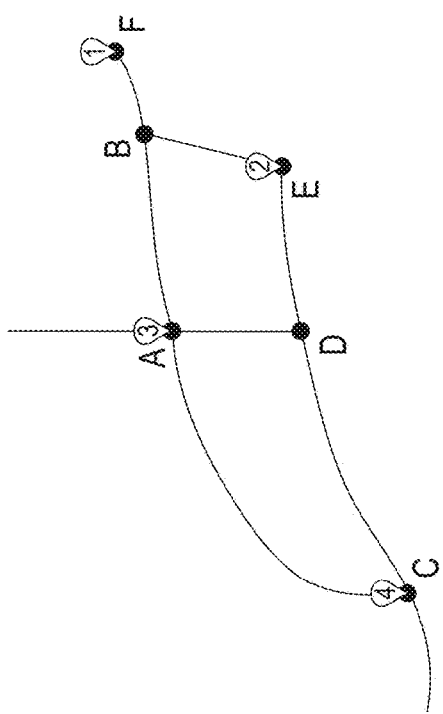
FIGS. 82-84 fancifully illustrate determination of an estimated travel time for first, second, and third potential assignments of two trucks.

FIG. 82 illustrates a first potential assignment for two trucks. This first potential assignment involves, for a first truck, use of either a first potential route involving traversal from location "1" to location "2" and traversal from location "2" to location "3", or a second potential route involving traversal from location "1" to location "3" and traversal from location "3" to location "2". A total estimated travel time for each potential route for the first truck can be determined utilizing the precalculated shortest estimated travel times for shortest paths between these locations in the precomputed shortest path matrix. Thus, the route involving traversal from location "1" to location "2" and traversal from location "2" to location "3" can be determined based on the precomputed shortest path matrix to have a total estimated travel time of 53 seconds, and the route involving traversal from location "1" to location "3" and traversal from location "3" to location "2" can be determined based on the precomputed shortest path matrix to have a total estimated travel time of 69 seconds.

This first potential assignment further involves, for a second truck, use of a potential route involving traversal from location "1" to location "4". A total estimated travel time for this potential route for the second truck can be determined utilizing the precalculated shortest estimated travel times for shortest paths between these locations in the precomputed shortest path matrix. Thus, the route involving traversal from location "1" to location "4" can be determined based on the precomputed shortest path matrix to have a total estimated travel time of 48 seconds.

A total estimated travel time for this first potential assignment can be determined by summing together the lowest calculated estimated travel time for each truck, as illustrated in FIG. 82. Here, a total estimated travel time for this first potential assignment can be calculated to be 101 seconds, as illustrated in FIG. 82.

FIG. 82 illustrates a second potential assignment for two trucks. This second potential assignment involves, for a first truck, use of either a first potential route involving traversal from location "1" to location "2" and traversal from location "2" to location "4", or a second potential route involving traversal from location "1" to location "4" and traversal from location "4" to location "2". A total estimated travel time for each potential route for the first truck can be determined utilizing the precalculated shortest estimated travel times for shortest paths between these locations in the precomputed shortest path matrix. Thus, the route involving traversal from location "1" to location "2" and traversal from location "2" to location "4" can be determined based on the precomputed shortest path matrix to have a total estimated travel time of 58 seconds, and the route involving traversal from location "1" to location "4" and traversal from location "4" to location "2" can be determined based on the precomputed shortest path matrix to have a total estimated travel time of 76 seconds.

This second potential assignment further involves, for a second truck, use of a potential route involving traversal from location "1" to location "3". A total estimated travel time for this potential route for the second truck can be determined utilizing the precalculated shortest estimated travel times for shortest paths between these locations in the precomputed shortest path matrix. Thus, the route involving traversal from location "1" to location "3" can be determined based on the precomputed shortest path matrix to have a total estimated travel time of 24 seconds.

Figure 83:
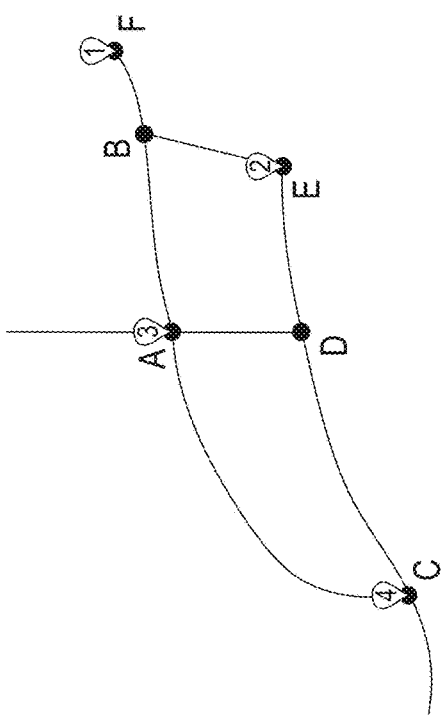

A total estimated travel time for this second potential assignment can be determined by summing together the lowest calculated estimated travel time for each truck, as illustrated in FIG. 83. Here, a total estimated travel time for this first potential assignment can be calculated to be 82 seconds, as illustrated in FIG. 83.

FIG. 83 illustrates a third potential assignment for two trucks. This third potential assignment involves, for a first truck, use of either a first potential route involving traversal from location "1" to location "3" and traversal from location "3" to location "4", or a second potential route involving traversal from location "1" to location "4" and traversal from location "4" to location "3". A total estimated travel time for each potential route for the first truck can be determined utilizing the precalculated shortest estimated travel times for shortest paths between these locations in the precomputed shortest path matrix. Thus, the route involving traversal from location "1" to location "3" and traversal from location "3" to location "4" can be determined based on the precomputed shortest path matrix to have a total estimated travel time of 48 seconds, and the route involving traversal from location "1" to location "4" and traversal from location "4" to location "3" can be determined based on the precomputed shortest path matrix to have a total estimated travel time of 72 seconds.

This third potential assignment further involves, for a second truck, use of a potential route involving traversal from location "1" to location "2". A total estimated travel time for this potential route for the second truck can be determined utilizing the precalculated shortest estimated travel times for shortest paths between these locations in the precomputed shortest path matrix. Thus, the route involving traversal from location "1" to location "2" can be determined based on the precomputed shortest path matrix to have a total estimated travel time of 30 seconds.

Figure 84:
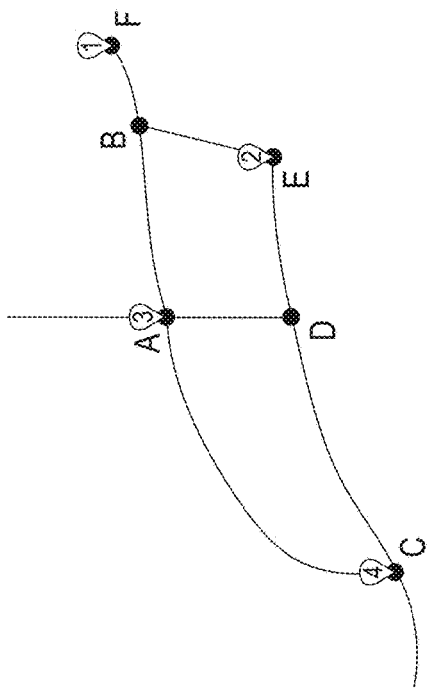

A total estimated travel time for this second potential assignment can be determined by summing together the lowest calculated estimated travel time for each truck, as illustrated in FIG. 84. Here, a total estimated travel time for this first potential assignment can be calculated to be 78 seconds, as illustrated in FIG. 84.

Figure 85:
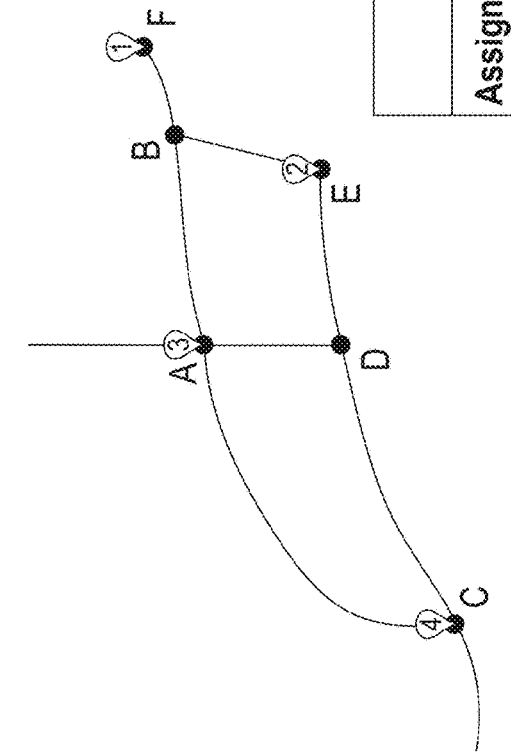
FIG. 85 fancifully illustrates determination of an estimated travel time for a third potential assignment of two trucks.

The calculated total estimated travel times for each potential assignment can be compared to determine an optimized or preferred assignment, as illustrated in FIG. 85. The optimized routes that were utilized to determine the calculated total estimated travel times for each potential assignment may be used as optimized routes for a routing solution, or additional determination of optimized routes may be performed.

Figure 87:
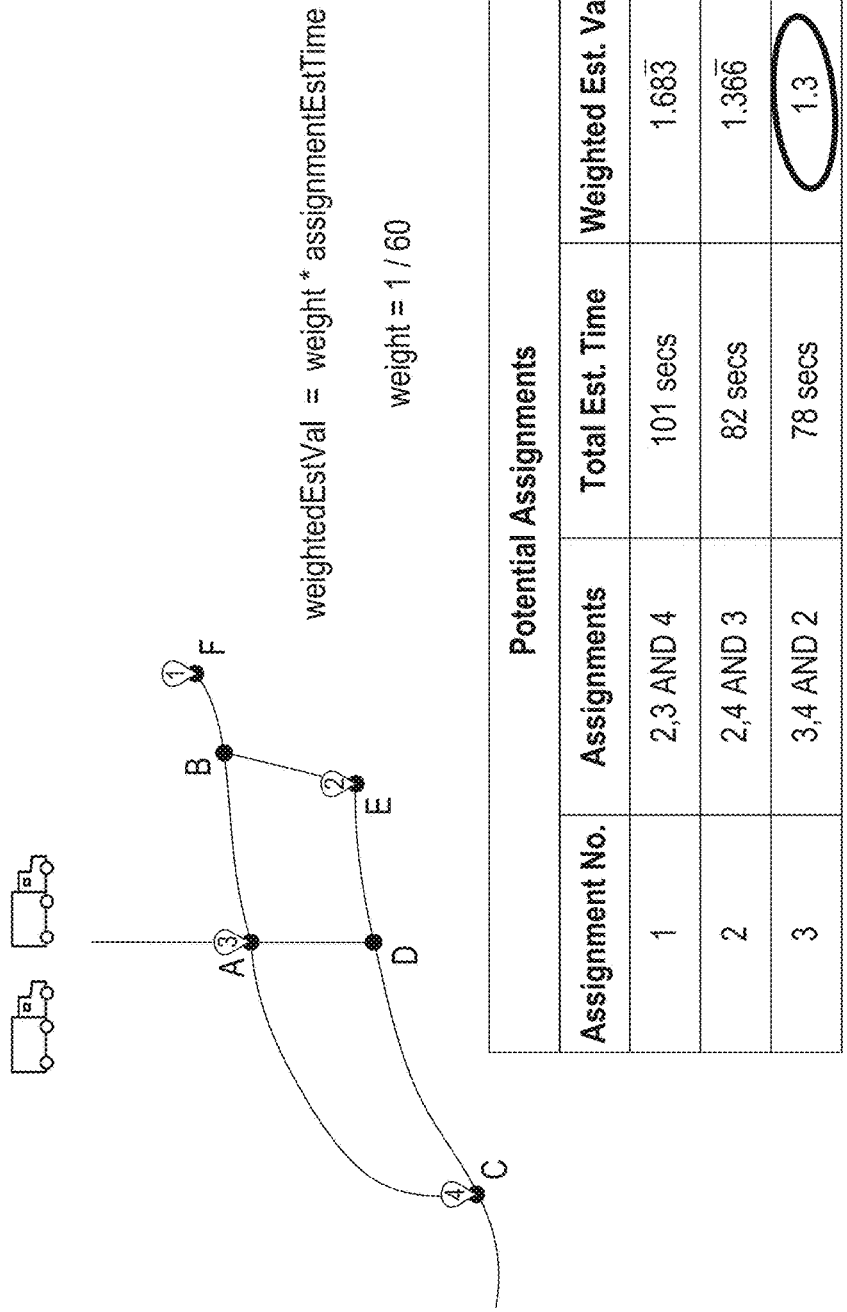
FIG. 87 illustrates calculation of weighted estimated time values for potential assignments.

Notably, calculated values, such as a calculated estimated time value, may be weighted, e.g. for calculations for determining a shortest, optimal, or preferred path, assignment, or route. For example, FIG. 86 illustrates weighting of an estimated time value for an assignment, and FIG. 87 illustrates calculation of such weighted estimated time values for potential assignments.

Figure 89:
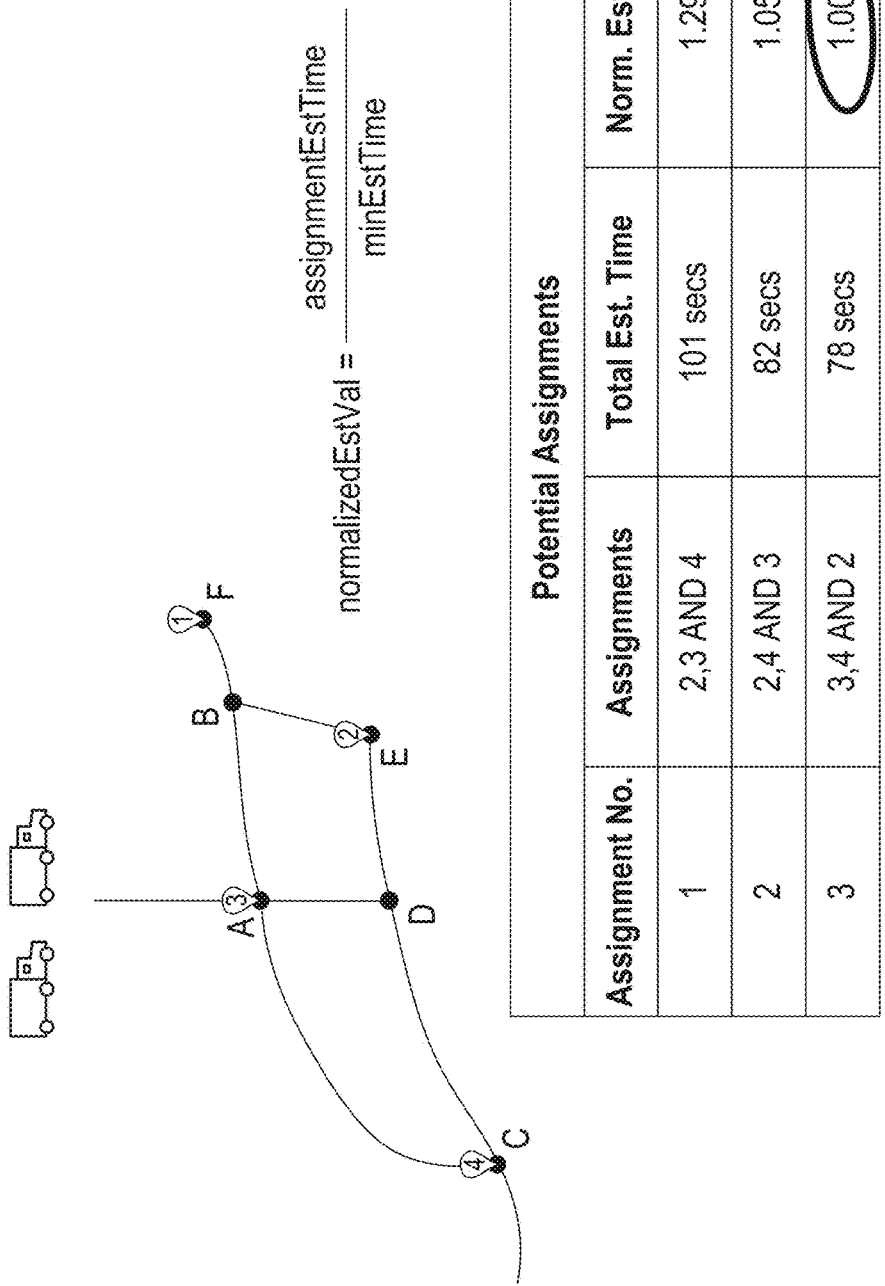
FIG. 89 illustrates calculation of normalized estimated time values for potential assignments.

Further, calculated values, such as a calculated estimated time value, may be normalized, e.g. for calculations for determining a shortest, optimal, or preferred path, or preferred or optimized assignment or route. For example, FIG. 88 illustrates calculation of a normalized value for an estimated time value for an assignment, and FIG. 89 illustrates calculation of such normalized estimated time values for potential assignments.

Utilizing Constraints and Penalties to Facilitate Determination of High Quality Solutions to Multi-Objective Routing Problems A classic approach to generating a solution to a routing problem involves trying to minimize travel time while adhering to hard time window constraints. In reality, however, many problems are multi-objective, and it may be desirable to account for a variety of tradeoffs such as, for example, travel time, importance of assigning certain drivers or vehicles to individual customers, visiting as many customers as possible, avoiding certain roads at some times of day, etc. For example, objectives for a routing problem may include minimizing total travel time, minimizing fuel costs, minimizing a number of vehicles used, making sure the right vehicle or driver visits each customer, minimizing overtime costs, and visiting as many high priority customers as possible. Systems and methodologies in accordance with one or more preferred implementations are configured to facilitate solution of multi-objective routing optimization problems where there are tradeoffs between possibly conflicting objectives.

In accordance with one or more preferred implementations, a methodology involves defining one or more constraints related to features of possible solutions to a routing problem. Each constraint is assigned a penalty value or weight based on how important it is, e.g. a higher penalty can indicate increased importance of adhering to the constraint. An approach in accordance with one or more preferred implementations involves applying mathematical optimization to try and generate solutions that have as low a total score as possible where the score is generated utilizing a sum of determined penalty values.

In accordance with one or more preferred implementations, a constraint is a rule that asks a yes or no question about the solution to a problem. Exemplary constraints might be, for example: "Is the driver working more than 8 hours?", "Is the vehicle traveling more than 200 miles in a day?", "Is customer x being serviced by driver y?", "Is customer x being serviced on Wednesday between 9 am and 11 am?", "Does the driver get a lunch break?", or "Are we visiting at least 5 high priority customers today?".

In accordance with one or more preferred implementations, a penalty is a numerical quantity assigned to each instance in a solution when a constraint is violated. A penalty might be, for example, that if a driver is driving more than eight hours on a day, that solution is penalized x points (for each violation instance within that solution). A penalty may also be configured to be applied based on the extent of violation of a constraint. For example, a solution may be penalized an additional y points for every ten minutes over the eight hour limit.

In accordance with one or more preferred implementations, the overall quality of the solution can be characterized utilizing a sum of all of these penalties which measures which rules are broken and how important each of those violations is to the user's overall preferences. In accordance with one or more preferred implementations, by viewing routing problems as multi-objective, a system is able to determine potential solutions that match what a user really wants. Additionally, a system can provide multiple solutions back to a user to allow the user to select which solution he or she feels best addresses his or her needs.

As a more specific example, consider a routing problem in which it is desired to avoid curvy roads. In particular, returning again to the locations illustrated in FIG. 50 and the routing problem illustrated in FIG. 81 in which two trucks having a set starting location of location "1" are to visit location "2", location "3", and location "4" (assuming that each truck is to visit at least one location), now consider the same routing problem where it is additionally desired to avoid curvy roads.

Figure 90:
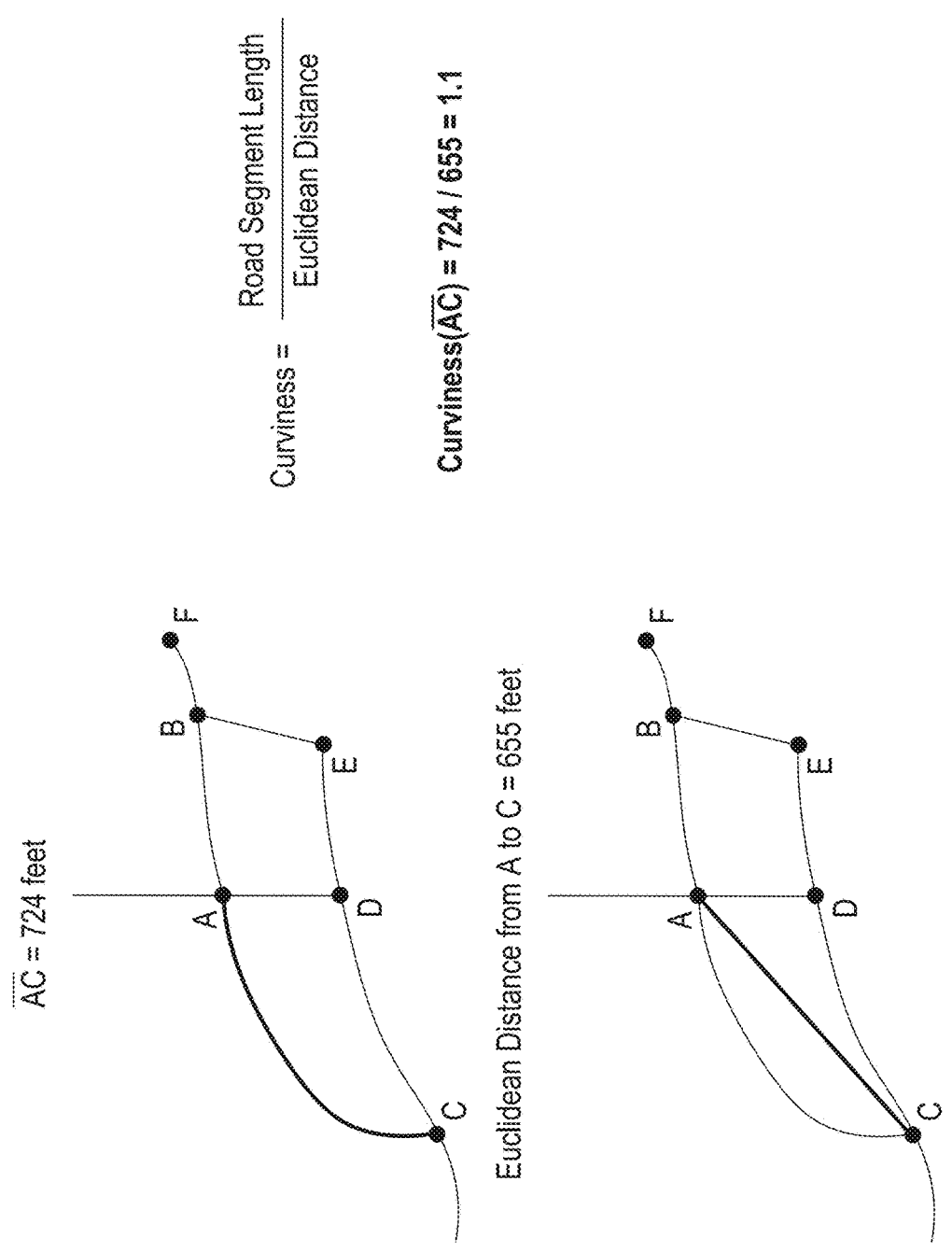
FIG. 90 fancifully illustrates calculation of a curviness value for a road segment.

Notably, a curviness value for a road segment can be stored or determined based on data for that road segment. For example, a curviness value for a road segment could be determined by dividing a traversal length of a road segment by a Euclidean distance between two endpoints of that road segment, as fancifully illustrated in FIG. 90. In FIG. 90, a curviness value for the road segment AC is determined to be "1.1". In accordance with one or more preferred implementations, a curviness value may be determined based on a distance calculated using the Haversine formula.

FIG. 91 illustrates an exemplary user interface which allows a user to specify constraints and penalties for use in generating solutions to a routing problem, e.g. the routing problem illustrated in FIG. 81 in which two trucks having a set starting location of location "1" are to visit location "2", location "3", and location "4" (assuming that each truck is to visit at least one location).

FIG. 92 illustrates the same exemplary user interface where a user has indicated that with respect to violation of a constraint that a route does not include a road with a curviness value at or over "1.05", a penalty of "3" points is to be applied for every "0.05" over "1.00".

A penalty could be specified in various formats, and could be weighted in various ways. For example, a penalty could be specified as points (as illustrated), or as seconds which are to be applied to a total estimated time for a route or solution.

Figure 93A:
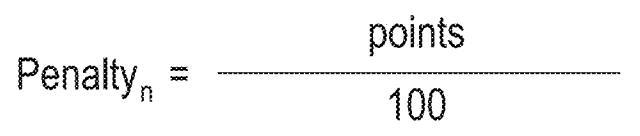

In this example, points are weighted to generate a penalty value by dividing the total number of points by 100, as illustrated in FIG. 93A, although it will be appreciated that weighting may not always be used, or that other various weights may be utilized.

A penalty value can be added to a value for a path, route, assignment, or solution to produce an adjusted value. A penalty value might be added to a weighted estimated value, as illustrated in FIG. 93B, or a normalized estimated value, as illustrated in FIG. 93C.

In this example, a penalty is added to a route for each instance of traversal over a road segment which has a curviness value at or over 1.05. For each instance, the penalty is equal to three points for each "0.05" over "1.00".

Figure 94:
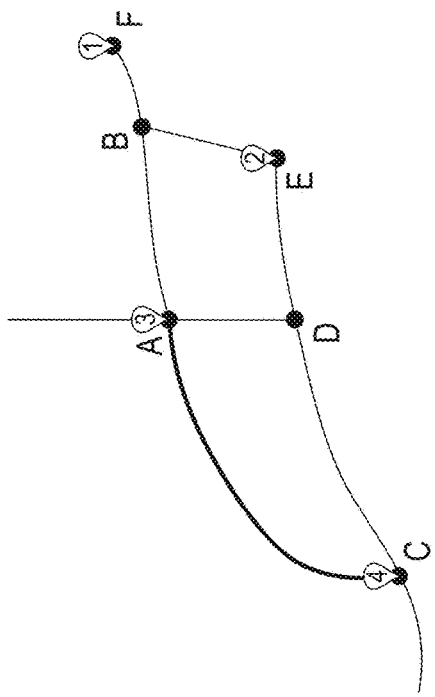
FIG. 94 fancifully illustrates penalty points for various routes.

FIG. 94 illustrates how, for the route including traversal from location "1" to location "3" and from location "3" to location "4", a penalty of six points is incurred owing to traversal of road segment AC during traversal from location "3" to location "4". This penalty is incurred because, as illustrated in FIG. 90, the road segment AC has a curviness value of "1.1". A penalty value for this route is calculated by dividing the total number of penalty points by "100", resulting in a penalty value for this route of "0.06", as illustrated in FIG. 94.

Similarly, FIG. 94 illustrates how, for the route including traversal from location "1" to location "4" and from location "4" to location "3", a penalty of six points is incurred owing to traversal of road segment CA during traversal from location "4" to location "3". This penalty is incurred because the road segment CA has a curviness value of "1.1". A penalty value for this route is calculated by dividing the total number of penalty points by "100", resulting in a penalty value for this route of "0.06", as illustrated in FIG. 94.

An adjusted value can be calculated for a potential solution by adding together penalty values calculated for the various routes forming part of that solution to a weighted or normalized value for that solution (e.g. the sum of weighted or normalized values for the routes forming part of that solution).

Figure 95:
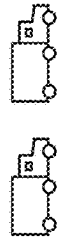
FIG. 95 illustrates adjusted values calculated for potential solutions by adding calculated penalty values to normalized estimated values.

FIG. 95 illustrates adjusted values calculated for potential solutions by adding calculated penalty values for routes for the solutions to normalized estimated values for the solutions. As illustrated, although solution number five has the lowest total estimated travel time of seventy eight seconds, once penalty values are applied based on specified constraints and penalties, solution number three has the lowest adjusted value taking into account these specified constraints and penalties, with an adjusted value of "1.051".

Figure 96A:
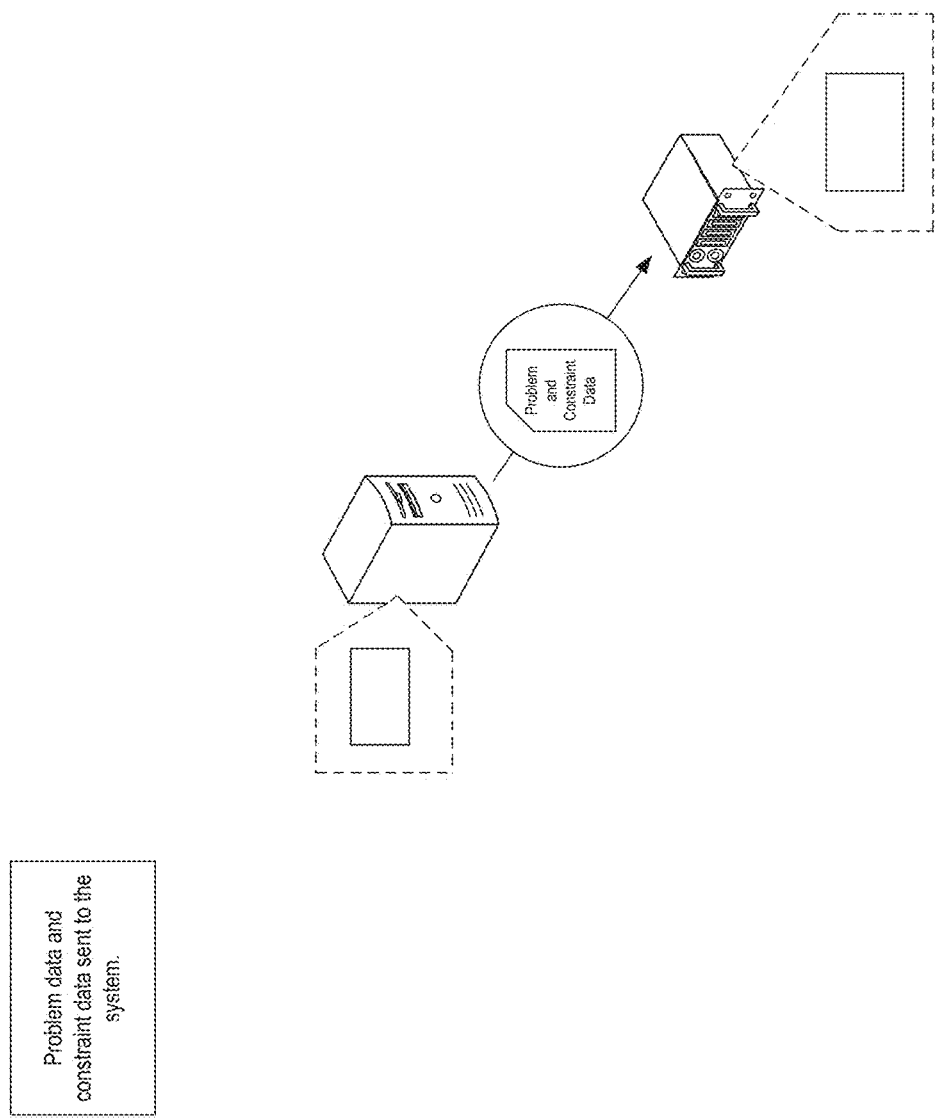
FIGS. 96A-D illustrate one or more exemplary methodologies for generating high quality solutions to a routing problem.
Figure 96B:
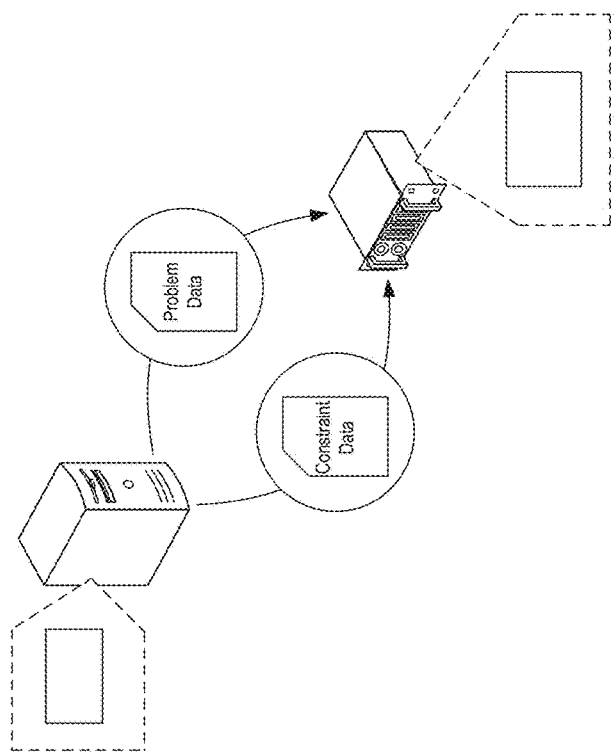

In accordance with one or more preferred implementations, an exemplary methodology for generating high quality solutions to a routing problem involves sending problem data and constraint (and penalty) data to a system (e.g. an optimization service running at one or more servers). This problem data can include, for example, latitude and longitude coordinates for locations for the routing problem, customer attributes, vehicle attributes, driver attributes, etc. This problem data and constraint data may be sent together, as illustrated in FIG. 96A, or separately as illustrated in FIG. 96B.

Figure 96C:
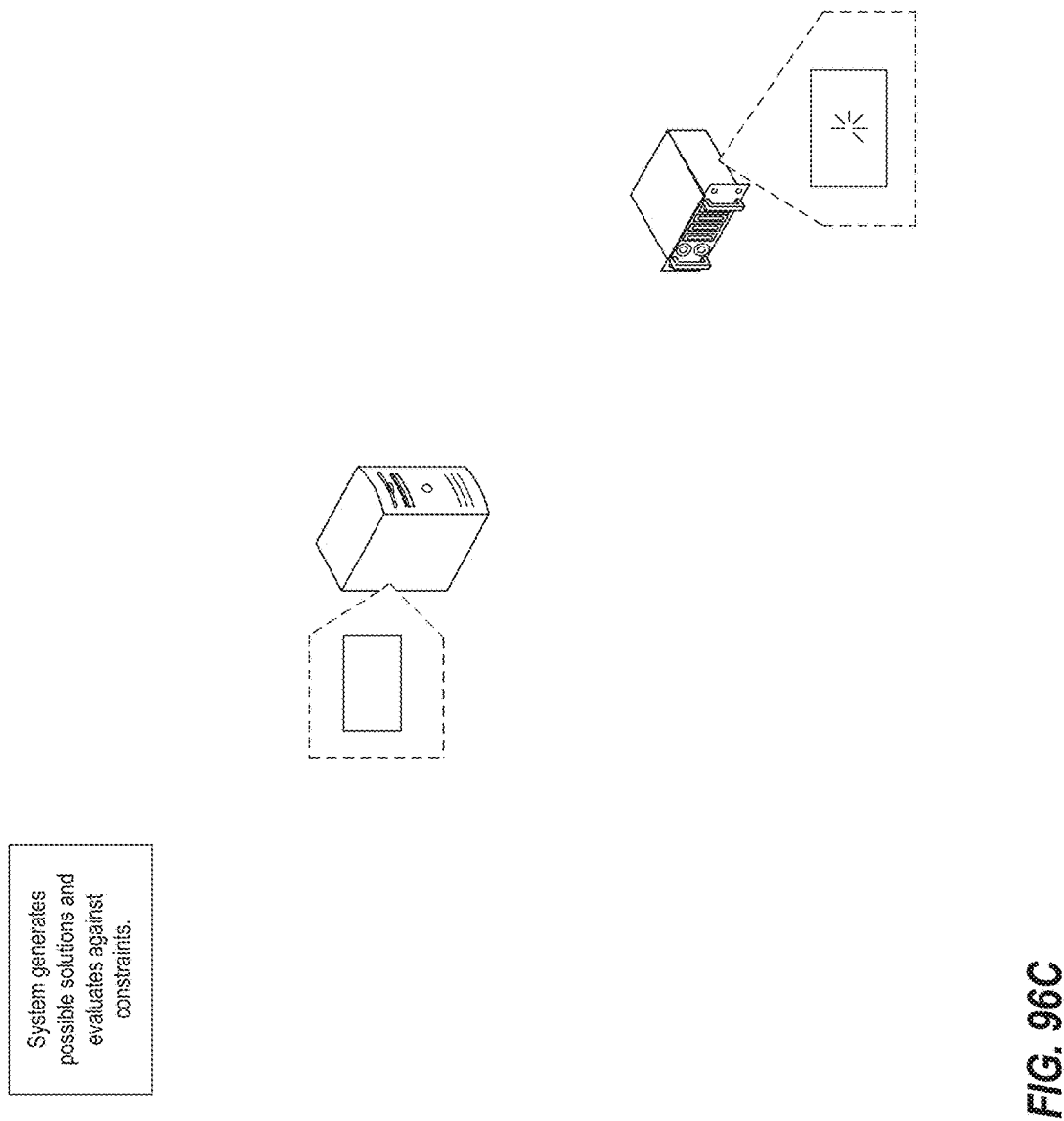

In accordance with one or more preferred implementations, following receipt of problem and constraint data, the system generates a large number of possible solutions (e.g. millions) and evaluates how well each solution meets the specified constraints, as illustrated in FIG. 96C. In accordance with one or more preferred implementations, a penalty value is calculated for all generated solutions, or for one or more of the more promising generated solutions. In accordance with one or more preferred implementations, estimated time values or other generated values are evaluated in combination with generated penalty values.

Figure 96D:
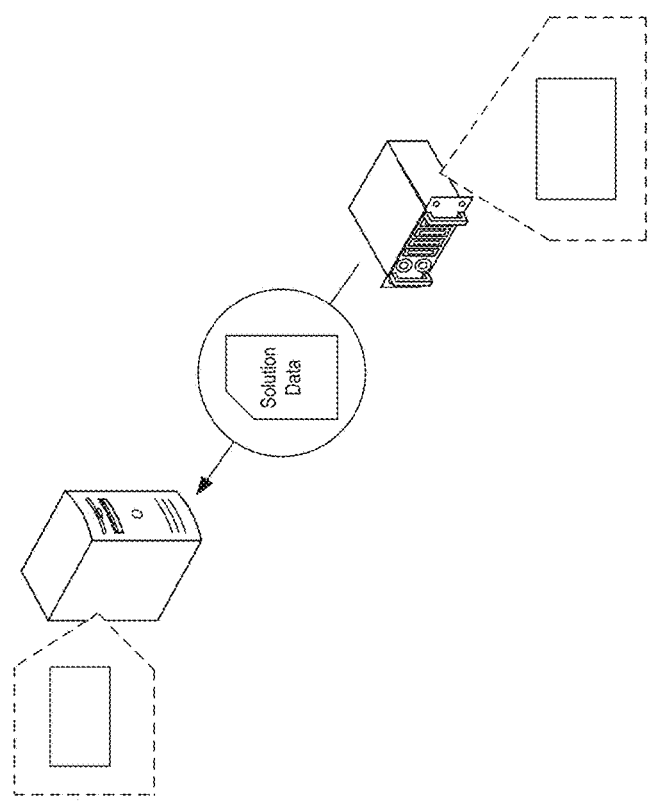

In accordance with one or more preferred implementations, the system thereafter returns one or more solutions based on calculated values, as illustrated in FIG. 96D. In accordance with one or more preferred implementations, a system returns multiple solutions with an indication of an overall score (e.g. an adjusted value) and information on violated constraints.

Figure 97:
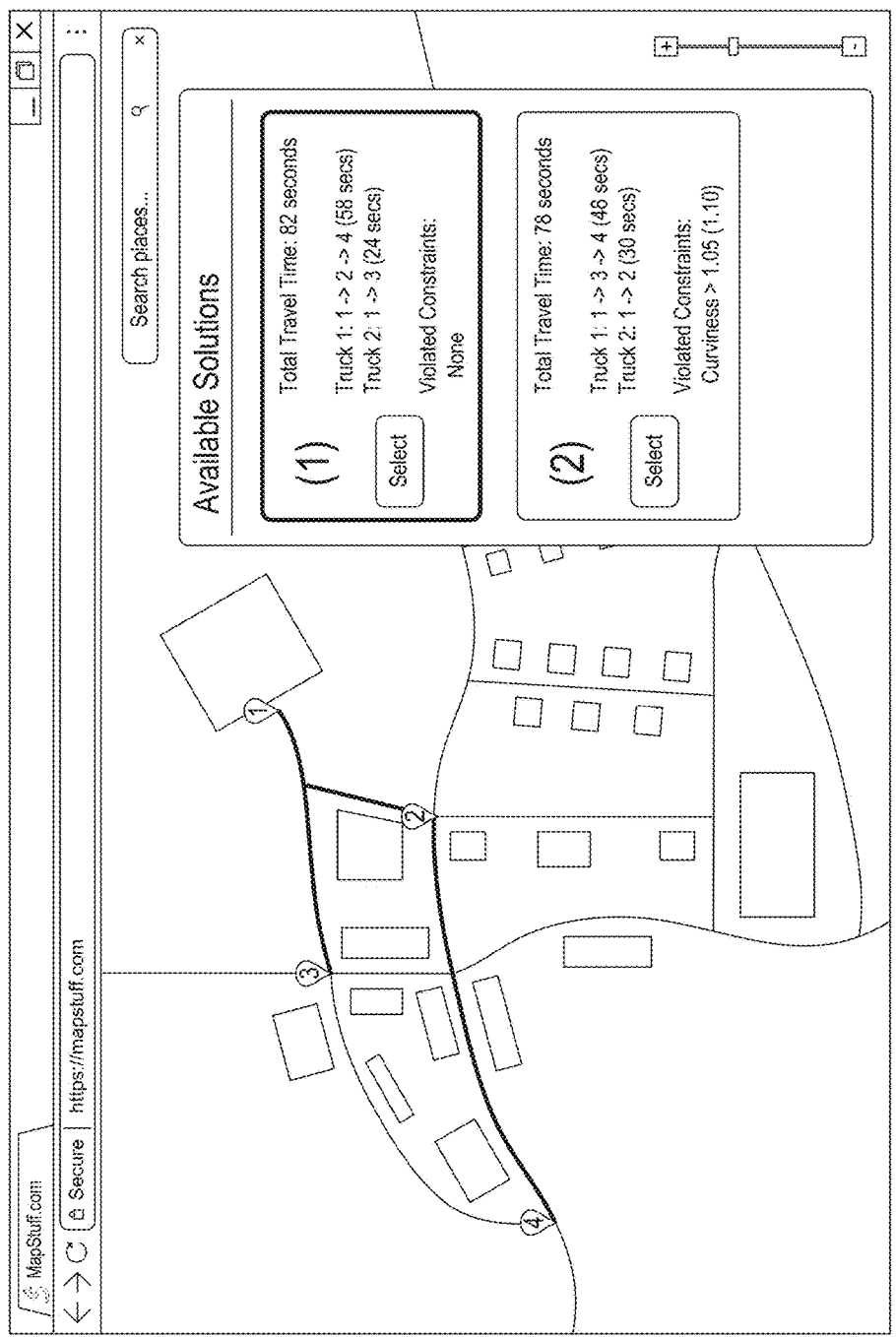
FIG. 97 illustrates an exemplary user interface presenting multiple solutions to a routing problem where a user is allowed to select from the presented solutions.

In accordance with one or more preferred implementations, one or more determined available solutions (e.g. most preferred solutions) are presented to a user, as illustrated in FIG. 97, and the user is allowed to select from the presented available solutions.

In accordance with one or more preferred implementations, an indication of a total travel time, travel distance, or cost (e.g. fuel costs, labor costs, or both) is presented to a user for each presented available solution.

In accordance with one or more preferred implementations, one or more penalty values may be added to a value generated based on an estimated travel time, distance, or cost (such as a fuel cost or a labor cost or both) to facilitate identification or ranking of potential solutions, or may be solely utilized to facilitate identification or ranking of potential solutions.

In accordance with various preferred implementations, various methodologies for applying a penalty value to road segments, paths, routes, assignments, or solutions may be utilized.

Figure 98:
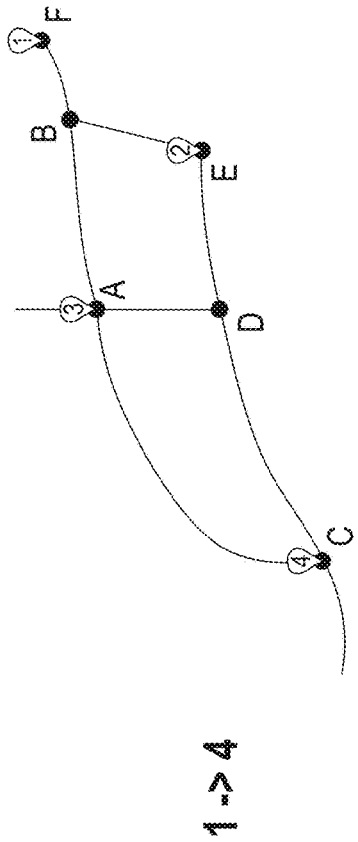
FIG. 98 illustrates calculation of an adjusted value for various potential paths during determination of a preferred or optimized route.

For example, FIG. 98 illustrates calculation of an adjusted value for various potential paths during determination of an optimized route for travel from location "1" to location "4", where calculation of the adjusted value involves summing a weighted estimated value based on a total estimated travel time for a path with a penalty value. This allows for determination of an adjusted value for an optimal path between location "1" and location "4" given the specified constraints and penalties.

Figure 99:
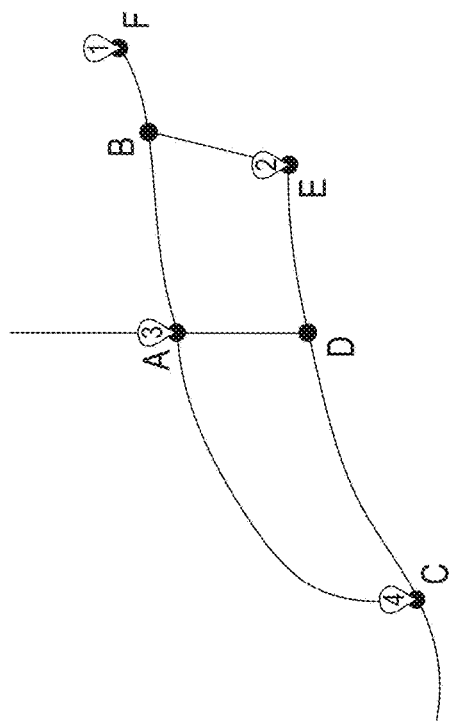
FIGS. 99-101 illustrate three potential assignments together with calculated total adjusted values for routes under each assignment.

In accordance with one or more preferred implementations, an optimal path matrix is populated with calculated adjusted values for travel between locations under specified constraints and penalties, as illustrated in FIG. 99. Such an optimal path matrix can be utilized to determine optimized routes, and optimized or high quality assignments and solutions.

Figure 100:
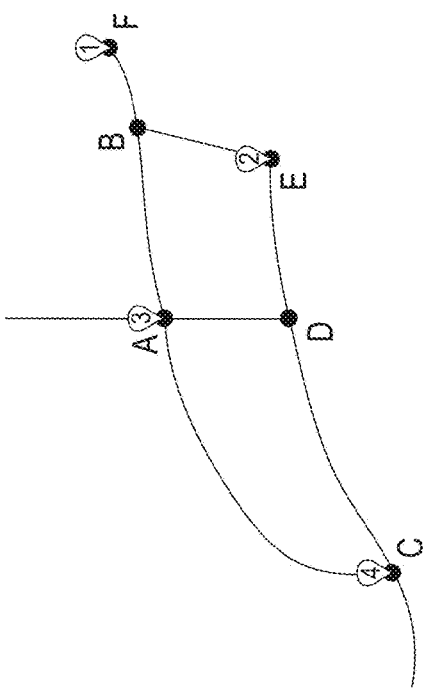
Figure 101:
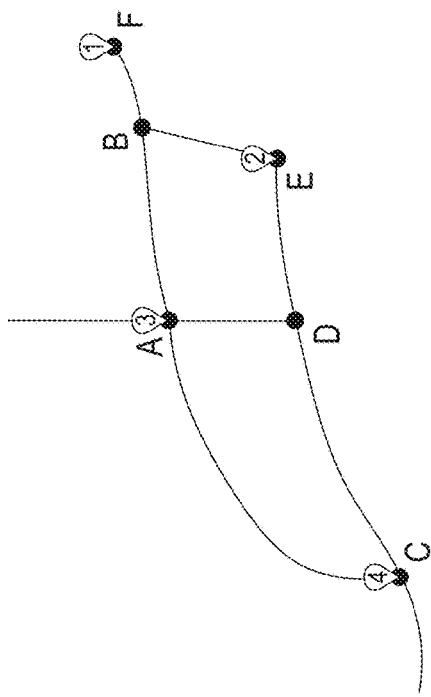
Figure 102A:
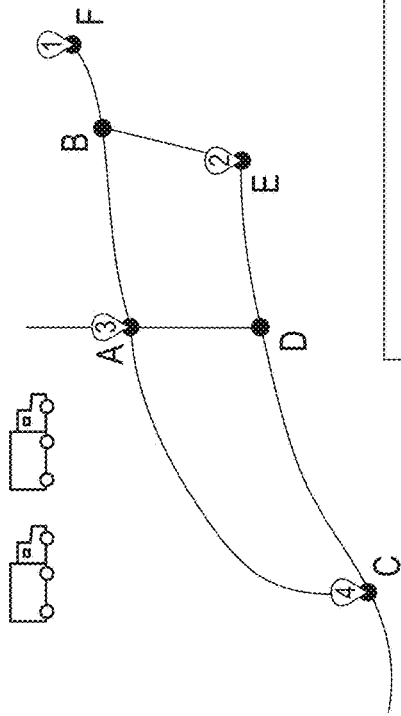
FIG. 102A illustrates the identification of a preferred or optimized assignment using calculated adjusted values.
Figure 102B:
FIG. 102B illustrates the identification of a preferred or optimized solution.

For example, FIG. 99 illustrates calculated adjusted values for routes for a first potential assignment together with a calculated total adjusted value for optimized routes under the first potential assignment, FIG. 100 illustrates calculated adjusted values for routes for a second potential assignment together with a calculated total adjusted value for optimized routes under the second potential assignment, and FIG. 101 illustrates calculated adjusted values for routes for a third potential assignment together with a calculated total adjusted value for optimized routes under the third potential assignment. These calculated adjusted values can be utilized to identify a preferred or optimized assignment, as illustrated in FIG. 102A, or preferred or optimized solution (representing a high quality solution), as illustrated in FIG. 102B.

Figure 103:
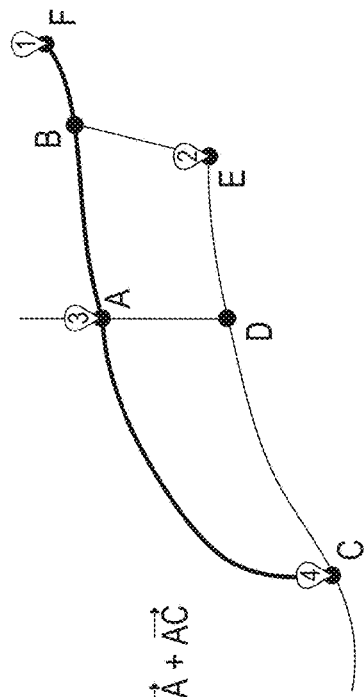
FIG. 103 illustrates penalty values being utilized to calculate adjusted values for road segments or path portions during path evaluation.

Penalty values may be utilized to calculated adjusted values for road segments or path portions during evaluation of paths, e.g. during determination of a shortest or optimal path between two locations, as illustrated in FIG. 103 where adjusted values have been calculated for path portions to facilitate determination of a shortest path from location "1" to location "4".

Utilizing Estimated Traversal Values to Accelerate the Determination of High Quality Solutions to Routing Problems As described herein, methodologies for determining high quality solutions to routing problems may involve computing a shortest or optimal path matrix containing shortest or optimal path information for travel between locations involved in the routing problem. As the number of locations involved in a routing problem grows, this begins to greatly increase the number of computations that are required to compute such a shortest or optimal path matrix. In general, for a routing problem involving n locations, approximately n*n shortest or optimal paths must be determined. Thus, for example, for a routing problem involving one thousand locations, one million shortest or optimal paths would have to be determined to compute the shortest or optimal path matrix.

Computing such a matrix can be a cumbersome and time consuming process and can delay the solution to a routing problem, e.g. a routing optimization problem that involves a road network.

However, a very fast approximation to road network travel time can be obtained by using estimated distances and travel times (e.g. "crow flies" approximations such as a Euclidean distance or a distance computed using the Haversine formula). In a simplified example, a distance is computed using the Haversine formula, and then a reasonable estimate of a speed of a vehicle is utilized to calculate a travel time estimate.

In accordance with one or more preferred implementations, a more complex estimate utilizes an estimate of the curvature (e.g. curviness value) of roads in an area in order to weight a distance approximation (or a speed or time estimate). For example, a highway or interstate would generally have very little curvature (e.g. a low curviness value) since it is generally straight allowing for a high rate of travel.

Such an approach might, for example, involve taking into account a curvature (e.g. curviness value) of roads around a start location, taking into account a curvature (e.g. curviness value) of roads around a destination location, and taking into account a curvature (e.g. curviness value) of roads between such locations. A curvature (e.g. curviness value) for an area may be determined based on curvature (e.g. curviness values) for roads in the area (e.g. aggregating or averaging curviness values for roads in the area).

In accordance with one or more preferred implementations, a methodology involves accelerating the solution to an optimization problem that involves a road network. While accurate solutions to these problems generally require distances and travel times to be computed while accounting for streets, turns, and predicted traffic, in accordance with one or more preferred implementations, a methodology involves first computing estimates or approximations of distances and travel times, and then beginning optimization for the problem using these approximations while simultaneously, in parallel, performing distance and travel time computations for the road network (e.g. computing a shortest or optimal path matrix), gaining an overall speedup in the solution of the optimization problem.

Figure 104:
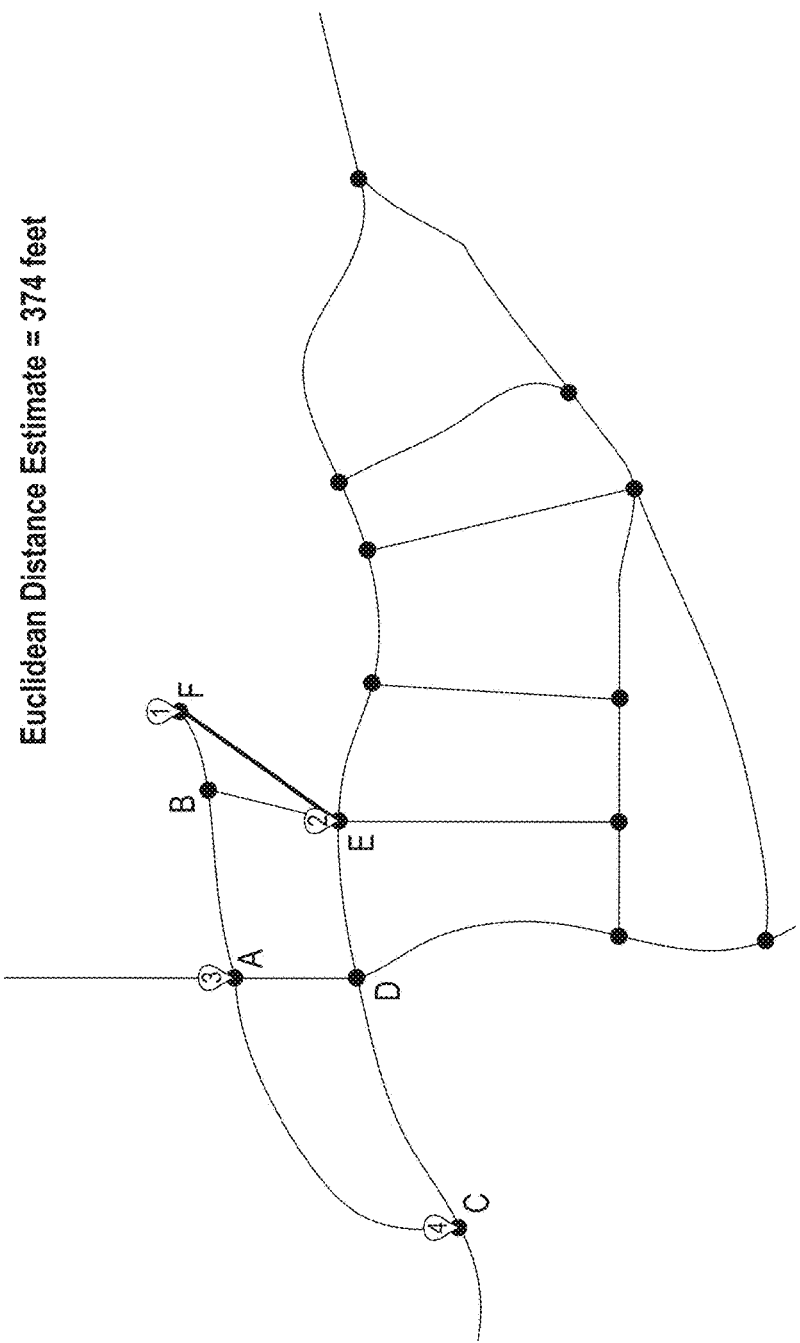
FIG. 104 illustrates a calculated Euclidean distance estimate for travel between two points.

As a simplistic example, returning again to the locations illustrated in FIG. 50, FIG. 104 illustrates a calculated Euclidean distance estimate for travel from location "1" to location "2". This calculated Euclidean distance estimate value for travel from location "1" to location "2" can be stored in a shortest path or optimal path matrix, as illustrated in FIG. 105. This may be a shortest or optimal path matrix that is eventually updated with computed shortest path distance values, or may be a different matrix.

Figure 106:
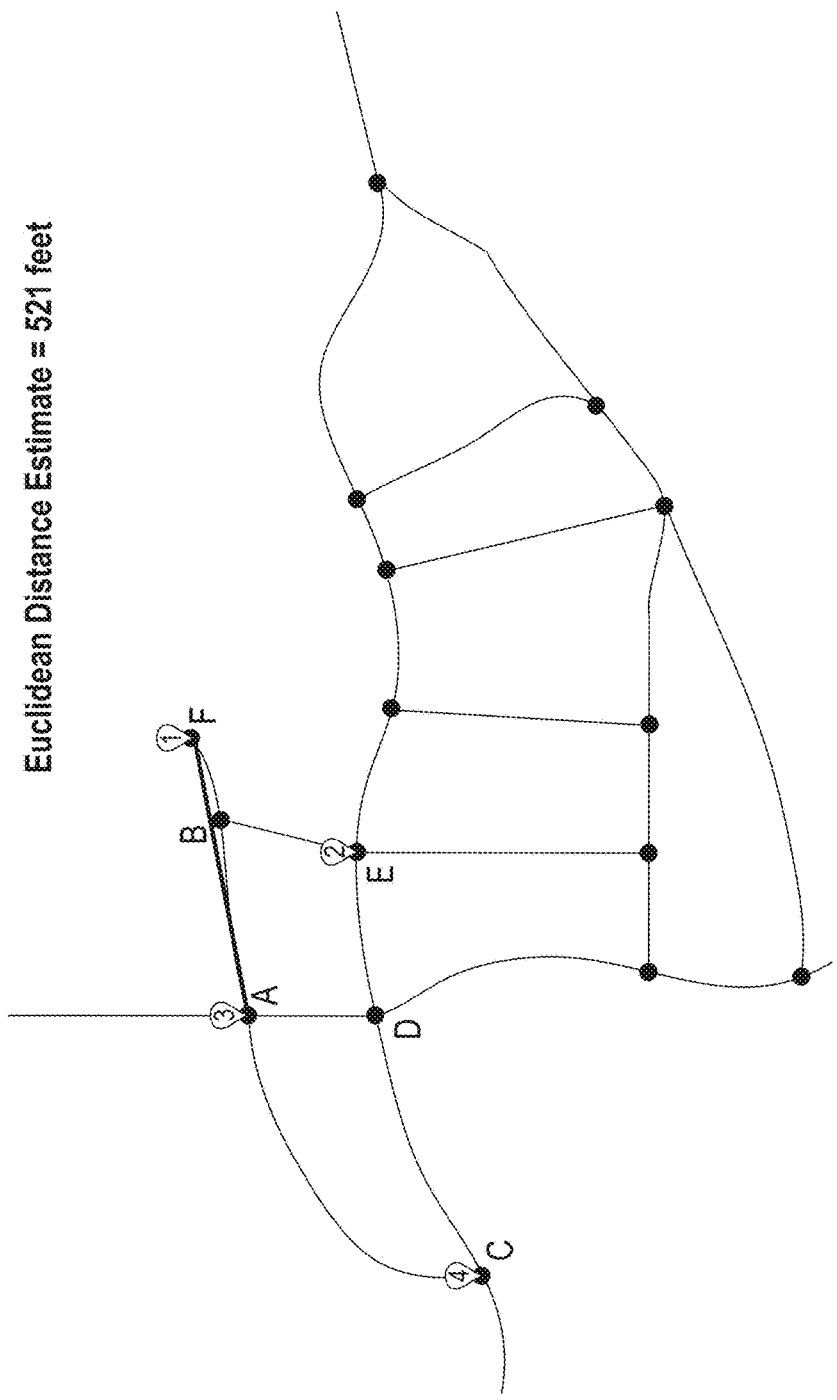
FIG. 106 illustrates a calculated Euclidean distance estimate for travel between two points.

FIG. 106 similarly illustrates a calculated Euclidean distance estimate value for travel from location "1" to location "3". This calculated Euclidean distance estimate value for travel from location "1" to location "3" can also be stored in the matrix, as illustrated in FIG. 107.

A calculated Euclidean distance estimate value can similarly be calculated and stored for traveling from each location to each other location, as illustrated in FIG. 108.

Further, estimated time values can be calculated based on these calculated Euclidean distance estimate values, and stored in a shortest or optimal path matrix, as illustrated in FIG. 109. This may be a shortest or optimal path matrix that is eventually updated with computed shortest path distance values, or may be a different matrix.

In accordance with one or more preferred implementations, such calculated estimated distance values and corresponding calculated estimated time values can be utilized to begin determination of one or more high quality solutions to a routing problem.

Figure 110:
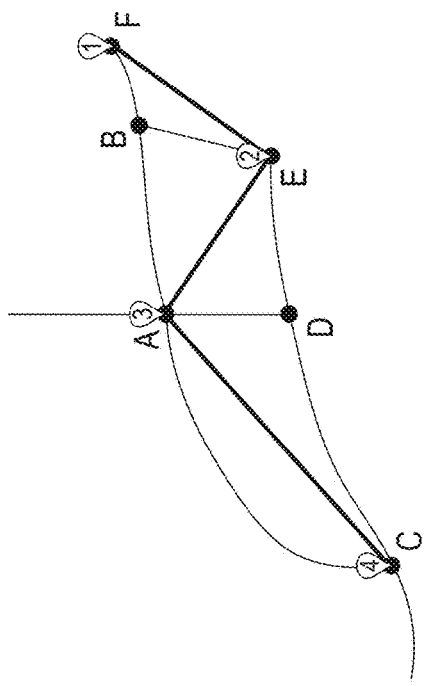
FIGS. 110-111 illustrate first and second potential routes and determined estimated travel times.

For example, FIG. 110 illustrates a first potential route visiting all four locations which involves traversal from location "1" to location "2", traversal from location "2" to location "3", and traversal from location "3" to location "4". A total estimated travel time for this route can be determined utilizing the estimated travel times for shortest paths between these locations in the shortest path matrix which were generated based on the Euclidean distance estimate values. Thus, the route portion representing traversal from location "1" to location "2" can be determined based on the shortest path matrix to have an estimated travel time of 14 seconds, the route portion representing traversal from location "2" to location "3" can be determined based on the precomputed shortest path matrix to have an estimated travel time of 14 seconds, and the route portion representing traversal from location "3" to location "4" can be determined based on the precomputed shortest path matrix to have an estimated travel time of 26 seconds. A total estimated travel time for the route can be calculated by summing together these estimated travel times for these route portions. This results in a total estimated travel time for the first potential route of 54 seconds, as illustrated in FIG. 110.

Figure 111:
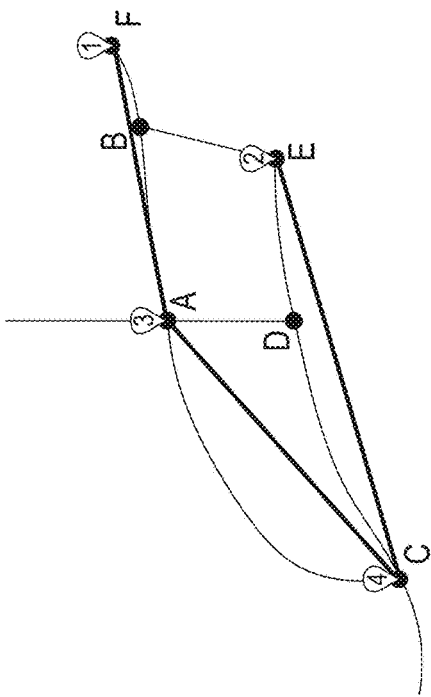

FIG. 111 illustrates a second potential route visiting all four locations which involves traversal from location "1" to location "3", traversal from location "3" to location "4", and traversal from location "4" to location "2". A total estimated travel time for this route can be determined utilizing the estimated travel times for shortest paths between these locations in the shortest path matrix which were generated based on the Euclidean distance estimate values. The route portion representing traversal from location "1" to location "3" can be determined based on the shortest path matrix to have an estimated travel time of 20 seconds, the route portion representing traversal from location "3" to location "4" can be determined based on the shortest path matrix to have an estimated travel time of 26 seconds, and the route portion representing traversal from location "4" to location "2" can be determined based on the shortest path matrix to have an estimated travel time of 32 seconds. These calculated estimated travel times for the route portions can be summed together to result in a total estimated travel time for the second potential route of 78 seconds, as illustrated in FIG. 111.

A preferred or optimized route can be identified based on the calculated total estimated travel times for each potential route, as illustrated in FIG. 112.

In accordance with one or more preferred implementations, a methodology involves, while beginning optimization for the routing problem using these approximations, simultaneously, in parallel, performing distance and travel time computations for the road network (e.g. updating the shortest or optimal path matrix with computed values), gaining an overall speedup in the solution of the optimization problem.

For example, FIG. 113 illustrates updating of the shortest path matrix of FIG. 109 with computed values for traversal from location "1" to location "2".

As determination of high quality solutions to a routing problem proceeds, these updated values may be utilized as they are computed, resulting in increasingly accurate optimization results.

In accordance with one or more preferred implementations, one or more determinations or calculations performed as part of a methodology for determining one or more high quality solutions to a routing problem are performed utilizing estimates or approximate values, while one or more subsequent determinations of calculations performed as part of the same methodology are performed utilizing updated, more accurate computed values.

For example, returning again to the locations illustrated in FIG. 50 and the routing problem illustrated in FIG. 75 in which two trucks are to visit the four locations (assuming that each truck is to visit two of the locations), in accordance with one or more preferred implementations, optimized assignments for the trucks might be determined using values based on Euclidean or Haversine estimates, while more accurate high quality solutions may subsequently be determined utilizing more accurate, computed values.

Figure 114:
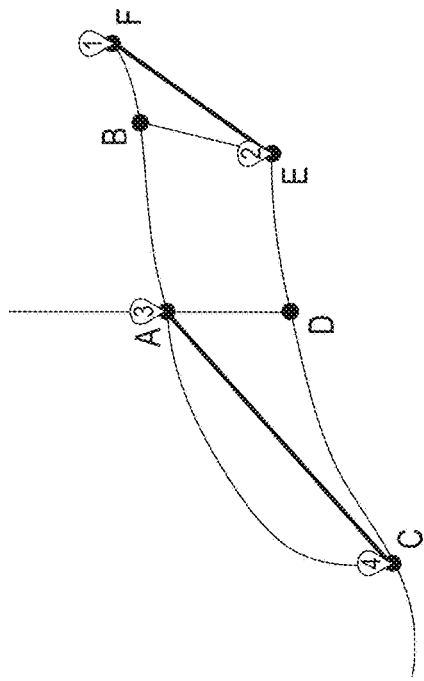
FIGS. 114-116 illustrate three potential assignments for two trucks.

FIG. 114 illustrates a first potential assignment for two trucks. This first potential assignment involves, for a first truck, use of either a first potential route involving traversal from location "1" to location "2", or a second potential route involving traversal from location "2" to location "1". A total estimated travel time for each potential route for the first truck can be determined utilizing the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "1" and location "2" can be determined based on the estimated travel times for shortest paths between these locations in the shortest path matrix to have a total estimated travel time of 14 seconds.

This first potential assignment further involves, for a second truck, use of either a first potential route involving traversal from location "3" to location "4", or a second potential route involving traversal from location "4" to location "3". A total estimated travel time for each potential route for the second truck can be determined utilizing the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "3" and location "4" can be determined based on the estimated travel times for shortest paths between these locations in the shortest path matrix to have a total estimated travel time of 26 seconds.

A total estimated travel time for this first potential assignment can be determined by summing together the estimated travel times for each truck, as illustrated in FIG. 114. Here, a total estimated travel time for this first potential assignment can be calculated to be 40 seconds, as illustrated in FIG. 114.

Figure 115:
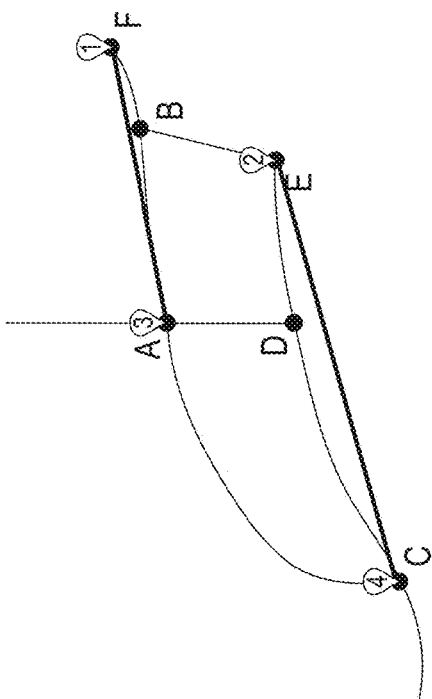

FIG. 115 illustrates a second potential assignment for two trucks. This second potential assignment involves, for a first truck, use of either a first potential route involving traversal from location "1" to location "3", or a second potential route involving traversal from location "2" to location "4". A total estimated travel time for each potential route for the first truck can be determined utilizing the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "1" and location "3" can be determined based on the estimated travel times for shortest paths between these locations in the shortest path matrix to have a total estimated travel time of 20 seconds.

This second potential assignment further involves, for a second truck, use of either a first potential route involving traversal from location "2" to location "4", or a second potential route involving traversal from location "4" to location "2". A total estimated travel time for each potential route for the second truck can be determined utilizing the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "2" and location "4" can be determined based on the estimated travel times for shortest paths between these locations in the shortest path matrix to have a total estimated travel time of 32 seconds.

A total estimated travel time for this second potential assignment can be determined by summing together the estimated travel times for each truck, as illustrated in FIG. 115. Here, a total estimated travel time for this first potential assignment can be calculated to be 52 seconds, as illustrated in FIG. 115.

Figure 116:
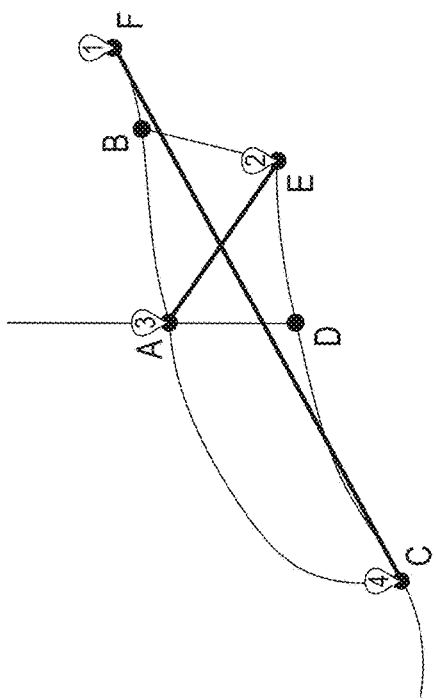

FIG. 116 illustrates a third potential assignment for two trucks. This third potential assignment involves, for a first truck, use of either a first potential route involving traversal from location "1" to location "4", or a second potential route involving traversal from location "2" to location "3". A total estimated travel time for each potential route for the first truck can be determined utilizing the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "1" and location "4" can be determined based on the estimated travel times for shortest paths between these locations in the shortest path matrix to have a total estimated travel time of 44 seconds.

This third potential assignment further involves, for a second truck, use of either a first potential route involving traversal from location "2" to location "3", or a second potential route involving traversal from location "3" to location "2". A total estimated travel time for each potential route for the second truck can be determined utilizing the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "2" and location "3" can be determined based on the estimated travel times for shortest paths between these locations in the shortest path matrix to have a total estimated travel time of 14 seconds.

A total estimated travel time for this third potential assignment can be determined by summing together the estimated travel times for each truck, as illustrated in FIG. 116. Here, a total estimated travel time for this first potential assignment can be calculated to be 58 seconds, as illustrated in FIG. 116.

The calculated total estimated travel times for each potential assignment can be compared to determine an optimized or preferred assignment, as illustrated in FIG. 117. The optimized routes that were utilized to determined the calculated total estimated travel times for each potential assignment may be used as optimized routes for a routing solution, or additional determination of optimized routes may be performed.

For example, although these optimized assignments for the trucks were determined using values based on Euclidean distance estimates, a more accurate high quality solution may subsequently be determined utilizing more accurate, computed values.

Figure 118:
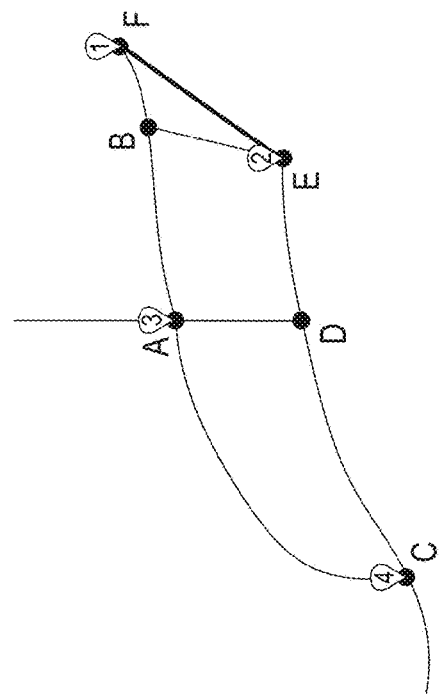
FIG. 118 illustrate use of updated computed values in a shortest path matrix.

In this regard, FIG. 118 illustrates use of updated computed values in the shortest path matrix to determine an optimized order or route for traversal between location "1" and location "2". Here, it is determined that traversal from location "2" to location "1" has a shorter estimated travel time than traversal from location "1" to location "2", as illustrated in FIG. 118.

Figure 119:
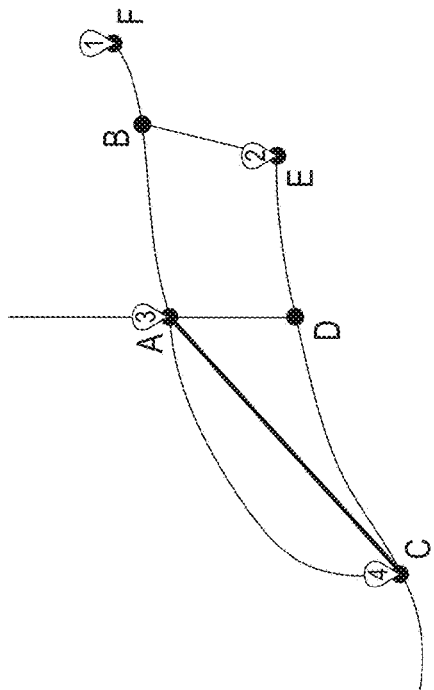
FIG. 119 further illustrates use of updated computed values in the shortest path matrix.

FIG. 119 further illustrates use of updated computed values in the shortest path matrix to determine an optimized order or route for traversal between location "3" and location "4". Here, it is determined that traversal from location "3" to location "4" has the same estimated travel time as traversal from location "4" to location "3", as illustrated in FIG. 119.

Figure 120:
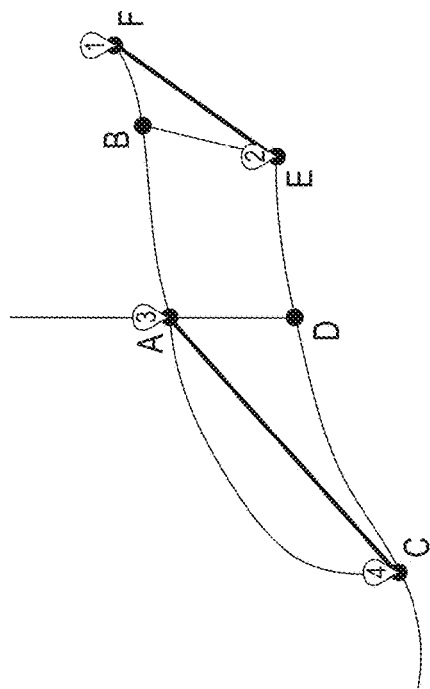
FIG. 120 illustrates calculation of an estimated travel time, based on computed values, for an assignment that was previously determined, based on estimated values, to be preferred or optimized.

Such calculations based on updated computed values in the shortest path matrix can be utilized in determining one or more high quality routing solutions. For example, FIG. 120 illustrates calculation of an estimated travel time, based on computed values, for the assignment that was previously determined, based on estimated values, to be preferred or optimized.

Figure 121:
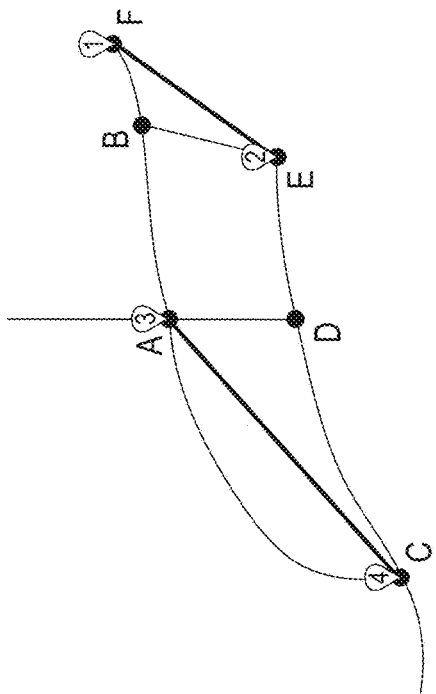
FIG. 121 fancifully illustrates computed accurate shortest path values for paths determined to be part of a preferred or optimized assignment.

In accordance with one or more preferred implementations, a methodology may involve selectively computing shortest path information based on determinations made utilizing estimates or approximations. For example, with respect to the just outlined example, a methodology may only require computing accurate shortest path values for paths determined to be part of a preferred or optimized assignment, as illustrated in FIG. 121.

More generally, a methodology may involve only computing accurate shortest path values for paths determined to be likely to be part of a high quality routing solution (e.g. a preferred or optimized routing solution), or which cannot be ruled out as being part of a high quality routing solution.

Figure 122:
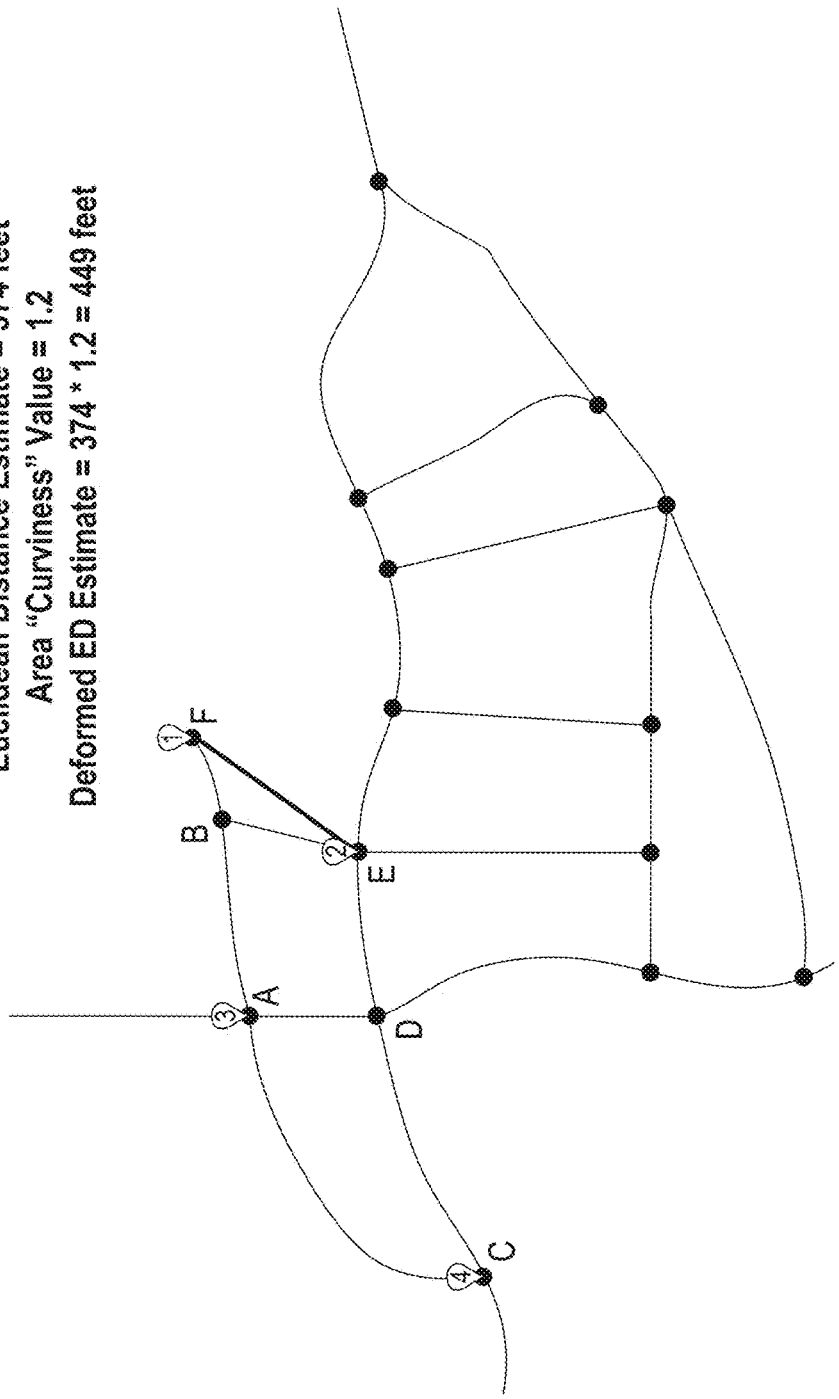
FIG. 122 illustrates exemplary calculation of a deformed Euclidean distance estimate.

As noted above, in accordance with one or more preferred implementations, a more complex estimate can utilize an estimate of the curvature (e.g. curviness value) of roads in an area in order to weight a distance approximation (or a speed or time estimate). For example, FIG. 122 fancifully illustrates exemplary calculation of a deformed Euclidean distance estimate for travel from location "1" to location "2" using an area curviness value of "1.2".

Although simplified fanciful examples are provided herein utilizing Euclidean distance estimates, in one or more preferred implementations, estimates or approximations utilize distance values calculated utilizing the Haversine formula, e.g. calculated Haversine values which are then deformed based on one or more estimates of curvature of roads in one or more areas.

Utilizing Determined Optimized Traffic Windows for Precomputing Optimal Path Matrices to Reduce Computer Resource Usage As noted above, it will be appreciated that traffic patterns may frequently allow for quicker traversal of a road segment (or navigation from one road segment to another) at certain times of the day, and slower traversal at other times. As described above, to account for this, exemplary average travel times may be determined for windows throughout the day, e.g. for 24 one hour windows, as illustrated in FIGS. 33-34, and determination of a shortest path may involve utilizing the time estimates for a window within which a current time falls, or within which an estimated time of travel falls.

Similarly, as noted above, a matrix containing calculated values for determined shortest paths may be precomputed and stored for time windows throughout the day, e.g. for 24 one hour windows, as illustrated in FIG. 69.

Notably, although a rate of travel for a road segment generally changes throughout the day, it generally changes slowly and somewhat continuously as long as there are no surprise disruptions such as a car accident (which cannot be predicted).

In accordance with one or more preferred implementations, it is desirable to break up a day (or week, month, or year) into as few time intervals (or windows) as possible where the overall traffic during each window is similar and the speeds in different traffic windows is as different as possible. In accordance with one or more preferred implementations, a methodology involves assuming that the rate of travel on each road segment is constant during a window, or utilizing a simple, defined formula to determine an estimated travel time or speed during a window.

The use of a reduced number of windows as compared to, for example, twenty four one hour windows or forty eight thirty minute windows allows for more rapid precomputation of one or more required shortest or optimal path matrices for a routing problem, and thus quicker determination of a solution with less resource usage (e.g. less processing time, less memory usage, and optionally less storage usage).

A methodology in accordance with one or more preferred implementations involves applying statistical methods to determine the points in time that best partition a twenty four hour day into traffic windows such that the rate of travel within each window is most constant.

Figure 123:
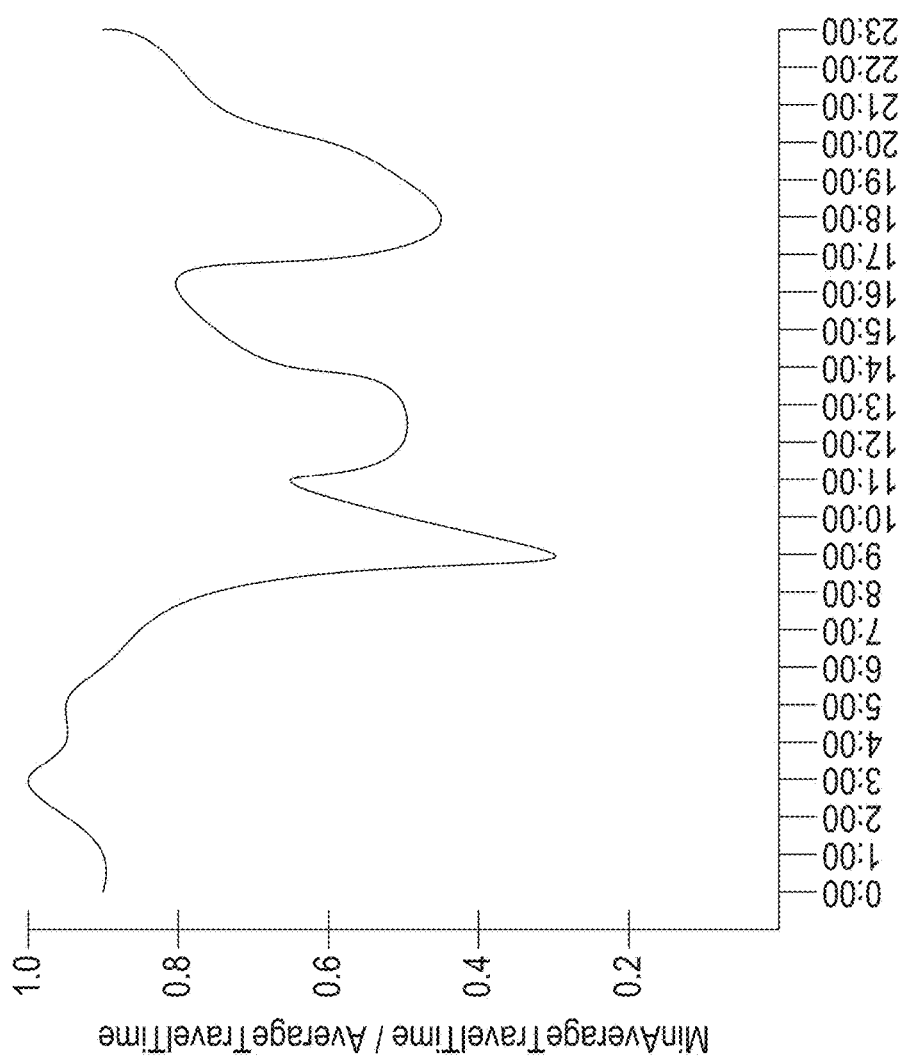
FIG. 123 illustrates plotting of a normalized average travel time to traverse a particular road segment throughout the day.

For example, FIG. 123 illustrates plotting of a normalized average travel time to traverse a particular road segment throughout the day. Each normalized average travel time value for a particular time is calculated by dividing a minimum average travel time value for the road segment (the lowest value at any time throughout the day) by an average travel time at that particular time.

Figure 124:
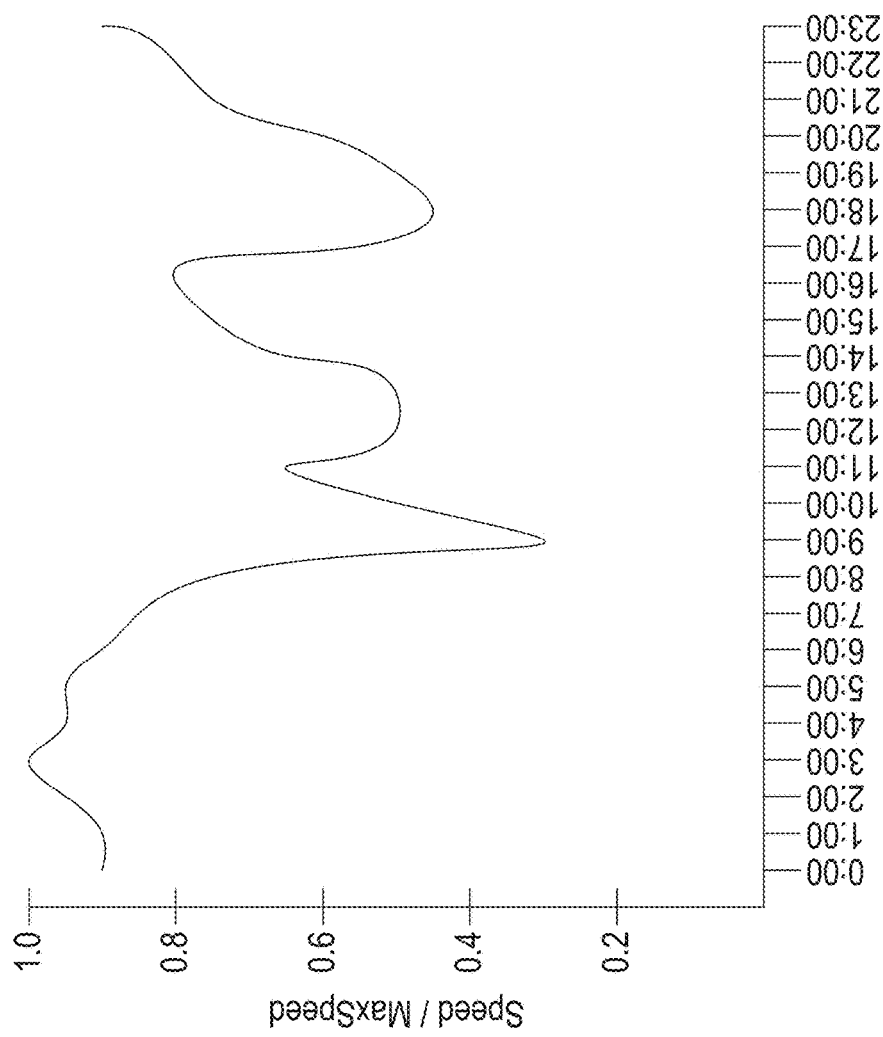
FIG. 124 illustrates plotting of a normalized average speed for a particular road segment throughout the day.

It will be appreciated that a similar methodology can be performed with normalized speed values. For example, FIG. 124 illustrates plotting of a normalized average speed for a particular road segment throughout the day. Each normalized average speed value for a particular time is calculated by dividing an average speed at that particular time by a maximum average speed value for the road segment (the highest value at any time throughout the day).

Under either approach, various methodologies including statistical methodologies can be applied to determine the points in time that best partition a day into traffic windows.

Figure 125:
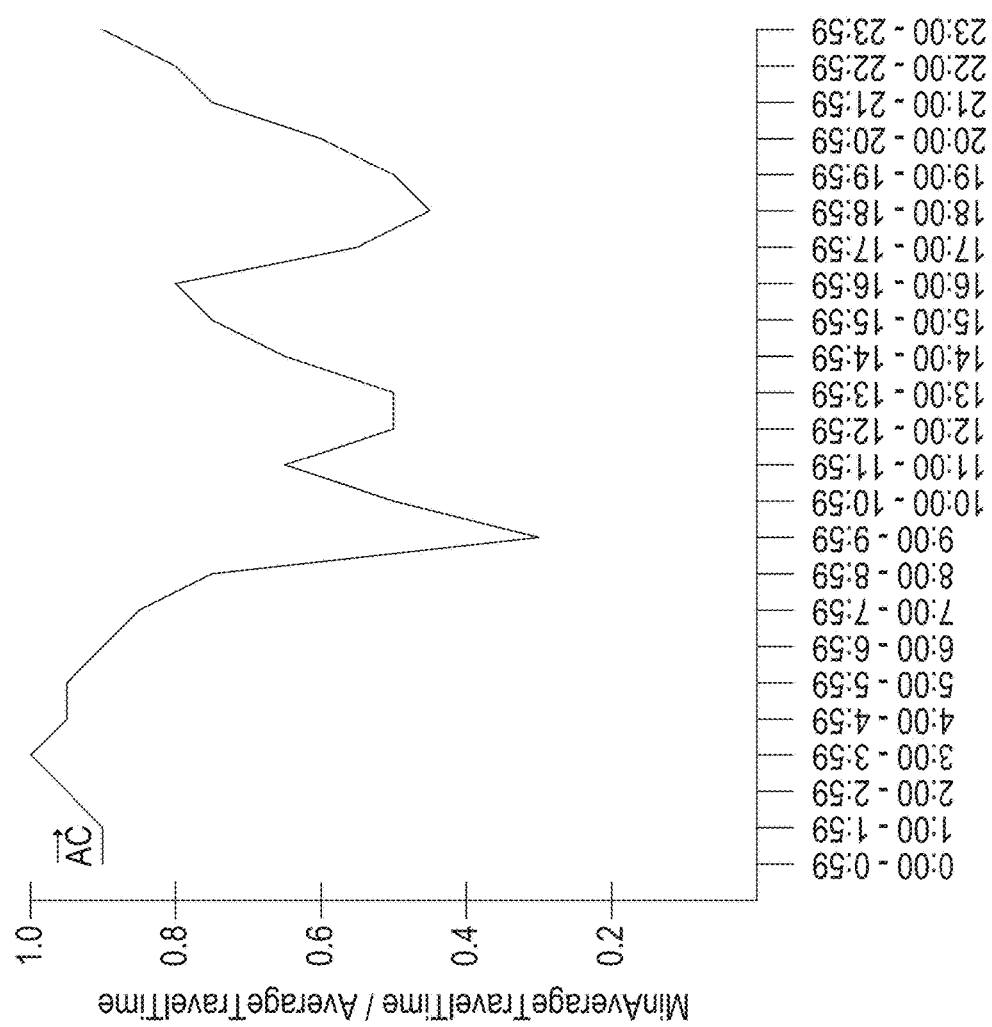
FIG. 125 illustrates plotting of a normalized average travel time to traverse a specific road segment during each of twenty four one hour windows throughout the day.
Figure 126:
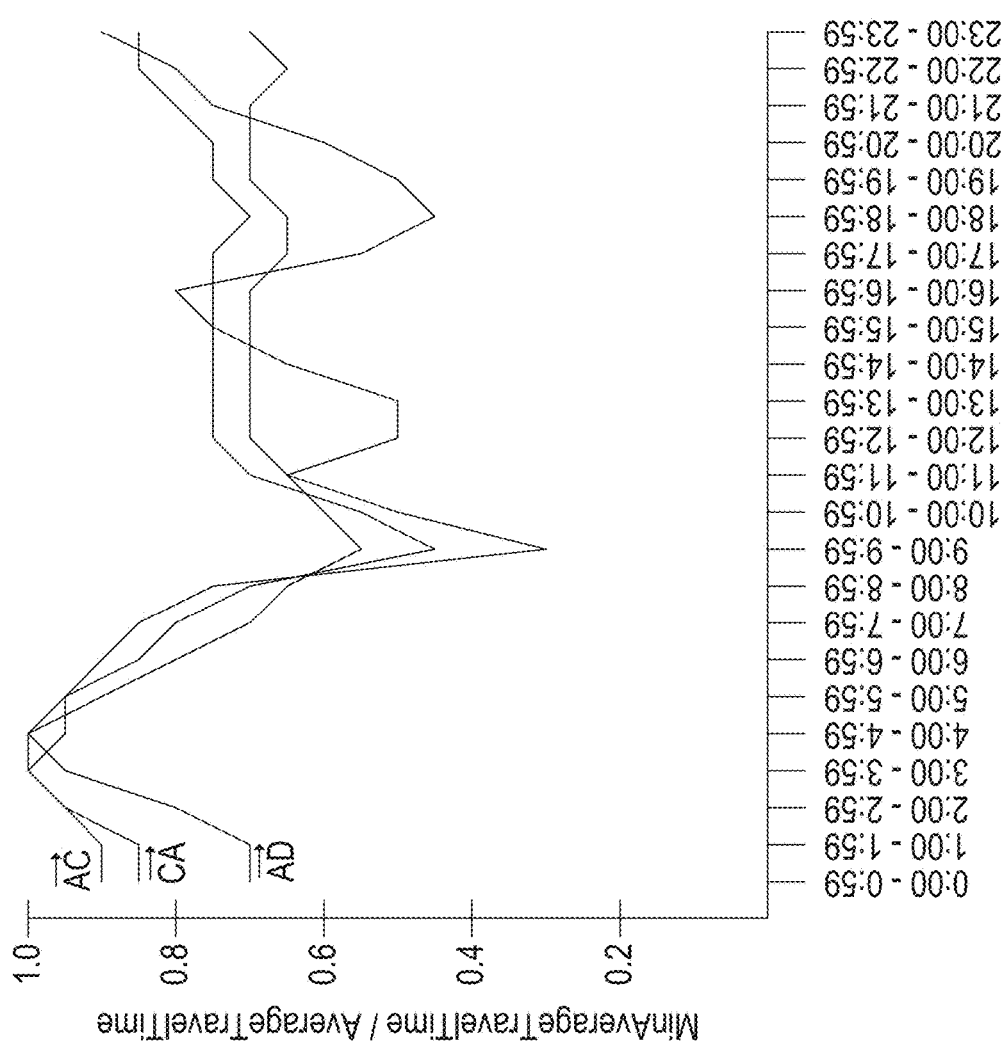
FIG. 126 illustrates plotting of normalized average travel times to traverse three specific road segments throughout the day.

For purposes of a simplified example, FIG. 125 illustrates plotting of a normalized average travel time to traverse road segment AC during each of twenty four one hour windows throughout the day. FIG. 126 further includes plotting of a normalized average travel time to traverse road segments CA and AD during each of the same twenty four one hour windows throughout the day.

In accordance with one or more preferred implementations, a best fit line can be calculated based on average travel time or speed values throughout a day, e.g. normalized average travel time or speed values.

FIG. 127 illustrates exemplary C Sharp style pseudocode for very simplified calculation of a best fit line based on normalized average travel time values throughout the day.

Figure 129:
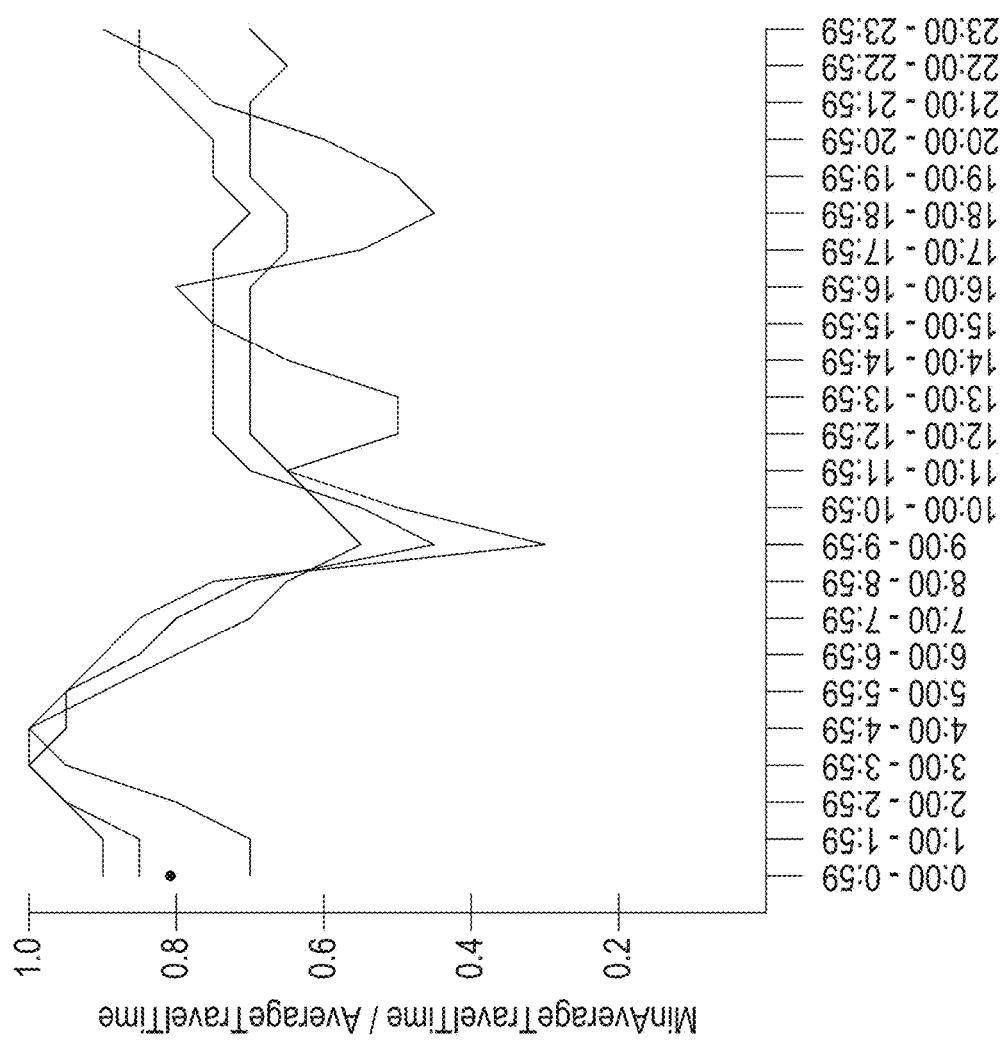
FIG. 129 illustrates the plotting of a best fit average travel time value for a simplified best fit line for a window of time.
Figure 130:
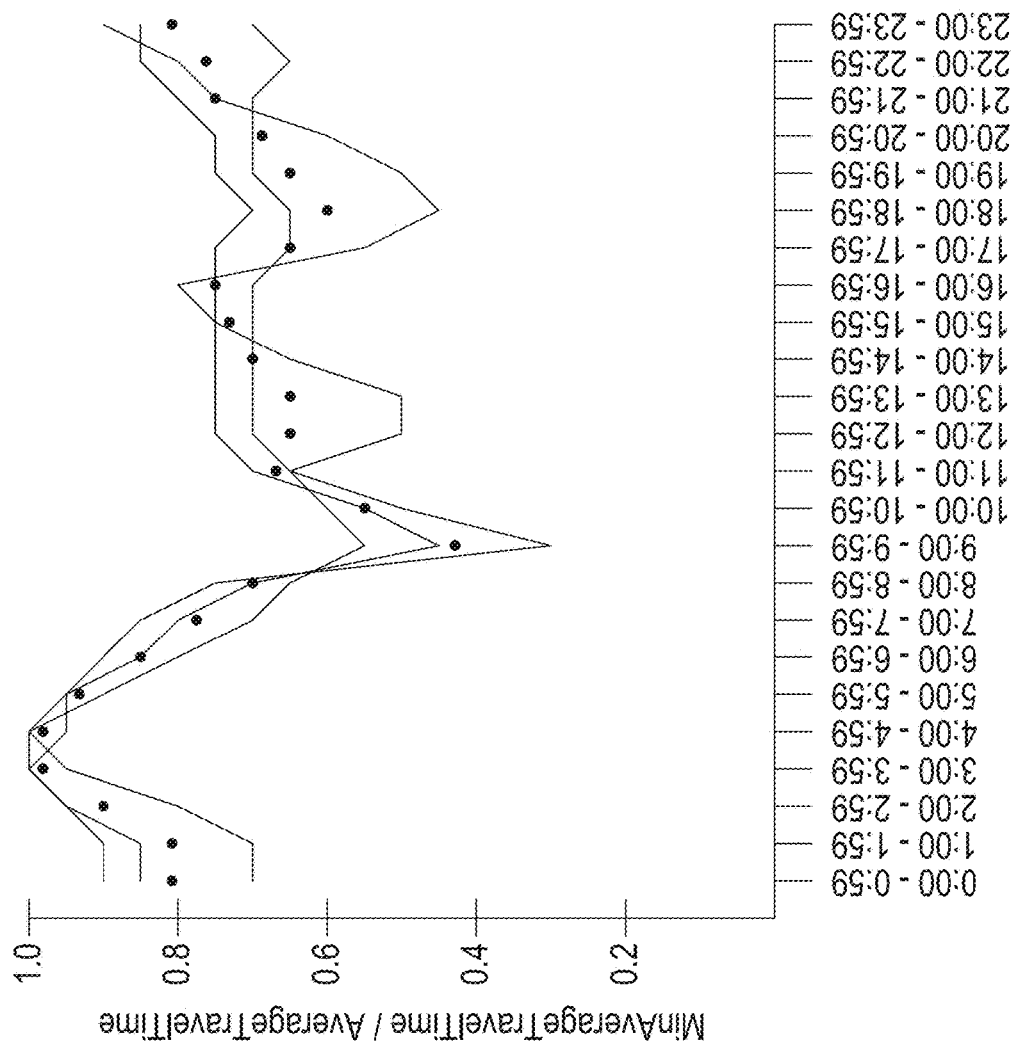
FIG. 130 illustrates plotting of similarly calculated best fit average travel time values for a simplified best fit line for other windows of time.
Figure 131:
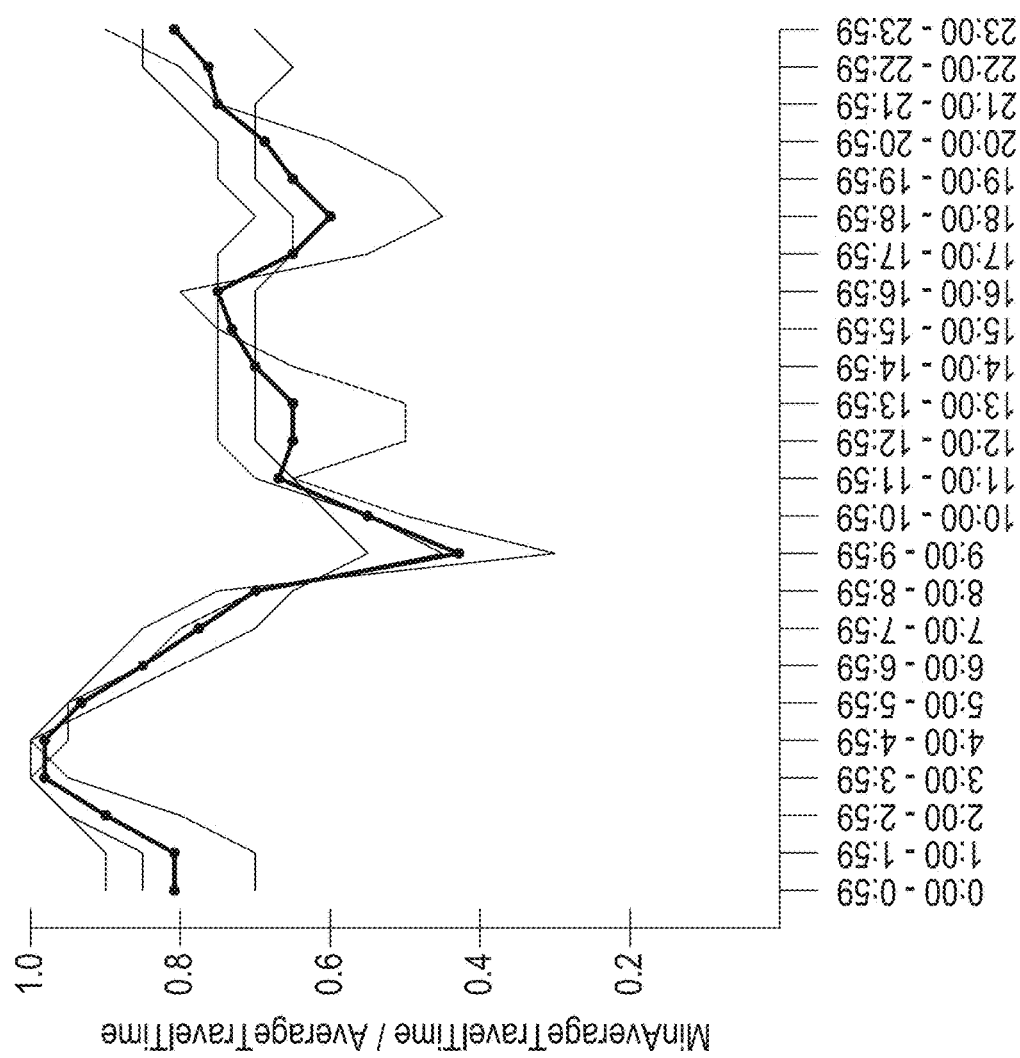
FIG. 131 illustrates how the values of FIG. 130 can be characterized as forming a best fit line.

For example, returning to the simplified example of FIG. 125, FIG. 128 fancifully illustrates calculation of a best fit average travel time value for a simplified best fit line for the window "0:00-0:59". FIG. 129 illustrates plotting of this best fit average travel time value for a simplified best fit line for the window "0:00-0:59". FIG. 130 illustrates similar plotting of similarly calculated best fit average travel time values for a simplified best fit line for other windows, and FIG. 131 illustrates how these values can be characterized as forming a best fit line.

In accordance with one or more preferred implementations, statistical methods are applied to best fit data or a best fit line or curve to find one or more inflection points in best fit data, a best fit line, or a best fit curve. These are points where a rate of change begins to change (e.g. a second derivative in calculus). In accordance with one or more preferred implementations, determined inflection points are utilized as cutoff points separating traffic windows.

Returning to the simplified example of FIG. 125, FIG. 132 fancifully illustrates simplified calculation of a second order delta representing a change in the rate of change at the time interval "1:00-1:59". This involves first calculating a delta in the best fit line from time interval "0:00-0:59" to time interval "1:00-1:59", which is calculated to be "0.0". This further involves calculating a delta in the best fit line from time interval "1:00-1:59" to time interval "2:00-2:59", which is calculated to be "0.083". A second order delta for time interval "1:00-1:59" can then be calculated by determining a difference between the two calculated values, which is calculated to be "0.083".

It will be appreciated that this is a very simple methodology for calculating a second order delta, and merely is based on the rate of change for the one hour interval prior to the current interval, and the one hour interval subsequent to the current interval, and that other methodologies could equally be utilized. For example, methodologies may be utilized which consider more than three hours of data in determining a second order delta, or which consider less than three hours of data in determining a second order delta.

In accordance with one or more preferred implementations, a determined value for a second order delta or derivative may be compared to a minimum threshold to determine whether a particular time or time interval should be used as a cutoff to define a traffic window.

Returning to the simplified example of FIG. 125, FIG. 133 fancifully illustrates comparison of the calculated second order delta of FIG. 132 to a threshold value, and determination that the calculated second order delta is greater than the threshold value, and thus that the corresponding time interval should be used as a cutoff to define a traffic window.

Figure 134:
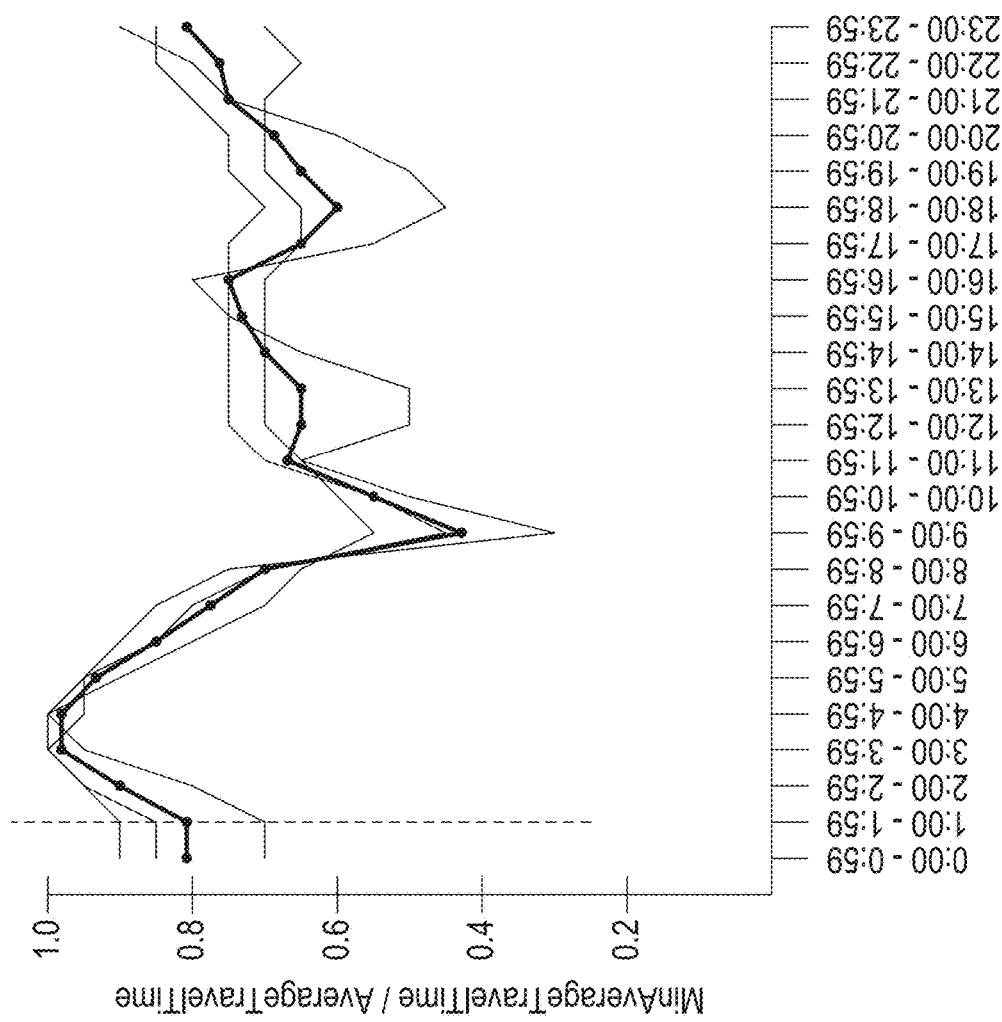
FIG. 134 fancifully illustrates that it has been determined that a corresponding time interval should be used as a cutoff to define a traffic window.

FIG. 134 fancifully illustrates that it has been determined that the corresponding time interval "1:00-1:59" should be used as a cutoff to define a traffic window.

Figure 135:
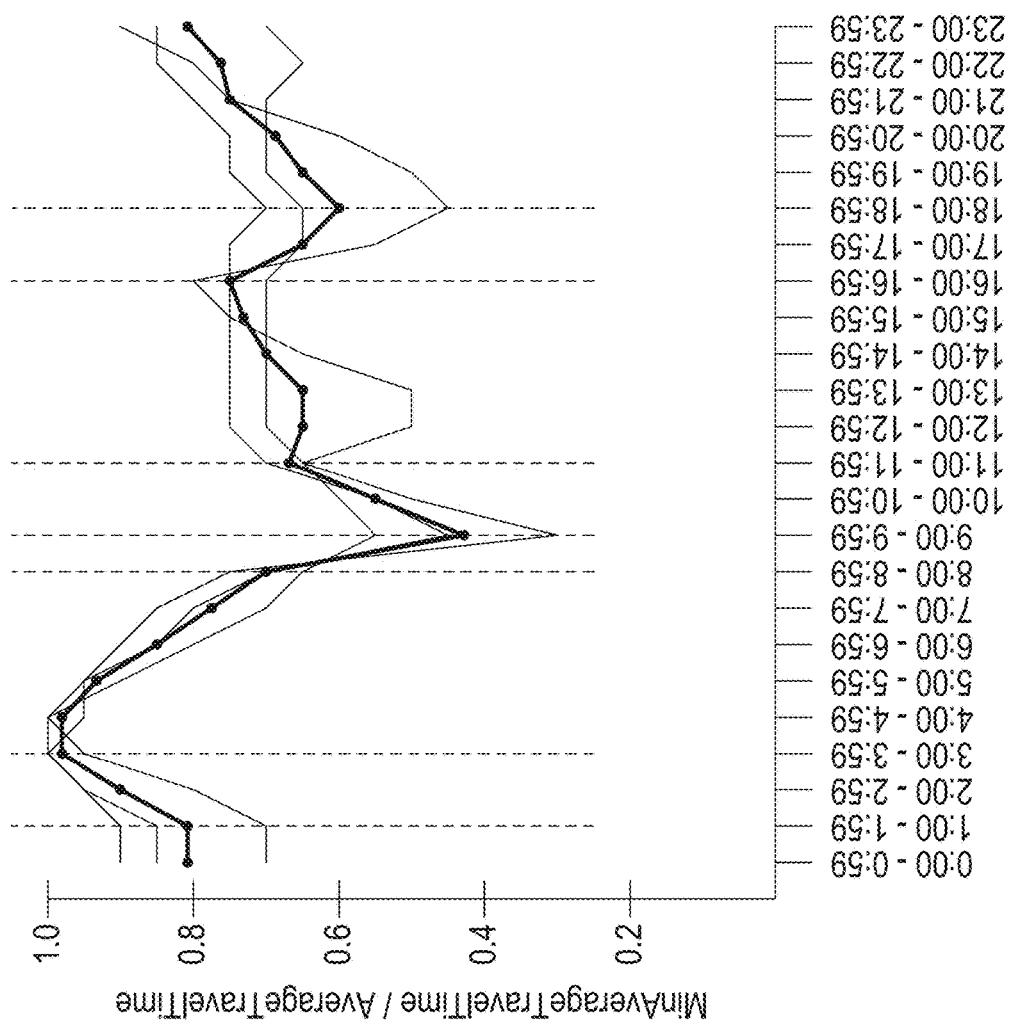
FIG. 135 fancifully illustrates additional time intervals used as cutoffs to define a traffic window.

Similar calculations can be carried to identify other time intervals which should be used as a cutoff to define a traffic window. FIG. 135 fancifully illustrates additional time intervals that it has been determined should be used as a cutoff to define a traffic window.

Figure 136:
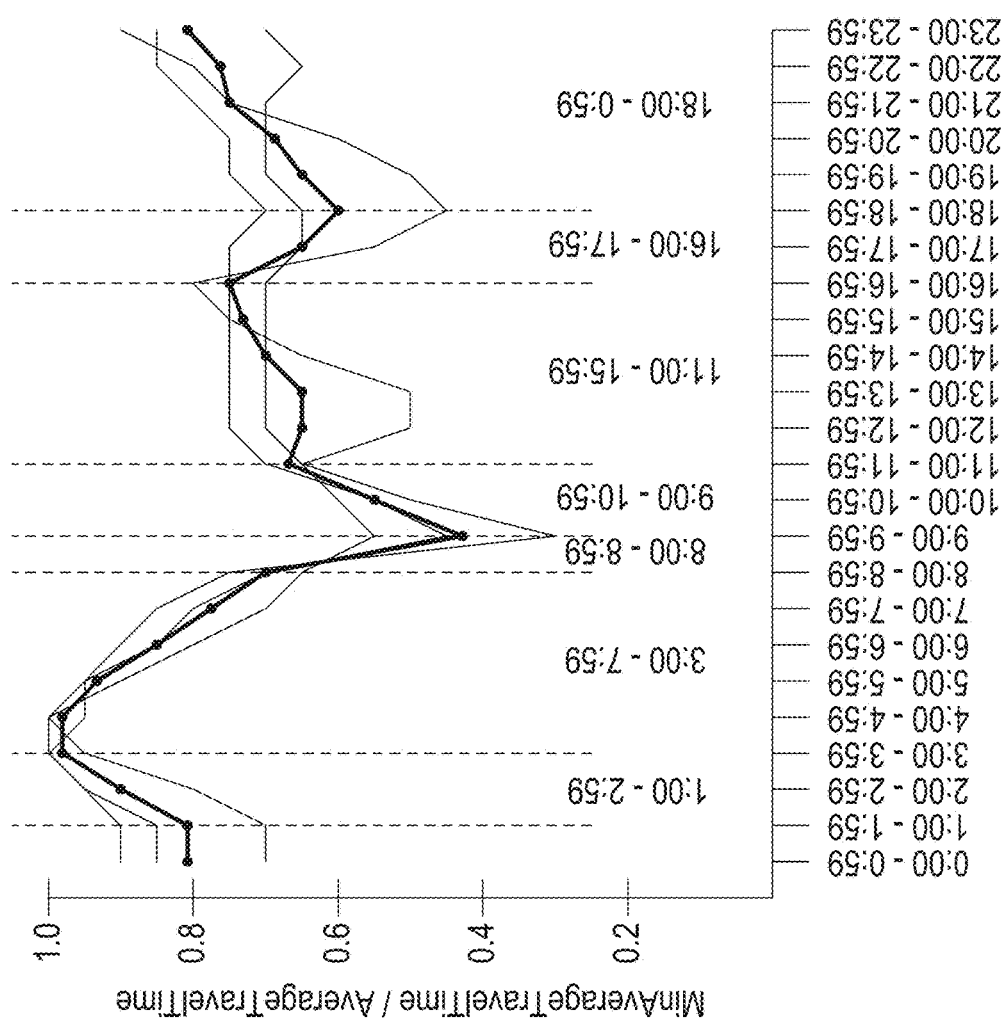
FIG. 136 illustrates the cutoffs in FIG. 135 used to define a plurality of traffic windows.

Preferably, these determined time intervals are utilized to define a plurality of traffic windows, as illustrated in FIG. 136.

FIG. 137 illustrates exemplary C Sharp style pseudocode for very simplified determination of times to be utilized for definition of traffic windows.

Figure 138:
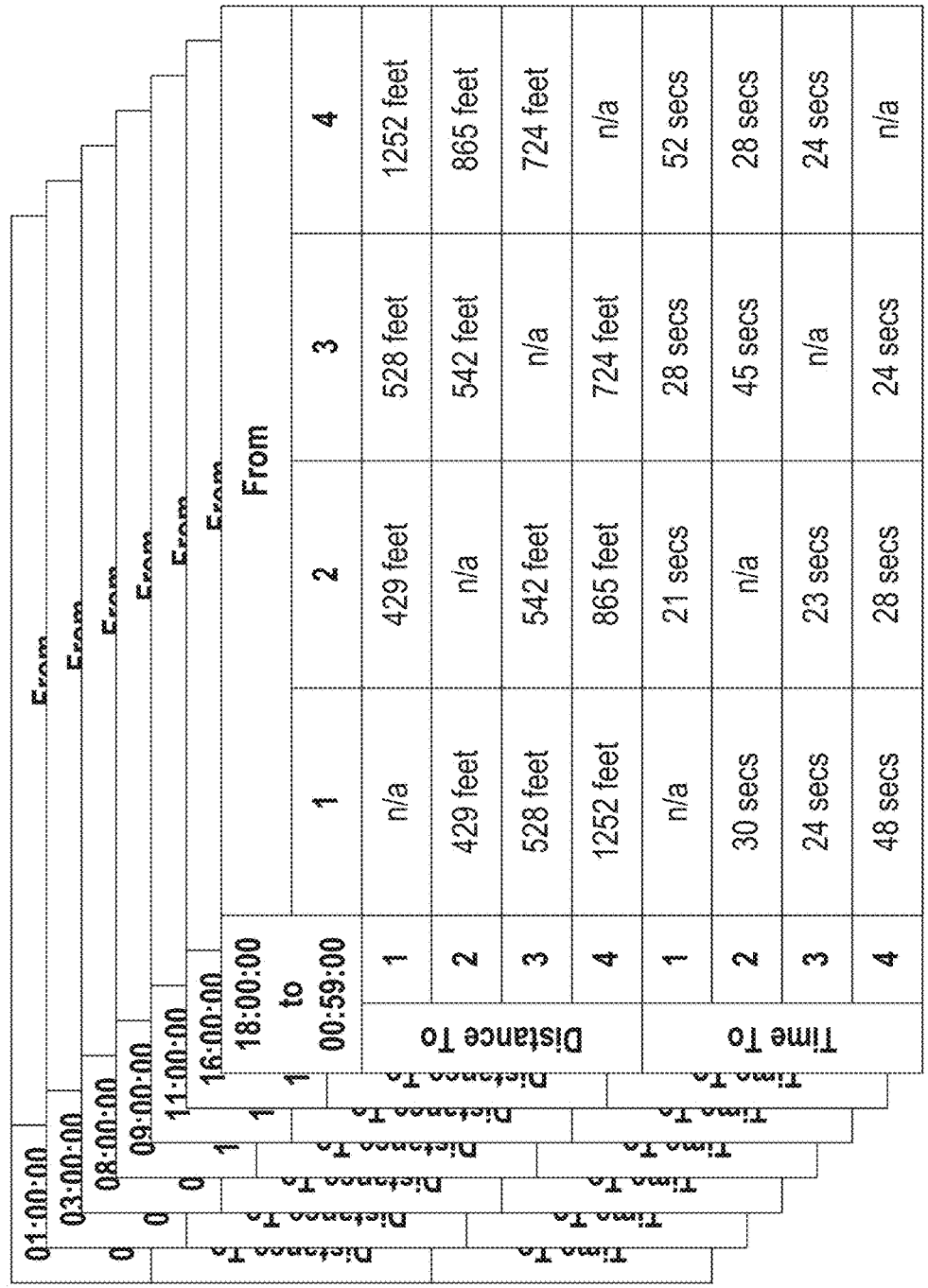
FIG. 138 illustrates a matrix containing calculated values for shortest or preferred paths for traffic windows of FIG. 136.

As described above, exemplary average travel times for each road segment may be determined for each of a plurality of determined and defined windows, and determination of a shortest path may involve utilizing the time estimates for a window within which a current time falls, or within which an estimated time of travel falls. Further, a matrix containing calculated values for determined shortest or preferred paths may be precomputed and stored for each of these time windows, as illustrated in FIG. 138.

In accordance with one or more preferred implementations, traffic windows are determined utilizing statistical or other methodologies, and for each road segment an average travel time or speed is computed during that window, and used to represent an estimated travel time or speed for that entire interval. In accordance with one or more preferred implementations, a shortest or optimal path matrix containing calculated values for determined shortest or optimal paths is precomputed and stored for each determined traffic window. In accordance with one or more preferred implementations, traffic window determinations may be made for a particular problem or area.

In accordance with one or more preferred implementations, determining a number of traffic windows for which shortest or optimal path information is precomputed allows for less computation as compared to requiring on-demand, in-process determination of a shortest or optimal path for a particular time during comparison of paths or routes performed as part of a process for determining a solution to a routing problem. In accordance with one or more preferred implementations, determining a number of traffic windows for which shortest or optimal path information is precomputed allows for quicker determination of a solution.

In accordance with one or more preferred implementations, reducing a number of traffic windows for which shortest or optimal path information is precomputed allows for less computation as compared to computation over an increased number of intervals (e.g. twenty four one hour intervals). In accordance with one or more preferred implementations, reducing a number of traffic windows for which shortest or optimal path information is precomputed allows for quicker determination of a solution with less resource usage (e.g. less processing time, less memory usage, and optionally less storage usage).

Utilizing a Geo-Locator Service and Zone Servers to Reduce Computer Resource Requirements for Determining High Quality Solutions to Routing Problems As described herein, methodologies for determining high quality solutions to routing problems may involve computing a shortest or optimal path for travel between locations involved in the routing problem. As noted above, as the number of locations involved in a routing problem grows, this begins to greatly increase the number of computations that are required to compute such a shortest or optimal path matrix. In general, for a routing problem involving n locations, approximately n*n shortest or optimal paths must be determined. Thus, for example, for a routing problem involving one thousand locations, one million shortest or optimal paths would have to be determined to compute the shortest or optimal path matrix.

Computing such a matrix can be a time consuming process and can delay the solution to a routing problem, e.g. a routing optimization problem that involves a road network.

Even more calculations and shortest path determinations may be required if data for various time intervals throughout a day is to be taken into consideration.

As more and more calculations and computations become required for more complex problems, it becomes increasingly important to be able to quickly compute information for shortest or optimal paths, e.g. a shortest or optimal path matrix. Rapid computation requires that the relevant data be stored in memory, but storing data on a large road network in memory (e.g. the road network for an entire state or country) requires a large amount of memory. This can quickly escalate into requiring tens of gigabytes of memory (e.g. random access memory, or "RAM"), or even more.

While some routing problems may require use of road network data for an entire state or country, many routing problems may only require use of road network data for a much smaller area, such as a town, city, county, or portion of a state or country. It is inefficient to tie up a high value server having a large amount of memory to compute shortest or optimal paths for a routing problem that is confined to a very small geographic area and only requires road network data for a very small road network.

Figure 139:
FIG. 139 illustrates an exemplary geographic area comprising a road network.
Figure 140:
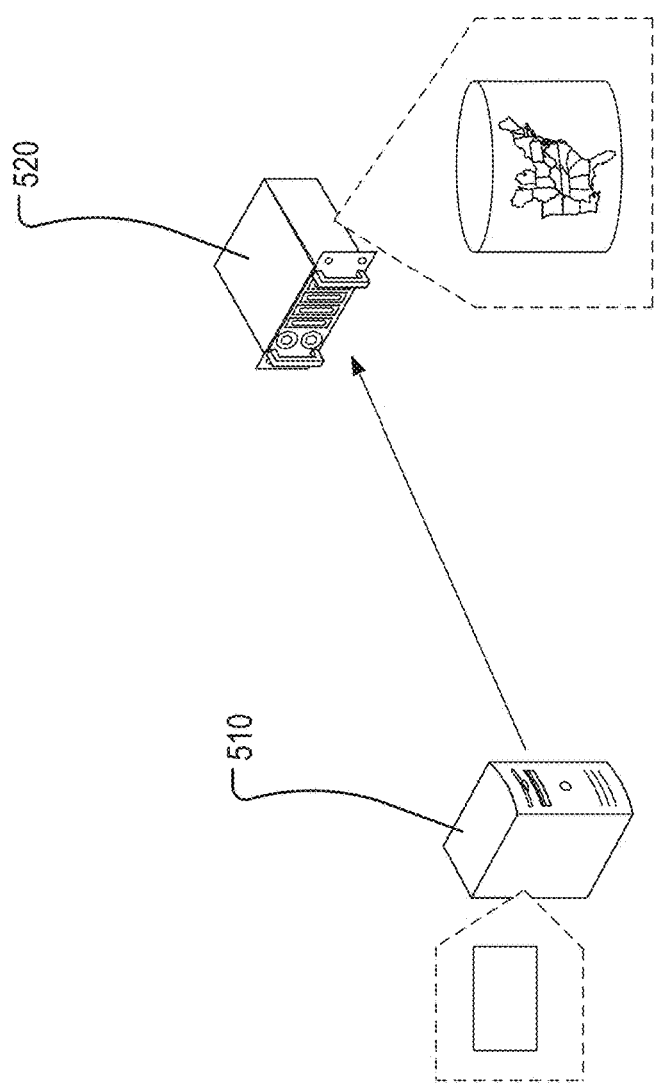
FIG. 140 illustrates a requestor communicating a request related to a routing problem involving specific locations.

For example, FIG. 139 illustrates an exemplary geographic area comprising a road network. In a traditional implementation approach, a requester 510 would communicate a request related to a routing problem involving specified locations to a server 520, as illustrated in FIG. 140.

This might, for example, be a request for one or more high quality solutions to a routing problem involving specified locations, or might be a request for a shortest or optimal path matrix for specified locations.

The server 520 (or a related server) would include a large amount of memory to allow for loading of road segment data for a large road network, e.g. the entire road network within the geographical area.

In accordance with one or more preferred implementations, a geographic area comprising a road network is divided up into a plurality of zones, and one or more servers are utilized for each zone to provide routing solutions for that zone.

For example, with respect to the exemplary geographic area illustrated in FIG. 139, each state could be characterized as its own zone, as illustrated in FIG. 141, where North Carolina is highlighted with an increased thickness line to fancifully illustrate its characterization as a zone. Notably, zones can overlap one another, and can even be located entirely within another zone. For example, the entire geographic area illustrated in FIG. 139 might be a first zone, and the state of North Carolina might be a second zone.

In accordance with one or more preferred methodologies, a server is provided for each of these zones, as illustrated in FIG. 142, where a server 620 includes data for a zone corresponding to the geographic area illustrated in FIG. 139, and a server 630 includes data for a zone corresponding to the state of North Carolina.

In this example, the state of Florida would itself be another zone, as illustrated in FIG. 143, where Florida is highlighted with an increased thickness line to fancifully illustrate its characterization as a zone. FIG. 144 illustrates additional provision of a server 640 including data for a zone corresponding to the state of Florida.

In accordance with one or more preferred implementations, a single server may include data for two or more zones, as illustrated in FIG. 145, where server 730 includes data for a first zone corresponding to the state of North Carolina and further includes data for a second zone corresponding to the state of Florida.

Figure 146:
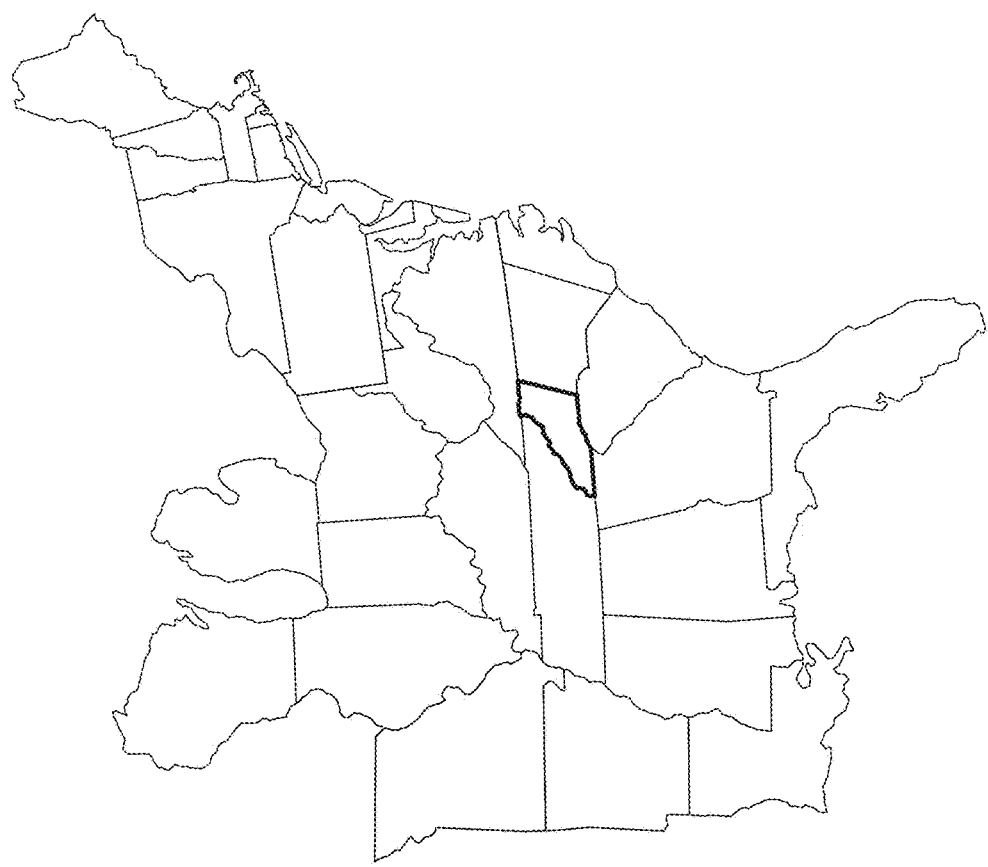
Figure 147:
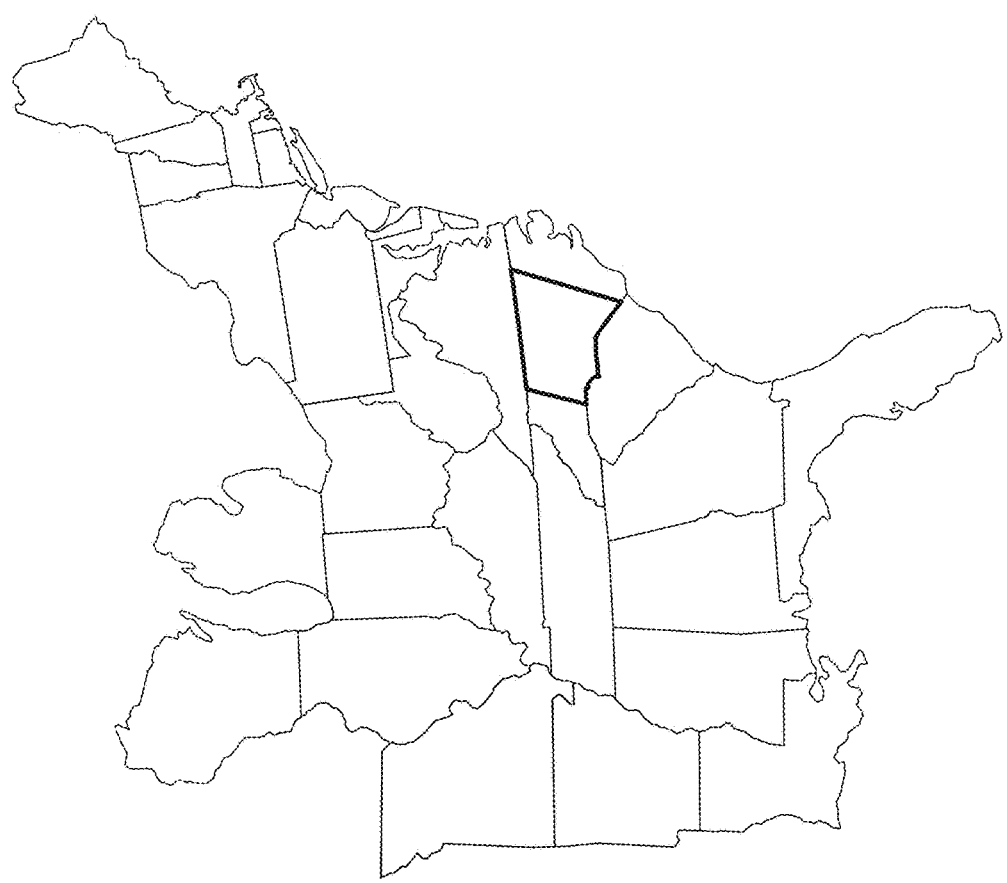
Figure 148:
Figure 149:
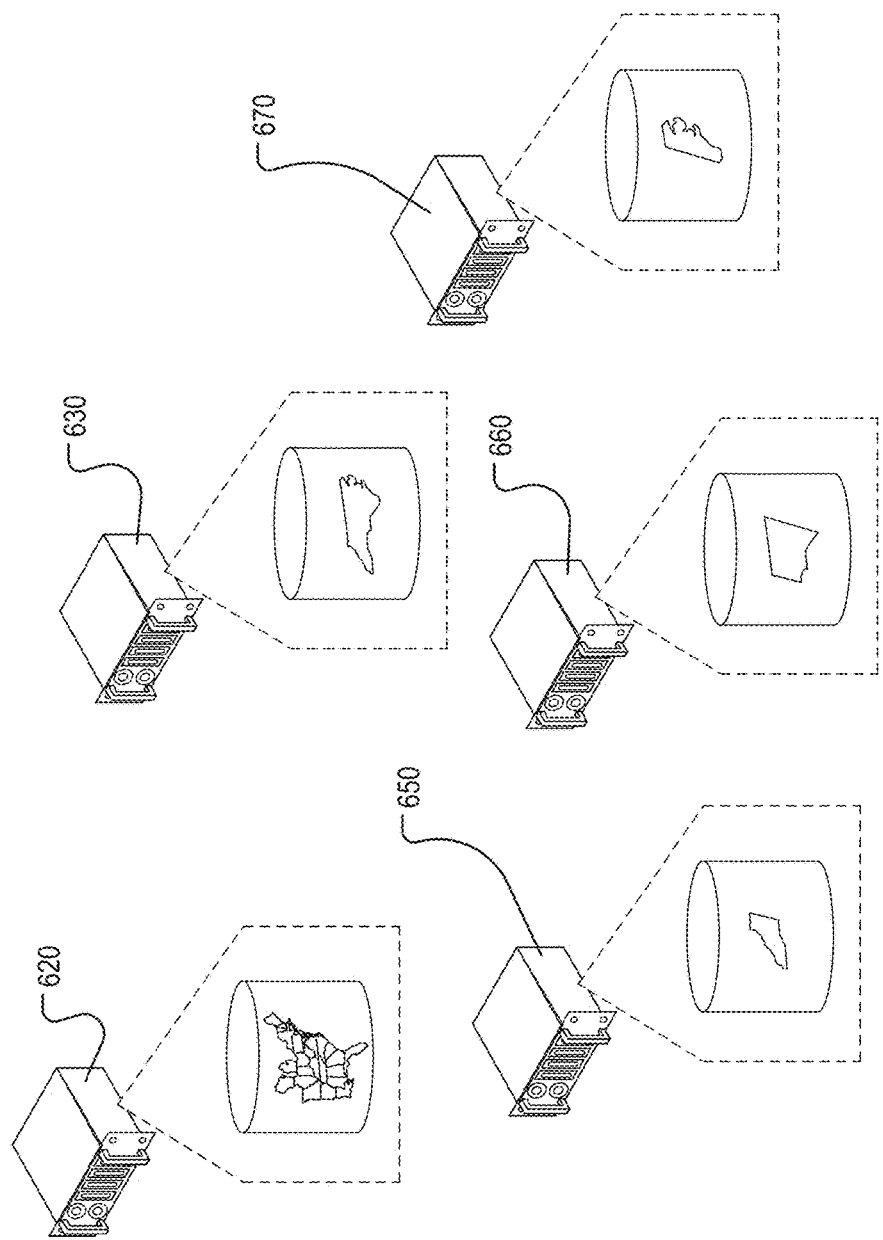
Figure 150:
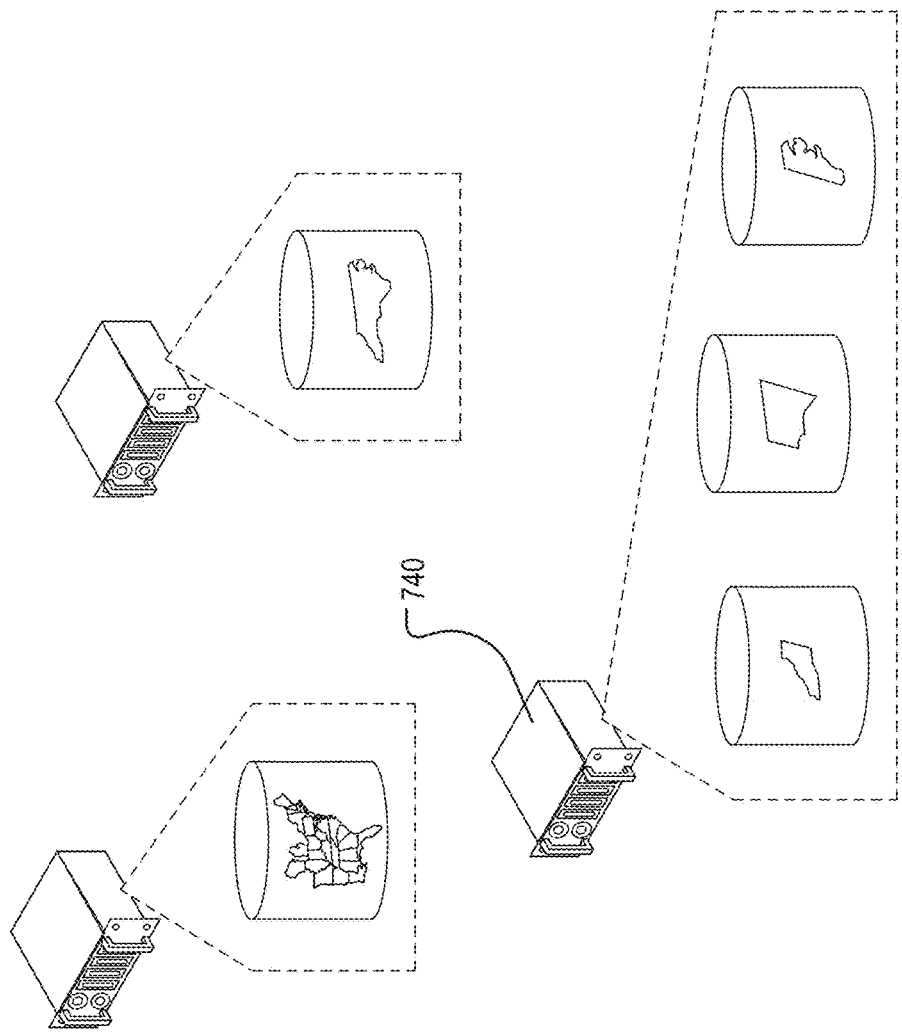

In accordance with one or more preferred implementations, multiple zones may overlap with, or be nested inside of, other overlapping or nesting zones. For example, FIG. 146 illustrates a western portion of North Carolina that is highlighted with an increased thickness line to fancifully illustrate its characterization as a zone, FIG. 147 illustrates a central portion of North Carolina that is highlighted with an increased thickness line to fancifully illustrate its characterization as a zone, and FIG. 148 illustrates an eastern portion of North Carolina that is highlighted with an increased thickness line to fancifully illustrate its characterization as a zone. FIG. 149 illustrates additional provision of servers 650,660,670 including data for these zones. As noted above, a single server may include data for two or more zones, and data for these zones could be found on a single server, as illustrated in FIG. 150, where a server 740 includes data for each of these zones.

Figure 151:
Figure 152:
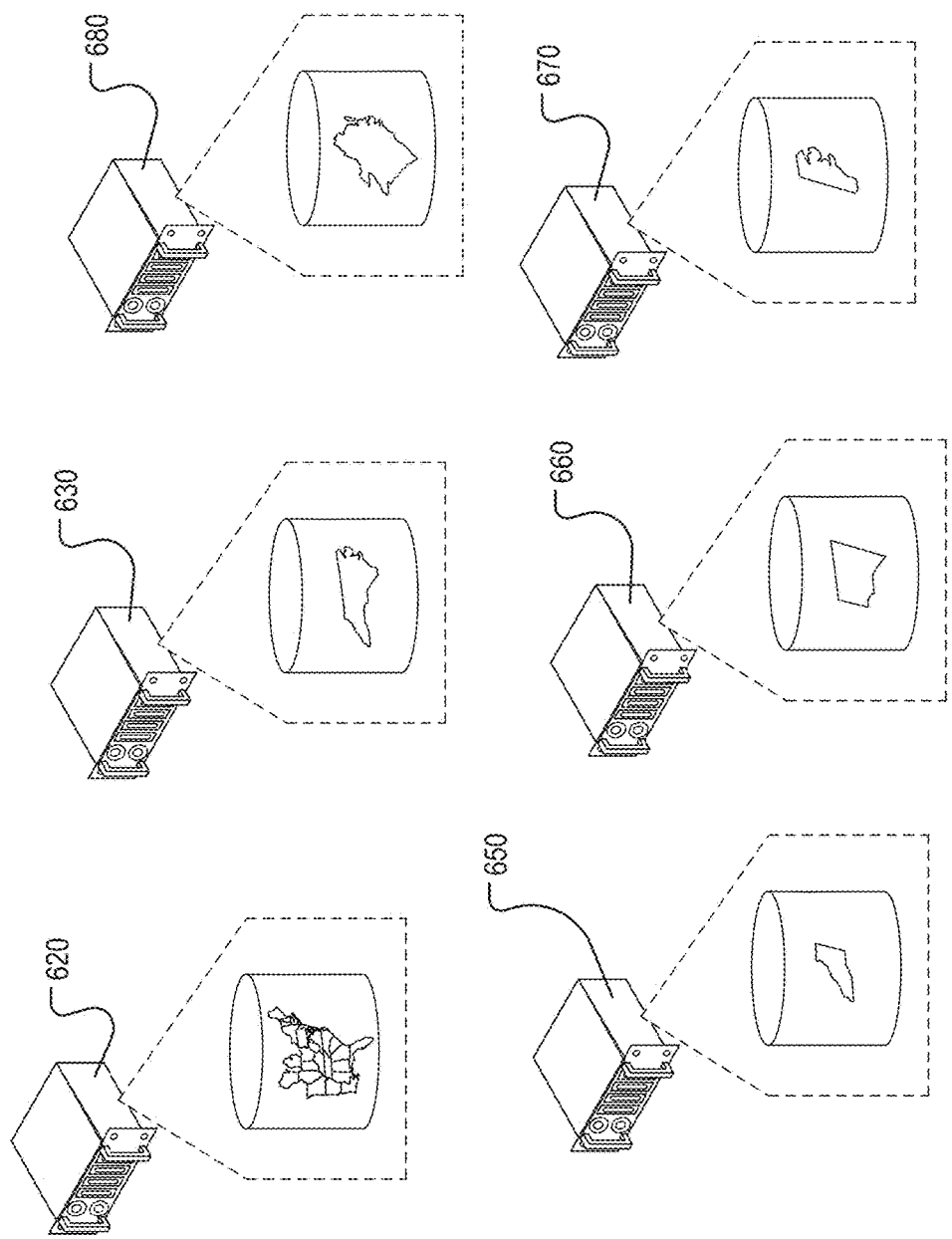

As another example, FIG. 151 illustrates a geographic area comprising the states of Virginia, North Carolina, and South Carolina that is highlighted with an increased thickness line to fancifully illustrate its characterization as a zone. FIG. 152 illustrates additional provision of a server 680 including data for this zone.

In accordance with one or more preferred implementations, a geo-locator service is utilized to allow a requestor to determine what server to contact to receive information for a routing problem.

For example, FIG. 153 illustrates a server 690 comprising a geo-locator service 692 which contains information regarding the defined zones (e.g. sets of coordinates for defined boundaries of each of the zones). The geo-locator service 692 is configured to receive a list of sets of coordinates for locations involved in a routing problem, determine the smallest zone that contains all of the locations, and return an indication of the determined zone or corresponding server.

Figure 155:
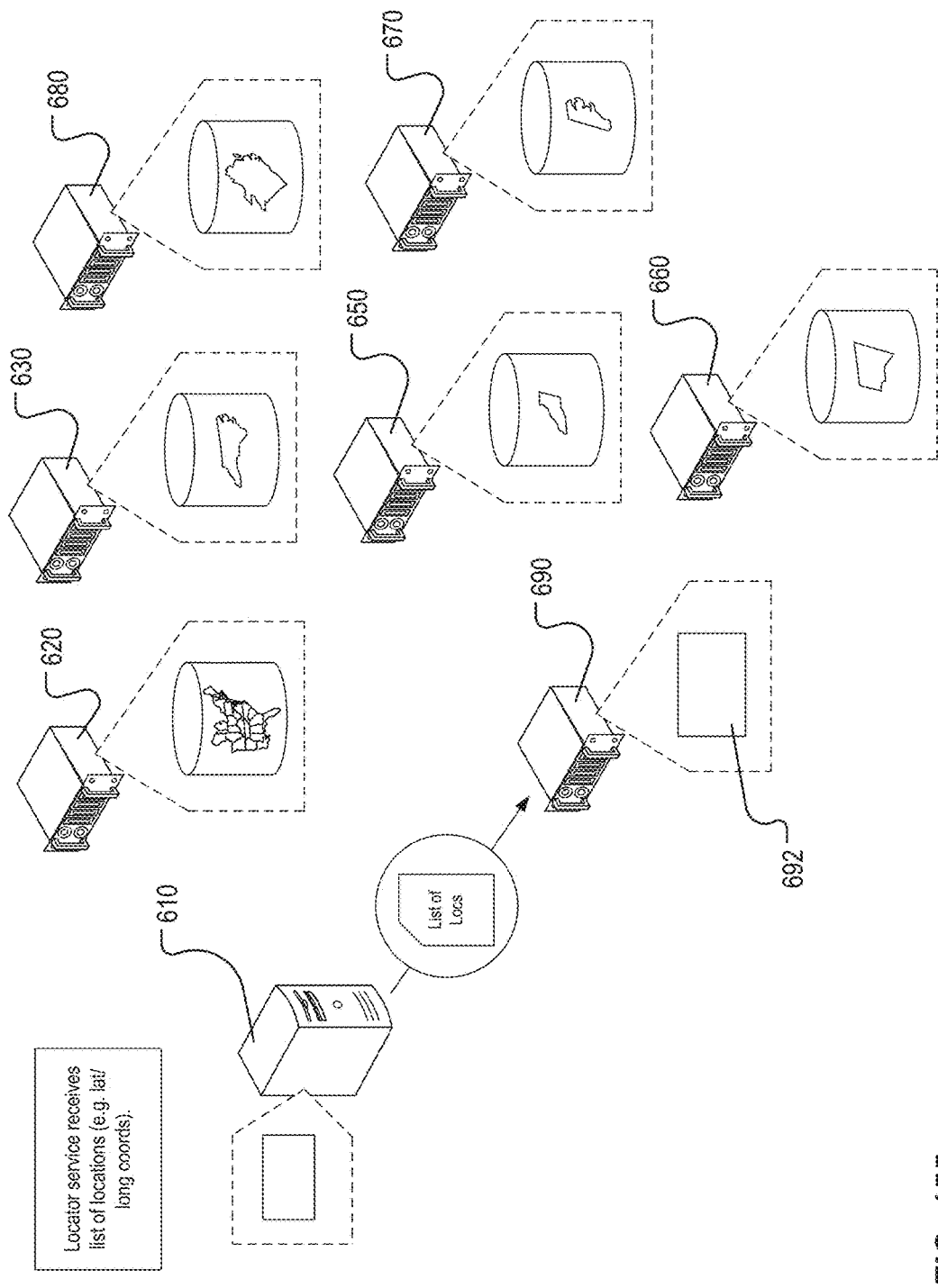

As an example, consider a routing problem involving the three locations fancifully illustrated in FIG. 154. In accordance with one or more preferred methodologies, the server 690 hosting the locator service 692 receives, from a requestor 610, a list comprising information for these locations (e.g. in the form of latitude and longitude coordinates for these locations), as illustrated in FIG. 155.

Figure 156:
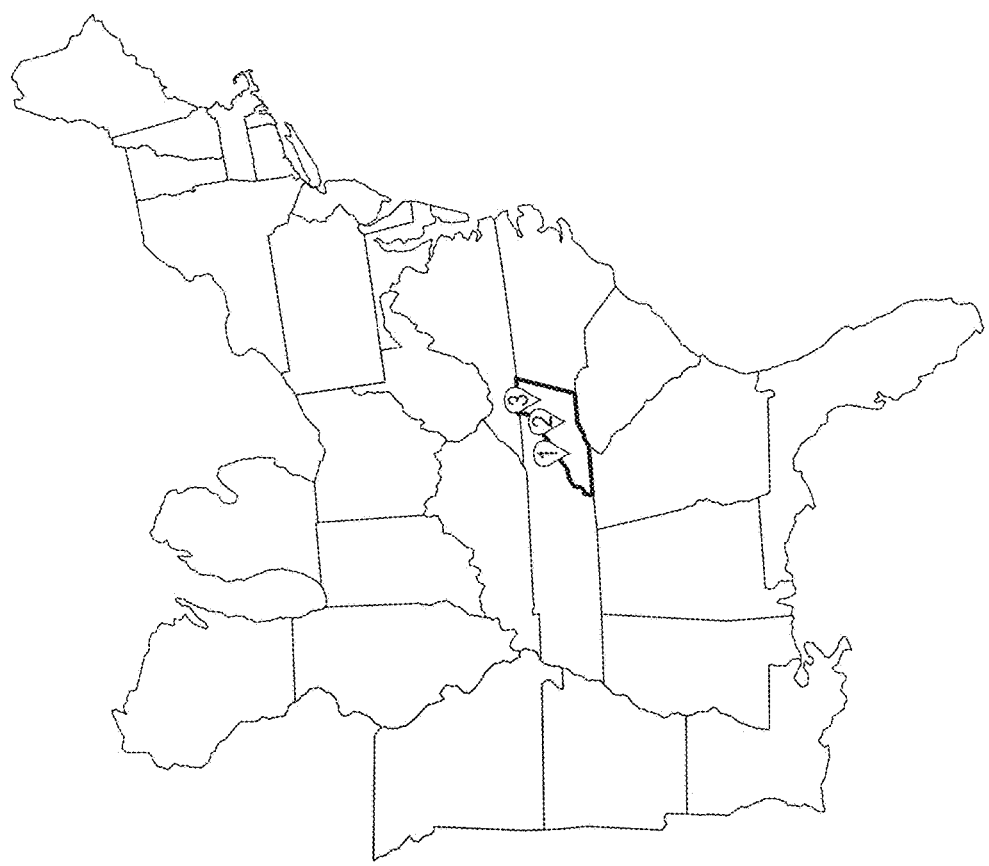

In accordance with one or more preferred methodologies, the locator service 692 accesses zone data for defined zones and determines a smallest defined zone containing all of these locations, as illustrated in FIG. 156. For example, in accordance with one or more preferred implementations, each zone is defined by a plurality of sets of latitude and longitude coordinates defining a boundary for that zone, and a locator service compares latitude and longitude coordinates for locations involved in a routing problem to defined boundaries of defined zones to identify a smallest defined zone containing all of the locations involved in the routing problem.

In accordance with one or more preferred implementations, a locator service 692 returns an identifier for an identified or determined zone, or an identifier or address for a server corresponding to that identified or determined zone.

Figure 157:
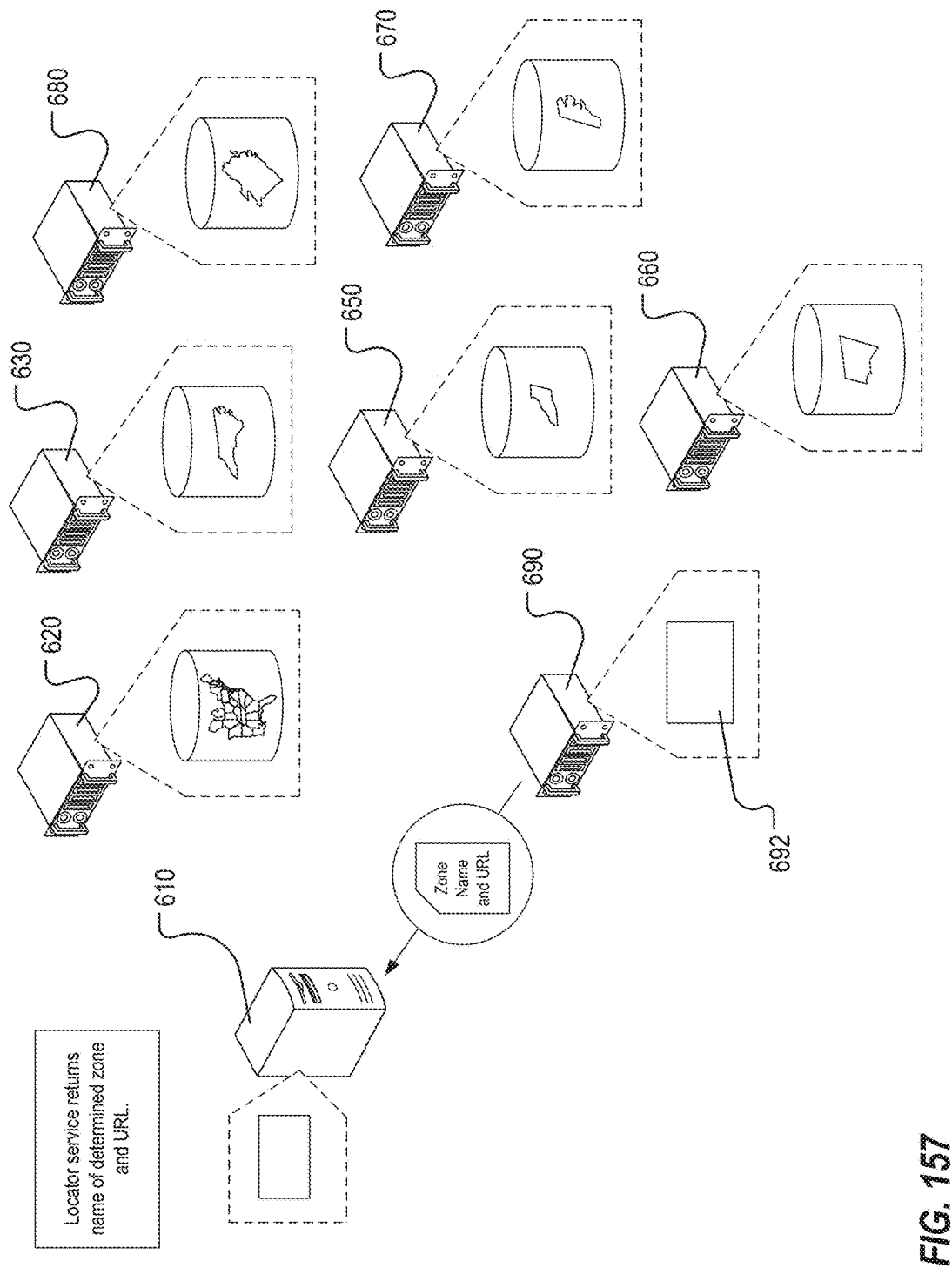

In accordance with one or more preferred methodologies, the locator service 692 returns a name of an identified or determined zone and a uniform resource locator corresponding to that identified or determined zone, as illustrated in FIG. 157.

Figure 158:
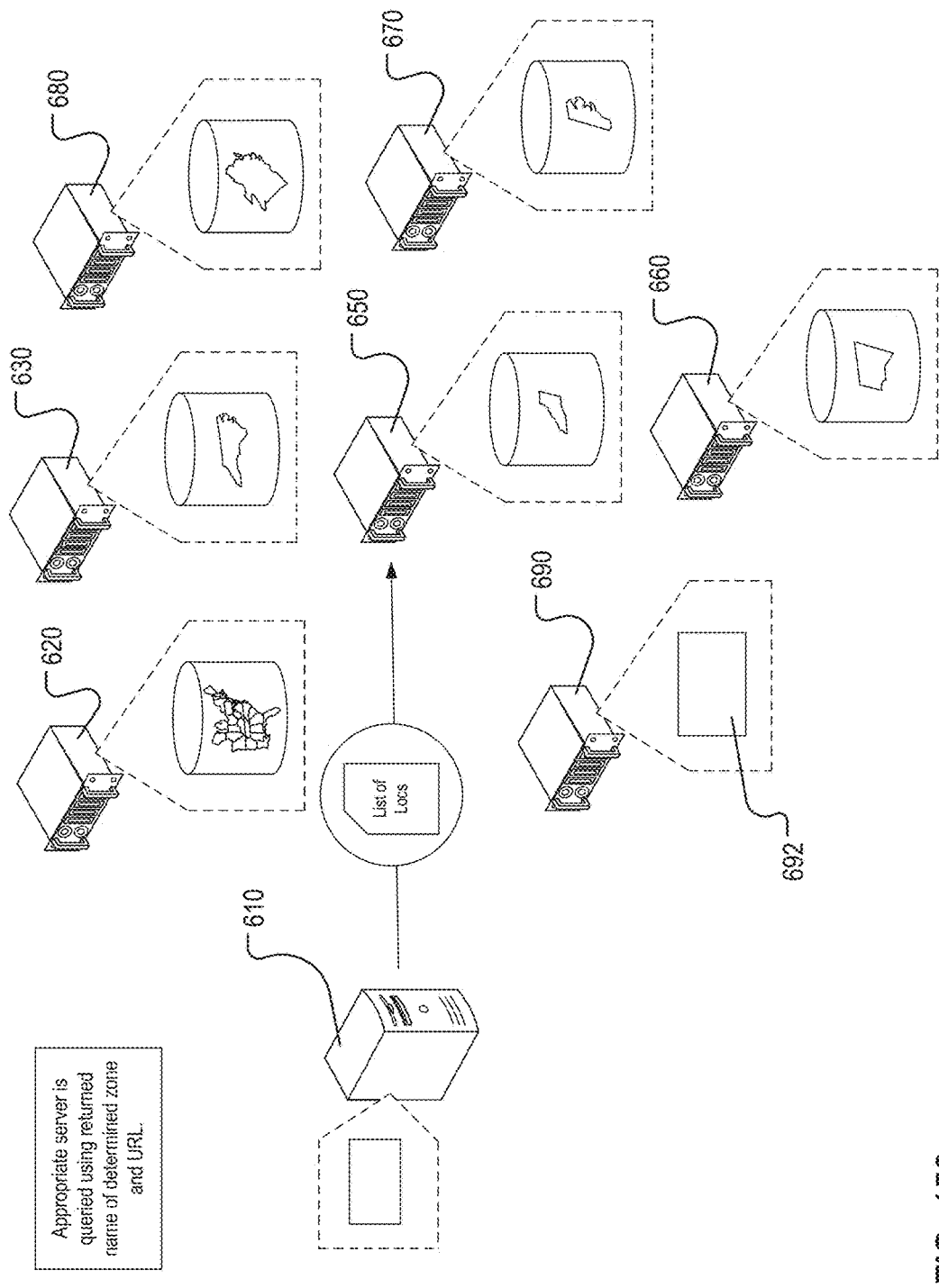

Such a returned uniform resource locator which corresponds to an identified or determined zone preferably can be used to access one or more servers corresponding to that identified or determined zone, as illustrated in FIG. 158, where a list comprising information for locations (e.g. in the form of latitude and longitude coordinates for locations) is communicated from the requestor 610 to a server 650 corresponding to the zone previously determined by the requestor service 692 to be the smallest defined zone containing all of the locations involved in the routing problem. In accordance with one or more preferred implementations, a computed shortest or optimal path matrix is returned for the list of locations.

FIGS. 159-160 fancifully illustrate another example of determination of a smallest defined zone containing all of the locations involved in a routing problem.

In accordance with one or more preferred implementations, communication of a list comprising information for locations may be communicated as part of a request for a shortest or optimal path matrix, or as part of a request for one or more high quality solutions to a routing problem. In accordance with one or more preferred implementations, a response to such a request may include a shortest or optimal path matrix, or one or more high quality solutions to a routing problem.

CONCLUSION

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method involving utilizing a geo-locator service and zone servers to reduce server resource requirements for determining optimized solutions to routing problems, the method comprising:
   (a) maintaining, for a geo-locator service, electronic data corresponding to a plurality of defined zones each corresponding to a geographic area, wherein
      (i) each defined zone has a defined boundary, and
      (ii) a plurality of the defined zones each overlap with other of the defined zones;
   (b) maintaining a plurality of zone servers, each zone server including road network data for one or more of the zones of the plurality of defined zones;
   (c) electronically receiving, by the geo-locator service, a request communicated from a requesting device, the received request comprising information for a plurality of locations involved in a routing problem;
   (d) electronically determining, by the geo-locator service based on the received information for the plurality of locations and the maintained data corresponding to the plurality of defined zones, a smallest defined zone that contains all of the locations of the plurality of locations;
   (e) electronically returning, by the geo-locator service to the requesting device in response to the received request, data comprising an indication of the determined zone and an identifier for the zone server corresponding to the determined zone;
   (f) electronically communicating, from the requesting device to a zone server corresponding to the determined zone based on the returned data, problem data for the routing problem comprising data for the plurality of locations involved in the routing problem;
   (g) electronically determining, at the zone server corresponding to the determined zone, a set of one or more optimized solutions to the routing problem using a plurality of calculated travel time estimates accessed from one or more computed shortest path matrices; and
   (h) returning, from the zone server corresponding to the determined zone to the requesting device, data corresponding to the determined set of one or more optimized solutions to the routing problem.

2. The method of claim 1, wherein maintaining, for a geo-locator service, data corresponding to a plurality of defined zones each corresponding to a geographic area comprises maintaining, for each defined zone, a list of latitude and longitude coordinates defining the defined boundary for that zone.

3. The method of claim 1, wherein the received request comprises latitude and longitude coordinates for each of the plurality of locations.

4. A method involving utilizing a geo-locator service and zone servers to reduce server resource requirements for determining optimized solutions to routing problems, the method comprising:
   (a) maintaining, for a geo-locator service, electronic data corresponding to a plurality of defined zones each corresponding to a geographic area, wherein
      (i) each defined zone has a defined boundary, and
      (ii) a plurality of the defined zones each overlap with other of the defined zones;
   (b) maintaining a plurality of zone servers, each zone server including road network data for one or more of the zones of the plurality of defined zones;
   (c) electronically receiving, by the geo-locator service, a request communicated from a requesting device, the received request comprising information for a plurality of locations involved in a routing problem;
   (d) electronically determining, by the geo-locator service based on the received information for the plurality of locations and the maintained data corresponding to the plurality of defined zones, a smallest defined zone that contains all of the locations of the plurality of locations;
   (e) electronically returning, by the geo-locator service to the requesting device in response to the received request, data comprising an identifier for the determined zone;
   (f) electronically effecting, by the requesting device based on the returned identifier for the determined zone, communication of problem data for the routing problem comprising data for the plurality of locations involved in the routing problem;
   (g) electronically determining, at one or more zone servers corresponding to the determined zone in response to the effected communication of problem data, a set of one or more optimized solutions to the routing problem using a plurality of calculated travel time estimates accessed from one or more computed shortest path matrices; and
   (h) returning, from the one or more zone servers corresponding to the determined zone to the requesting device, data corresponding to the determined set of one or more optimized solutions to the routing problem.

5. The method of claim 4, wherein maintaining, for a geo-locator service, data corresponding to a plurality of defined zones each corresponding to a geographic area comprises maintaining, for each defined zone, a list of coordinates defining the defined boundary for that zone.

6. The method of claim 4, wherein the received request comprises coordinates for each of the plurality of locations.

7. The method of claim 4, wherein the requesting device comprises a computing device having a web browser loaded thereon, and wherein the received request was communicated via a web browser.

8. The method of claim 4, wherein the requesting device comprises a computing device having a web browser loaded thereon, and wherein the request utilizes hypertext transfer secure protocol (HTTPs).

9. The method of claim 4, wherein the requesting device comprises a desktop computer.

10. The method of claim 4, wherein the requesting device comprises a laptop computer.

11. The method of claim 4, wherein the requesting device comprises a tablet.

12. The method of claim 4, wherein the requesting device comprises a phone.

13. A method involving utilizing a geo-locator service and zone servers to reduce server resource requirements for facilitating determination of optimized solutions to routing problems, the method comprising:
 (a) maintaining, for a geo-locator service, electronic data corresponding to a plurality of defined zones each corresponding to a geographic area, wherein
  (i) each defined zone has a defined boundary, and
  (ii) a plurality of the defined zones each overlap with other of the defined zones;
 (b) maintaining a plurality of zone servers, each zone server including road network data for one or more of the zones of the plurality of defined zones;
 (c) electronically receiving, by the geo-locator service, a request communicated from a requesting device, the received request comprising information for a plurality of locations involved in a routing problem;
 (d) electronically determining, by the geo-locator service based on the received information for the plurality of locations and the maintained data corresponding to the plurality of defined zones, a smallest defined zone that contains all of the locations of the plurality of locations;
 (e) electronically returning, by the geo-locator service to the requesting device in response to the received request, data comprising an identifier for the determined zone;
 (f) electronically effecting, by the requesting device based on the returned identifier for the determined zone, communication of problem data for the routing problem comprising data for the plurality of locations involved in the routing problem;
 (g) electronically computing, at one or more zone servers corresponding to the determined zone in response to the effected communication of problem data, one or more shortest path matrices comprising shortest path data for directional shortest paths between pairs of locations of the plurality of locations; and
 (h) returning, from the one or more zone servers corresponding to the determined zone to the requesting device, data corresponding to the computed one or more shortest path matrices.

14. The method of claim 13, wherein maintaining, for a geo-locator service, data corresponding to a plurality of defined zones each corresponding to a geographic area comprises maintaining, for each defined zone, a list of coordinates defining the defined boundary for that zone.

15. The method of claim 13, wherein the received request comprises coordinates for each of the plurality of locations.

16. The method of claim 13, wherein the requesting device comprises a desktop or laptop computer.

17. The method of claim 13, wherein the requesting device comprises a tablet.

18. The method of claim 13, wherein the requesting device comprises a phone.

19. The method of claim 13, wherein the requesting device comprises a computing device having a web browser loaded thereon, and wherein the received request was communicated via a web browser.

20. The method of claim 13, wherein the requesting device comprises a computing device having a web browser loaded thereon, and wherein the request utilizes hypertext transfer secure protocol (HTTPs).

* * * * *